(12) United States Patent
Zhang et al.

(10) Patent No.: US 12,096,447 B2
(45) Date of Patent: Sep. 17, 2024

(54) UPLINK SWITCHING METHOD, COMMUNICATION APPARATUS, AND COMMUNICATION SYSTEM

(71) Applicant: HUAWEI TECHNOLOGIES CO., LTD., Guangdong (CN)

(72) Inventors: Liwen Zhang, Shanghai (CN); Zhou Xu, Shanghai (CN); Yong Wang, Shenzhen (CN); Quanzhong Gao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 565 days.

(21) Appl. No.: 17/324,749

(22) Filed: May 19, 2021

(65) Prior Publication Data

US 2021/0274483 A1 Sep. 2, 2021

Related U.S. Application Data

(63) Continuation of application No. PCT/CN2019/119441, filed on Nov. 19, 2019.

(30) Foreign Application Priority Data

Nov. 19, 2018 (CN) .......................... 201811379402.1

(51) Int. Cl.
*H04W 72/23* (2023.01)
*H04B 7/0413* (2017.01)
(Continued)

(52) U.S. Cl.
CPC ........... *H04W 72/23* (2023.01); *H04W 72/51* (2023.01); *H04L 5/14* (2013.01); *H04W 72/044* (2013.01)

(58) Field of Classification Search
CPC ..... H04W 72/23; H04W 72/51; H04W 36/06; H04W 72/0446; H04W 76/15;
(Continued)

(56) References Cited

U.S. PATENT DOCUMENTS 10,736,046 B2 * 8/2020 MolavianJazi ....... H04W 52/08
10,966,192 B2 * 3/2021 Kim ........................ H04L 5/003
(Continued)

FOREIGN PATENT DOCUMENTS

CA 3024010 A1 11/2017
CN 1909691 A 2/2007
(Continued)

OTHER PUBLICATIONS

Ericsson, "Summary of 7.1.3.3 (resource allocation)," 3GPP TSG RAN WG1 #94, R1-1809702, Gothenburg, Sweden, Aug. 20-24, 2018, 28 pages.
(Continued)

*Primary Examiner* — Ahmed Elallam
(74) *Attorney, Agent, or Firm* — Fish & Richardson P.C.

(57) ABSTRACT

Example uplink switching methods and apparatus are described. One example method include performing switching between a supplementary uplink (SUL) and a normal (NUL), where a switching time period for the switching between the SUL and the NUL is longer than 0 microseconds. Therefore, the SUL and the NUL can share a radio frequency channel so that the shared radio frequency channel can be switched between the SUL and the NUL.

20 Claims, 17 Drawing Sheets

(51) Int. Cl.
  *H04L 5/00* (2006.01)
  *H04W 72/044* (2023.01)
  *H04W 72/51* (2023.01)
  *H04L 5/14* (2006.01)

(58) Field of Classification Search
  CPC ......... H04W 72/044; H04W 36/00837; H04W 36/0011; H04W 72/0453; H04W 72/21; H04W 72/1268; H04L 5/001; H04L 5/0094; H04L 5/0098; H04L 5/14; H04L 5/1469; H04L 5/0091; H04B 7/0413
  See application file for complete search history.

(56) References Cited

U.S. PATENT DOCUMENTS

| | | | | |
|---|---|---|---|---|
| 11,140,722 | B2* | 10/2021 | Cirik | H04W 74/0833 |
| 11,476,915 | B2* | 10/2022 | Wu | H04W 74/0833 |
| 11,659,596 | B2* | 5/2023 | Cirik | H04W 80/02 |
| | | | | 370/329 |
| 11,678,353 | B2* | 6/2023 | Choi | H04L 25/0226 |
| | | | | 370/329 |
| 11,683,743 | B2* | 6/2023 | Babaei | H04W 74/0833 |
| | | | | 370/329 |
| 11,757,601 | B2* | 9/2023 | Wang | H04L 5/0042 |
| | | | | 370/330 |
| 2015/0003418 | A1 | 1/2015 | Rosa et al. | |
| 2016/0065302 | A1 | 3/2016 | Rosa et al. | |
| 2019/0268965 | A1* | 8/2019 | Jang | H04W 76/28 |
| 2020/0084806 | A1* | 3/2020 | Orsino | H04W 74/0833 |
| 2021/0160859 | A1* | 5/2021 | Xie | H04L 5/0094 |
| 2021/0227607 | A1* | 7/2021 | Onaka | H04W 76/16 |
| 2021/0385836 | A1* | 12/2021 | Ye | H04W 72/1268 |
| 2021/0392609 | A1* | 12/2021 | Siomina | H04W 64/00 |
| 2023/0164754 | A1* | 5/2023 | Liu | H04L 5/0098 |
| | | | | 370/329 |

FOREIGN PATENT DOCUMENTS

| | | |
|---|---|---|
| CN | 102196398 A | 9/2011 |
| CN | 102695213 A | 9/2012 |
| CN | 102812761 A | 12/2012 |
| CN | 103597772 A | 2/2014 |
| CN | 105340196 A | 2/2016 |
| CN | 105409135 A | 3/2016 |
| CN | 105453649 A | 3/2016 |
| CN | 107615860 A | 1/2018 |
| CN | 108112041 A | 6/2018 |
| CN | 108282827 A | 7/2018 |
| CN | 108353408 A | 7/2018 |
| CN | 108633076 A | 10/2018 |
| CN | 109151931 A | 1/2019 |
| CN | 110649949 A | 1/2020 |
| CN | 110650473 A | 1/2020 |
| WO | 2014205742 A1 | 12/2014 |
| WO | 2017196546 A1 | 11/2017 |
| WO | 2018126402 A1 | 7/2018 |
| WO | 2018182385 A1 | 10/2018 |
| WO | 2021062856 A1 | 4/2021 |

OTHER PUBLICATIONS

Huawei et al., "On switching time between UL and SUL," 3GPP TSG RAN WG4 #85, R4-1714093, Reno, USA, Nov. 27-Dec. 1, 2017, 3 pages.
Nokia et al., "SUL and UL sharing deployments and UE specification impacts," 3GPP TSG RAN WG4 #85, Reno, USA, Nov. 27-Dec. 1, 2017, 7 pages.
Office Action issued in Korean Application No. 2021-7018926 on Jul. 27, 2022, 11 pages (with English translation).
Qualcomm et al., "Transient timing clarifications for EN-DC mode," 3GPP TSG RAN WG4 #88, R4-1811464, Gothenburg, Sweden, Aug. 20-24, 2018, 6 pages.
Ericsson, "NR UE feature list," 3GPP TSG RAN WG1 #95, R1-1813252, Spokane, USA, Nov. 12-16, 2018, 49 pages.
Nokia et al., "On selected NR Rel-15 MIMO/beammanagement UE features," 3GPP TSG RAN WG1 Meeting #94bis, R1-1811025, Chengdu, P.R. China, Oct. 8-12, 2018, 10 pages.
Office Action in Korean Appln. No. 10-2021-7018926, dated Feb. 9, 2023, 13 pages (with English translation).
Huawei, HiSilicon, "Discussion on Procedures for Supporting SUL," 3GPP TSG-RAN WG2 Meeting #100, R2-1713208, Reno, USA, Nov. 27-Dec. 1, 2017, 5 pages.
Office Action issued in Chinese Application No. 201811379402.1 on Sep. 27, 2022, 7 pages.
Huawei et al., "WF on switching time for SUL and non-SUL for DC," 3GPP TSG-RAN WG4 Meeting #86bis, R4-1805888, Melbourne, Australia, Apr. 16-20, 2018, 2 pages.
Huawei et al., "Switching time for SUL and non-SUL for DC with three bands combinations," 3GPP TSG-RAN WG4 Meeting #86bis, R4-1803892, Melbourne, Australia, Apr. 16-20, 2018, 3 pages.
Office Action in Chinese Appln. No. 201811379402.1, dated Apr. 28, 2023, 4 pages.
Apple, "UE capability indication for single UL transmission of LTE-NR DC," 3GPP TSG-RAN WG2 #99, R2-1709700, Berlin, Germany, Aug. 21-25, 2017, 3 pages.
Huawei et al., "Discussion on procedures for supporting SUL," 3GPP TSG-RAN WG2 Meeting #100, R2-1713208, Reno, USA, Nov. 27-Dec. 1, 2017, 5 pages.
Huawei, "Draft CR on switching time for EN-DC," 3GPP TSG-RAN WG4 Meeting #88bis, R4-1812293, Chengdu, China, Oct. 8-12, 8 pages.
Office Action in Chinese Application No. 201910696125.5, dated Nov. 17, 2020, 11 pages.
PCT International Search Report and Written Opinion in International Application No. PCT/CN2019/119441, dated Feb. 12, 2020, 15 pages.
LG Electronics, "Padding for LDPC," 3GPP TSG RAN WG1 #90, R1-1713208, Prague, Czechia, Aug. 21-25, 2017, 2 pages.
Extended European Search Report issued in European Application No. 19887628.6 on Dec. 23, 2021, 11 pages.
MediaTek Inc., "Switching Time for NR UL and NR SUL with MIMO Transmissions," 3GPP TSG-RAN WG4 Meeting #87, R4-1806546, Busan, Korea, May 21-25, 2018, 2 pages.
Nokia, Nokia Shanghai Bell, "Uplink Tx switching between 1Tx and 2Tx carriers," 3GPP TSG RAN WG1 Meeting #98bis, R1-1911204, Chongqing, P.R. China, Oct. 14-20, 2019, 7 pages.
Nokia, Nokia Shanghai Bell, "Finalizing SUL specifications," 3GPP TSG RAN WG4 #89, R4-1814998, Spokane, USA, Nov. 12-16, 2018, 6 pages.
Office Action issued in Japanese Application No. 2021-527964 on Jul. 11, 2022, 7 pages (with English translation).
1 Office Action issued in Chinese Application No. 201910696125.5 on Nov. 23, 2021, 4 pages.
Office Action in Chinese Appln. No. 202010366432.X, dated Dec. 13, 2022, 8 pages.
Office Action in Chinese Appln. No. 202010368202.7, dated Dec. 14, 2022, 10 pages.
3GPP Ts 38.331 V15.3.0, "3rd Generation Partnership Project; Technical Specification Group Radio Access Network; NR; Radio Resource Control (RRC) protocol specification (Release 15)," Sep. 2018, 445 pages.
3GPP Ts 38.213 V15.3.0, "3rd Generation Partnership Project; Technical Specification Group Radio Access Network; NR; Physical layer procedures for control (Release 15)," Sep. 2018, 101 pages.
3GPP Ts 36.133 V15.4.0, "3rd Generation Partnership Project; Technical Specification Group Radio Access Network; Evolved Universal Terrestrial Radio Access (E-UTRA); Requirements for support of radio resource management (Release 15)," Sep. 2018, 2973 pages.
3GPP Ts 38.133 V15.3.0, "3rd Generation Partnership Project; Technical Specification Group Radio Access Network; NR; Requirements for support of radio resource management (Release 15)," Sep. 2018, 136 pages.

(56) References Cited

OTHER PUBLICATIONS

3GPP Ts 38.101-3 V15.3.0, "3rd Generation Partnership Project; Technical Specification Group Radio Access Network; NR; User Equipment (UE) radio transmission and reception; Part 3: Range 1 and Range 2 Interworking operation with other radios (Release 15)," Sep. 2018, 196 pages.

3GPP Ts 38.101-1 V15.3.0, "3rd Generation Partnership Project; Technical Specification Group Radio Access Network; NR; User Equipment (UE) radio transmission and reception; Part 1: Range 1 Standalone (Release 15)," Sep. 2018, 219 pages.

3GPP Ts 38.214 V15.3.0, "3rd Generation Partnership Project; Technical Specification Group Radio Access Network; NR; Physical layer procedures for data (Release 15)," Sep. 2018, 96 pages.

3GPP Ts 38.306 V15.3.0, "3rd Generation Partnership Project; Technical Specification Group Radio Access Network; NR; User Equipment (UE) radio access capabilities (Release 15)," Sep. 2018, 31 pages.

3GPP Ts 38.331 V15.5.0, "3rd Generation Partnership Project; Technical Specification Group Radio Access Network; NR; Radio Resource Control (RRC) protocol specification (Release 15)," Mar. 2019, 491 pages.

3GPP Ts 38.306 V15.5.0, "3rd Generation Partnership Project; Technical Specification Group Radio Access Network; NR; User Equipment (UE) radio access capabilities (Release 15)," Mar. 2019, 49 pages.

\* cited by examiner

| NUL subcarrier spacing: 30 kHz | 0 | 1 | 2 | 3 | 4 | 5 | 6 | 7 | 8 | 9 |
|---|---|---|---|---|---|---|---|---|---|---|
| | D | D | D | D | D | D | D | S | U | U |
| SUL subcarrier spacing: 15 kHz | U | | U | | U | | U | | U | |
| | 0 | | 1 | | 2 | | 3 | | 4 | |

PUSCH time
domain resource

| NUL subcarrier spacing: 30 kHz | 0 | 1 | 2 | 3 | 4 | 5 | 6 | 7 | 8 | 9 |
|---|---|---|---|---|---|---|---|---|---|---|
| | D | D | D | S | U | D | D | D | S | U |
| SUL subcarrier spacing: 15 kHz | U | | U | | U | | U | | U | |
| | 0 | | 1 | | 2 | | 3 | | 4 | |

PUSCH time
domain resource

| NUL subcarrier spacing: 30 kHz | 0 | 1 | 2 | 3 | 4 | 5 | 6 | 7 | 8 | 9 |
|---|---|---|---|---|---|---|---|---|---|---|
| | D | D | D | S | U | D | D | S | U | U |
| SUL subcarrier spacing: 15 kHz | U | | U | | U | | U | | U | |
| | 0 | | 1 | | 2 | | 3 | | 4 | |
PUSCH time
domain resource
FIG. 5C
| NUL subcarrier spacing: 30 kHz | 0 | 1 | 2 | 3 | 4 | 5 | 6 | 7 |
|---|---|---|---|---|---|---|---|---|
| | D | D | S | U | D | D | S | U |
| SUL subcarrier spacing: 15 kHz | U | | U | | U | | U | |
| | 0 | | 1 | | 2 | | 3 | |
NUL PUSCH time
domain resource
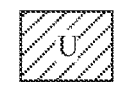
SUL PUSCH time
domain resource
FIG. 5D

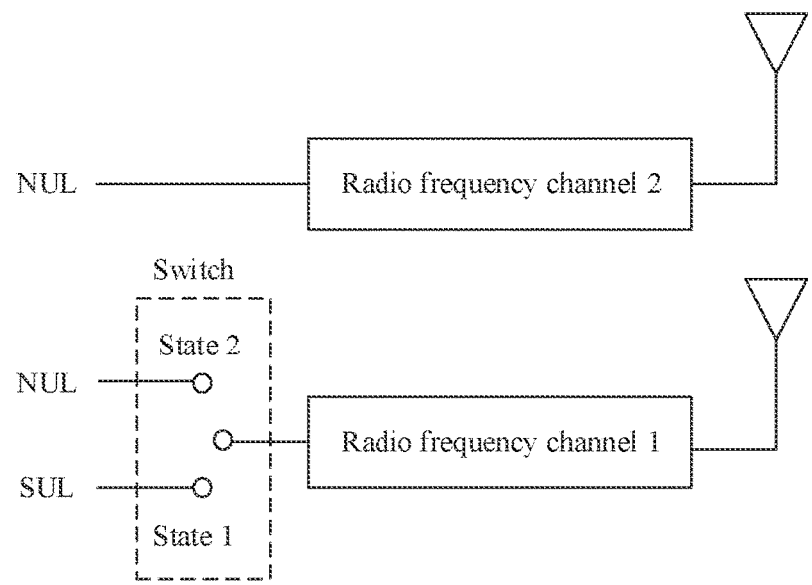

| NUL subcarrier spacing: 30 kHz | 0 | 1 | 2 | 3 | 4 | 5 | 6 | 7 | 8 | 9 |
|---|---|---|---|---|---|---|---|---|---|---|
| | D | D | D | S | U | D | D | D | S | U |
| SUL subcarrier spacing: 15 kHz | U | U | U | U | U |
|---|---|---|---|---|---|
| | 0 | 1 | 2 | 3 | 4 |
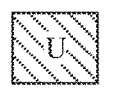  
PUSCH time domain resource     SRS time domain resource     Silent time domain resource
FIG. 9B
| NUL subcarrier spacing: 30 kHz | 0 | 1 | 2 | 3 | 4 | 5 | 6 | 7 | 8 | 9 |
|---|---|---|---|---|---|---|---|---|---|---|
| | D | D | D | S | U | D | D | S | U | U |
| SUL subcarrier spacing: 15 kHz | U | U | U | U | U |
|---|---|---|---|---|---|
| | 0 | 1 | 2 | 3 | 4 |
 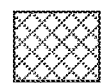 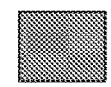 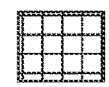
PUSCH time domain resource     SRS time domain resource     Silent time domain resource     PUCCH time domain resource
FIG. 9C

| Primary-cell TDD subcarrier spacing: 30 kHz | 0 | 1 | 2 | 3 | 4 | 5 | 6 | 7 | 8 | 9 |
|---|---|---|---|---|---|---|---|---|---|---|
| | D | D | D | D | D | D | D | S | U | U |
| Secondary-cell TDD subcarrier spacing: 15 kHz | D | | S | | U | | D | | D | |
| | 0 | | 1 | | 2 | | 3 | | 4 | |
Silent time
domain resource
FIG. 13A
| Primary-cell TDD subcarrier spacing: 30 kHz | 0 | 1 | 2 | 3 | 4 | 5 | 6 | 7 | 8 | 9 |
|---|---|---|---|---|---|---|---|---|---|---|
| | D | D | D | S | U | D | D | D | S | U |
| Secondary-cell TDD subcarrier spacing: 15 kHz | D | | S | | U | | D | | D | |
| | 0 | | 1 | | 2 | | 3 | | 4 | |
                              
PUCCH time                                     Silent time
domain resource                               domain resource
FIG. 13B

UPLINK SWITCHING METHOD, COMMUNICATION APPARATUS, AND COMMUNICATION SYSTEM

CROSS-REFERENCE TO RELATED APPLICATIONS

This application is a continuation of International Application No. PCT/CN2019/119441, filed on Nov. 19, 2019, which claims priority to Chinese Patent Application No. 201811379402.1, filed on Nov. 19, 2018. The disclosures of the aforementioned applications are hereby incorporated by reference in their entireties.

TECHNICAL FIELD

This application relates to the field of wireless communication technologies, and in particular, to an uplink switching method, a communication apparatus, and a communication system.

BACKGROUND

With development of wireless communication technologies, a mobile communication network gradually evolves to a 5G network, to be specific, an NR (New Radio, new radio) network, and a terminal imposes higher requirements on both downlink transmission performance and uplink transmission performance.

An access network device may communicate with a terminal using TDD. In an actual network, because there is a relatively large amount of downlink data, a relatively large quantity of downlink time domain resources are usually allocated to a terminal, and a relatively small quantity of uplink time domain resources are allocated to the terminal. Limited uplink time domain resources cause relatively poor uplink transmission performance.

Therefore, how to improve uplink transmission performance is an urgent problem to be resolved.

SUMMARY

Embodiments of this application provide an uplink switching method, a communication apparatus, and a communication system, to implement switching between an SUL and an NUL, and improve uplink transmission performance.

According to a first aspect, an embodiment of this application provides an uplink switching method. The uplink switching method may be applied to a terminal or a chip in a terminal.

The method includes: performing transmission with an access network device on a supplementary uplink SUL; and performing transmission with the access network device on a normal uplink NUL; wherein switching is performed between the SUL and the NUL, and a switching time period for the switching between the SUL and the NUL is longer than 0 microseconds.

In the method, the switching time period for the switching between the SUL and the NUL is longer than 0 microseconds. Therefore, the SUL and the NUL can share a radio frequency channel, so that the shared radio frequency channel can be switched between the SUL and the NUL, thereby improving utilization of the radio frequency channel, and improving uplink transmission performance.

Optionally, the method further includes: sending switching time period information to the access network device, where the switching time period information indicates the switching time period for the switching between the SUL and the NUL.

The terminal reports the switching time period information, so that the terminal can report the switching time period based on a switching capability of the terminal. The access network device can determine, based on the switching time period reported by the terminal, a time domain resource used by the terminal to perform switching, to flexibly determine a silent time domain resource.

Optionally, the switching between the SUL and the NUL includes switching from the SUL to the NUL, and the switching time period for the switching between the SUL and the NUL includes a time period for the switching from the SUL to the NUL.

Optionally, the switching time period information is used to determine a first silent time domain resource. A length of the first silent time domain resource is greater than or equal to a length of the time period for the switching from the SUL to the NUL, a preceding symbol adjacent to the first silent time domain resource belongs to a transmission time domain resource of the SUL, and a subsequent symbol adjacent to the first silent time domain resource belongs to a transmission time domain resource of the NUL.

When it is determined that the length of the first silent time domain resource is greater than or equal to the length of the time period for the switching from the SUL to the NUL, it can be ensured that the switching is successfully performed from the SUL to the NUL, thereby avoiding a switching failure and avoiding impact on uplink transmission performance.

Optionally, the switching from the SUL to the NUL includes: switching a radio frequency channel from the SUL to the NUL within duration of the first silent time domain resource.

Optionally, the switching between the SUL and the NUL includes switching from the NUL to the SUL, and the switching time period for the switching between the SUL and the NUL includes a time period for the switching from the NUL to the SUL.

Optionally, the switching time period information is used to determine a second silent time domain resource. A length of the second silent time domain resource is greater than or equal to a length of the time period for the switching from the NUL to the SUL, a preceding symbol adjacent to the second silent time domain resource belongs to a transmission time domain resource of the NUL, and a subsequent symbol adjacent to the second silent time domain resource belongs to a transmission time domain resource of the SUL.

Optionally, the switching from the NUL to the SUL includes: switching a radio frequency channel from the NUL to the SUL within duration of the second silent time domain resource.

Optionally, the transmission time domain resource of the SUL includes an SUL PUSCH time domain resource, the transmission time domain resource of the NUL includes an NUL PUSCH time domain resource, and the method further includes: receiving TDD time domain resource allocation information from the access network device, where the TDD time domain resource allocation information indicates one or more of a TDD uplink time domain resource, a TDD downlink time domain resource, and a TDD flexible time domain resource: receiving NUL PUSCH time domain resource allocation information from the access network device, where the NUL PUSCH time domain resource allocation information indicates that a part or all of the TDD uplink time domain resource is the NUL PUSCH time domain resource: and receiving SUL PUSCH time domain resource allocation information from the access network device, where the SUL PUSCH time domain resource allocation information indicates that a part or all of the TDD flexible time domain resource and the TDD downlink time domain resource is the SUL PUSCH time domain resource.

Optionally, the transmission time domain resource of the SUL includes an SUL SRS time domain resource, the transmission time domain resource of the NUL includes an NUL SRS time domain resource, and the method further includes: receiving NUL SRS time domain resource allocation information from the access network device, where the NUL SRS time domain resource allocation information indicates that a part or all of the TDD uplink time domain resource and the TDD flexible time domain resource is the NUL SRS time domain resource; and receiving SUL SRS time domain resource allocation information from the access network device, where the SUL SRS time domain resource allocation information indicates that a part or all of the TDD downlink time domain resource and the TDD flexible time domain resource is the SUL SRS time domain resource.

Optionally, the transmission time domain resource of the NUL includes an NUL PUCCH time domain resource, and the method further includes: receiving NUL PUCCH time domain resource allocation information from the access network device, where the NUL PUCCH time domain resource allocation information indicates that a part or all of the TDD uplink time domain resource is the NUL PUCCH time domain resource: or the transmission time domain resource of the SUL includes an SUL PUCCH time domain resource, and the method further includes: receiving SUL PUCCH time domain resource allocation information from the access network device, where the SUL PUCCH time domain resource allocation information indicates that a part or all of the TDD downlink time domain resource and the TDD flexible time domain resource is the SUL PUCCH time domain resource.

According to a second aspect, an embodiment of this application provides another uplink switching method. The method includes: performing transmission with a terminal on a supplementary uplink SUL: and performing transmission with the terminal on a normal uplink NUL, where a switching time period for switching between the SUL and the NUL is longer than 0 microseconds.

Optionally, the method further includes: receiving switching time period information from the terminal, where the switching time period information indicates the switching time period for the switching between the SUL and the NUL.

Optionally, the switching time period for the switching between the SUL and the NUL includes a time period for switching from the SUL to the NUL.

Optionally, the method further includes: determining a first silent time domain resource based on the switching time period information, where a length of the first silent time domain resource is greater than or equal to a length of the time period for the switching from the SUL to the NUL, a preceding symbol adjacent to the first silent time domain resource belongs to a transmission time domain resource of the SUL, and a subsequent symbol adjacent to the first silent time domain resource belongs to a transmission time domain resource of the NUL.

Optionally, the method further includes, keeping silent within duration of the first silent time domain resource.

Optionally, the switching time period for the switching between the SUL and the NUL includes a time period for switching from the NUL to the SUL.

Optionally, the method further includes: determining a second silent time domain resource based on the switching time period information, where a length of the second silent time domain resource is greater than or equal to a length of the time period for the switching from the NUL to the SUL, a preceding symbol adjacent to the second silent time domain resource belongs to a transmission time domain resource of the NUL, and a subsequent symbol adjacent to the second silent time domain resource belongs to a transmission time domain resource of the SUL.

Optionally, the method further includes: keeping silent within duration of the second silent time domain resource.

Optionally, the transmission time domain resource of the SUL includes an SUL PUSCH time domain resource, the transmission time domain resource of the NUL includes an NUL PUSCH time domain resource, and the method further includes: sending TDD time domain resource allocation information to the terminal, where the TDD time domain resource allocation information indicates one or more of a TDD uplink time domain resource, a TDD downlink time domain resource, and a TDD flexible time domain resource; sending NUL PUSCH time domain resource allocation information to the terminal, where the NUL PUSCH time domain resource allocation information indicates that a part or all of the TDD uplink time domain resource is the NUL PUSCH time domain resource; and sending SUL PUSCH time domain resource allocation information to the terminal, where the SUL PUSCH time domain resource allocation information indicates that a part or all of the TDD flexible time domain resource and the TDD downlink time domain resource is the SUL PUSCH time domain resource.

Optionally, the transmission time domain resource of the SUL includes an SUL SRS time domain resource, the transmission time domain resource of the NUL includes an NUL SRS time domain resource, and the method further includes: sending NUL SRS time domain resource allocation information to the terminal, where the NUL SRS time domain resource allocation information indicates that a part or all of the TDD uplink time domain resource and the TDD flexible time domain resource is the NUL SRS time domain resource; and sending SUL SRS time domain resource allocation information to the terminal, where the SUL SRS time domain resource allocation information indicates that a part or all of the TDD downlink time domain resource and the TDD flexible time domain resource is the SUL SRS time domain resource.

Optionally, the transmission time domain resource of the NUL includes an NUL PUCCH time domain resource, and the method further includes: sending NUL PUCCH time domain resource allocation information to the terminal, where the NUL PUCCH time domain resource allocation information indicates that a part or all of the TDD uplink time domain resource is the NUL PUCCH time domain resource.

Alternatively, the transmission time domain resource of the SUL includes an SUL PUCCH time domain resource, and the method further includes: sending SUL PUCCH time domain resource allocation information to the terminal, where the SUL PUCCH time domain resource allocation information indicates that a part or all of the TDD downlink time domain resource and the TDD flexible time domain resource is the SUL PUCCH time domain resource.

Optionally, a quantity of MIMO layers supported by the SUL is 1, and a quantity of MIMO layers supported by the NUL is 2.

According to a third aspect, an embodiment of this application provides an uplink transmission method. A first uplink carrier and a second uplink carrier are configured for a terminal, and the method includes: receiving first time domain resource allocation information from an access network device, where the first time domain resource allocation information indicates one or more of a first uplink time domain resource, a first downlink time domain resource, and a first flexible time domain resource; receiving first PUSCH time domain resource allocation information from the access network device, where the first PUSCH time domain resource allocation information indicates that a part or all of the first uplink time domain resource is a first PUSCH time domain resource: receiving second PUSCH time domain resource allocation information from the access network device, where the second PUSCH time domain resource allocation information indicates that a part or all of the first flexible time domain resource and the first downlink time domain resource is a second PUSCH time domain resource; sending, on the first PUSCH time domain resource, uplink data to the access network device on the first uplink carrier; and sending, on the second PUSCH time domain resource, uplink data to the access network device on the second uplink carrier, where when the uplink data is sent to the access network device on the second PUSCH time domain resource on the second uplink carrier, the terminal is within coverage of the first uplink carrier.

Optionally, the method further includes: sending switching time period information to the access network device, where the switching time period information is used to indicate a switching time period for switching between the first uplink carrier and the second uplink carrier; and completing the switching between the first uplink carrier and the second uplink carrier within duration of a silent time domain resource.

A length of the silent time domain resource is greater than or equal to a length of the switching time period. A preceding symbol of the silent time domain resource is a first transmission time domain resource, and a subsequent symbol of the silent time domain resource is a second transmission time domain resource; or a preceding symbol of the silent time domain resource is a second transmission time domain resource, and a subsequent symbol of the silent time domain resource is a first transmission time domain resource. The first transmission time domain resource includes a first PUSCH time domain resource, and the second transmission time domain resource includes a second PUSCH time domain resource.

Optionally, the first uplink carrier is an NUL uplink carrier, and the second uplink carrier is an SUL uplink carrier.

Optionally, the first uplink carrier is a primary-cell uplink carrier, and the second uplink carrier is a secondary-cell uplink carrier.

According to a fourth aspect, an embodiment of this application provides a communication apparatus. The communication apparatus may be a terminal or a chip in a terminal. The communication apparatus includes a processor, and the processor is coupled to a memory. The memory is configured to store a computer program or instructions. The processor is configured to execute the computer program or the instructions in the memory, so that the communication apparatus performs the method according to the first aspect or the third aspect. Optionally, the communication apparatus further includes the memory.

According to a fifth aspect, an embodiment of this application provides a communication apparatus. The communication apparatus may be an access network device or a chip in an access network device. The communication apparatus includes a processor, and the processor is coupled to a memory. The memory is configured to store a computer program or instructions. The processor is configured to execute the computer program or the instructions in the memory, so that the communication apparatus performs the method according to the second aspect. Optionally, the communication apparatus further includes the memory.

According to a sixth aspect, an embodiment of this application provides a communication apparatus. The communication apparatus includes one or more modules, configured to implement the method according to the first aspect or the third aspect. The one or more modules may correspond to the steps in the method according to the first aspect or the third aspect.

According to a seventh aspect, an embodiment of this application provides a communication apparatus. The communication apparatus includes one or more modules, configured to implement the method according to the second aspect. The one or more modules may correspond to the steps in the method according to the second aspect.

According to an eighth aspect, an embodiment of this application provides a computer storage medium. The storage medium is configured to store a computer program or instructions. When the program is run on a computer, the computer is enabled to perform the method according to the first aspect, the second aspect, or the third aspect.

According to a ninth aspect, an embodiment of this application provides a computer program product. The program product includes a program. When the program is run, the method according to the first aspect, the second aspect, or the third aspect is performed.

According to a tenth aspect, an embodiment of this application provides a communication system. The communication system includes the communication apparatus according to the first aspect and the communication apparatus according to the second aspect.

BRIEF DESCRIPTION OF DRAWINGS

To describe this application more clearly, the following briefly describes the accompanying drawings used in describing the embodiments. It is clearly that, the accompanying drawings in the following description show merely some embodiments of the present invention, and a person of ordinary skill in the art may derive other drawings from these accompanying drawings without creative efforts.

FIG. 5C is a schematic diagram of another uplink transmission method according to an embodiment of this application;

FIG. 5D is a schematic diagram of another uplink transmission method according to an embodiment of this application;

FIG. 8 is a schematic diagram of a radio frequency channel according to an embodiment of this application;

FIG. 9A is a schematic diagram of another uplink switching method according to an embodiment of this application;

FIG. 9B is a schematic diagram of another uplink switching method according to an embodiment of this application;

FIG. 9C is a schematic diagram of another uplink switching method according to an embodiment of this application;

FIG. 13A is a schematic diagram of another uplink transmission method according to an embodiment of this application:

FIG. 13B is a schematic diagram of another uplink transmission method according to an embodiment of this application:

DESCRIPTION OF EMBODIMENTS

The following describes technical solutions in this application with reference to the accompanying drawings.

Figure 1:
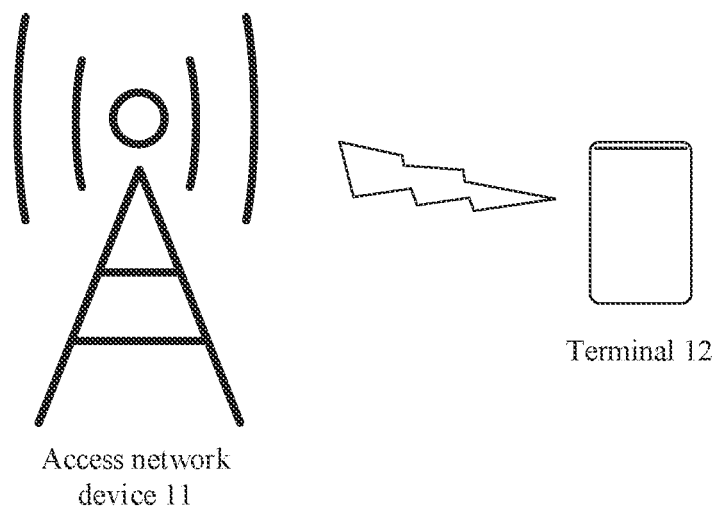
FIG. 1 is a schematic diagram of a communication system according to an embodiment of this application.

An embodiment of the present invention provides a communication system. The communication system includes an access network device and at least one terminal. The at least one terminal and the access network device may perform wireless communication. FIG. 1 is a schematic diagram of the communication system according to an embodiment of this application. As shown in FIG. 1, the access network device includes an access network device 11, the at least one terminal includes a terminal 12, and the access network device 11 and the terminal 12 may perform wireless communication. It should be noted that the access network device and the terminal included in the communication system shown in FIG. 1 are merely examples. In the embodiments of the present invention, a quantity of network elements included in the communication system, types of the network elements, and a connection relationship between the network elements are not limited thereto.

In the embodiments of this application, the communication system may be a communication system that supports a fourth generation (fourth generation, 4G) access technology, for example, a long term evolution (long term evolution, LTE) access technology. The communication system may alternatively be a communication system that supports a fifth generation (fifth generation, 5G) access technology, for example, a new radio (new radio, NR) access technology. The communication system may alternatively be a communication system that supports a third generation (third generation, 3G) access technology, for example, a universal mobile telecommunications system (UMTS) access technology. The communication system may alternatively be a communication system that supports a plurality of wireless technologies, for example, a communication system that supports an LTE technology and an NR technology. In addition, the communication system is further applicable to future-oriented communication technologies.

The access network device in the embodiments of this application may be a device that is on an access network side and that is configured to support a terminal in accessing a communication system, for example, a base transceiver station (base transceiver station, BTS) and a base station controller (base station controller, BSC) in a 2G access technology communications system, a NodeB (node B) and a radio network controller (radio network controller, RNC) in a 3G access technology communications system, an evolved NodeB (evolved nodeB, eNB) in a 4G access technology communications system, a next generation NodeB (next generation nodeB, gNB) in a 5G access technology communications system, a transmission reception point (transmission reception point. TRP), a relay node (relay node), or an access point (access point, AP).

The terminal in the embodiments of this application may be a device that provides voice or data connectivity for a user, and may also be referred to as, for example, user equipment (user equipment, UE), a mobile station (mobile station), a subscriber unit (subscriber unit), a station (station), or terminal equipment (terminal equipment, TE). The terminal may be a cellular phone (cellular phone), a personal digital assistant (personal digital assistant, PDA), a wireless modem (modem), a handheld (handheld) device, a laptop computer (laptop computer), a cordless phone (cordless phone), a wireless local loop (wireless local loop. WALL) station, a tablet computer (pad), or the like. With development of wireless communication technologies, any device that can access a wireless communication network, communicate with a network side of a communication system, or communicate with another object by using a communication network may be the terminal in the embodiments of this application, such as a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. In the embodiments of this application, the terminal may communicate with an access network device, for example, the access network device 11.

Figure 2A:
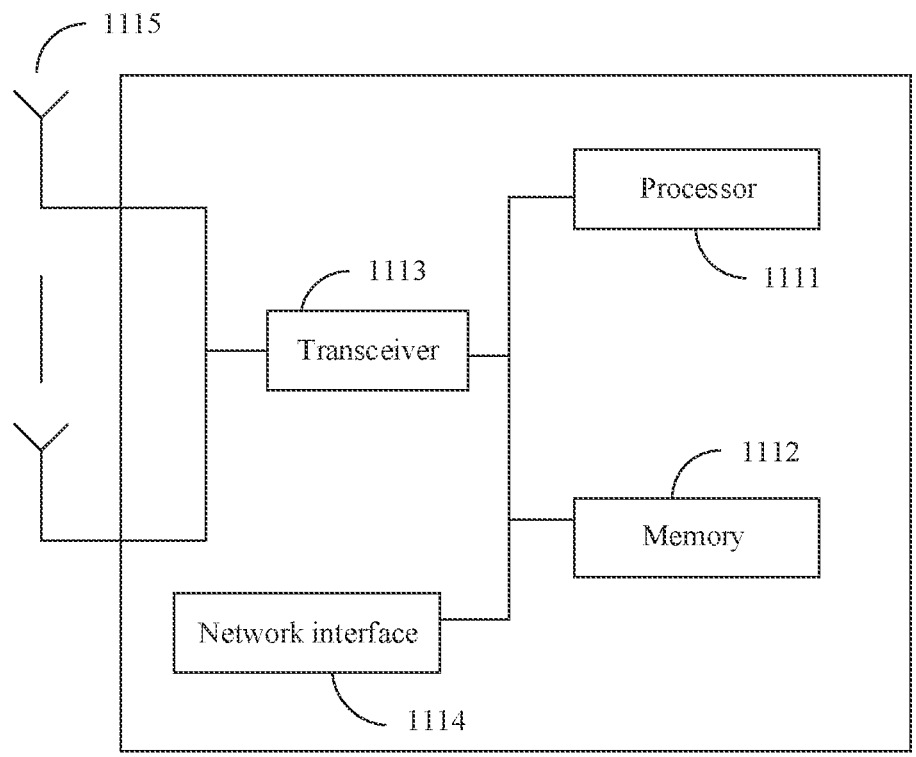
FIG. 2A is a schematic structural diagram of an access network device according to an embodiment of this application.

FIG. 2A is a schematic structural diagram of an access network device. For a structure of the access network device 11, refer to the structure shown in FIG. 2A.

The access network device includes at least one processor 1111, at least one memory 1112, at least one transceiver 1113, at least one network interface 1114, and one or more antennas 1115. The processor 1111, the memory 1112, the transceiver 1113, and the network interface 1114 are connected by using, for example, a bus. The antenna 1115 is connected to the transceiver 1113. The network interface 1114 is configured to enable the access network device to be connected to another communication device through a communication link. For example, the access network device is connected to a core network element through an SI interface. In this embodiment of this application, the connection may include various types of interfaces, transmission lines, buses, or the like. This is not limited in this embodiment.

In this embodiment of this application, the processor such as the processor 1111 may include at least one of the following types: a general-purpose central processing unit (Central Processing Unit, CPU), a digital signal processor (Digital Signal Processor. DSP), a microprocessor, an application-specific integrated circuit (Application-Specific Integrated Circuit, ASIC), a microcontroller unit (Microcontroller Unit. MCU), a field programmable gate array (Field Programmable Gate Array, FPGA), or an integrated circuit configured to implement a logical operation. For example, the processor 1111 may be a single-core (single-CPU) processor or a multi-core (multi-CPU) processor. The at least one processor 1111 may be integrated into one chip or located on a plurality of different chips.

In this embodiment of this application, the memory such as the memory 1112 may include at least one of the following types: a read-only memory (read-only memory, ROM) or another type of static storage device that can store static information and static instructions, a random access memory (random access memory, RAM) or another type of dynamic storage device that can store information and instructions, or an electrically erasable programmable read-only memory (Electrically erasable programmable read-only memory, EEPROM). In some scenarios, the memory may alternatively be a compact disc read-only memory (compact disc read-only memory. CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited herein.

The memory 1112 may exist independently, and is connected to the processor 1111. Optionally, the memory 1112 and the processor 1111 may alternatively be integrated together, for example, integrated into a chip. The memory 1112 can store program code for executing the technical solutions in the embodiments of this application, and the processor 1111 controls execution of the program code. Various types of executed computer program code may also be considered as drivers of the processor 1111. For example, the processor 1111 is configured to execute the computer program code stored in the memory 1112, to implement the technical solutions in the embodiments of this application.

The transceiver 1113 may be configured to support receiving or sending of a radio frequency signal between the access network device and a terminal, and the transceiver 1113 may be connected to the antenna 1115. Specifically, the one or more antennas 1115 may receive a radio frequency signal. The transceiver 1113 may be configured to: receive the radio frequency signal from the antennas, convert the radio frequency signal into a digital baseband signal or a digital intermediate frequency signal, and provide the digital baseband signal or the digital intermediate frequency signal for the processor 1111, so that the processor 1111 further processes the digital baseband signal or the digital intermediate frequency signal, for example, performs demodulation processing and decoding processing. In addition, the transceiver 1113 may be configured to: receive a modulated digital baseband signal or digital intermediate frequency signal from the processor 1111, convert the modulated digital baseband signal or digital intermediate frequency signal into a radio frequency signal, and send the radio frequency signal through the one or more antennas 1115. Specifically, the transceiver 1113 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 1113 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal. The transceiver may be referred to as a transceiver circuit, a transceiver unit, a transceiver component, a sending circuit, a sending unit, a sending component, or the like.

Figure 2B:
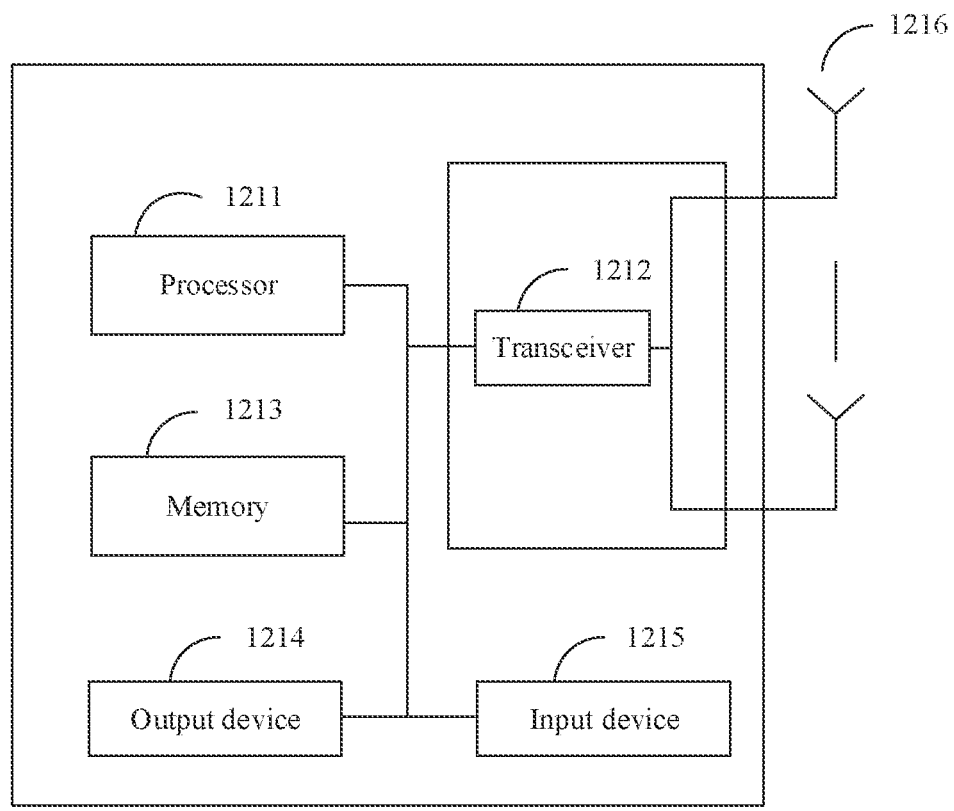
FIG. 2B is a schematic structural diagram of a terminal according to an embodiment of this application.

FIG. 2B is a schematic structural diagram of a terminal according to an embodiment of this application. For a structure of the terminal 12, refer to the structure shown in FIG. 2B.

The terminal includes at least one processor 1211, at least one transceiver 1212, and at least one memory 1213. The processor 1211, the memory 1213, and the transceiver 1212 are connected. Optionally, the terminal 12 may further include an output device 1214, an input device 1215, and one or more antennas 1216. The antenna 1216 is connected to the transceiver 1212, and the output device 1214 and the input device 1215 are connected to the processor 1211.

For the transceiver 1212, the memory 1213, and the antenna 1216, refer to the related descriptions in FIG. 2A, to implement a similar function.

The processor 1211 may be a baseband processor, or may be a CPU. The baseband processor and the CPU may be integrated or separated.

The processor 1211 may be configured to implement various functions for the terminal, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (Liquid Crystal Display, LCD), a light emitting diode (Light Emitting Diode, LED) display device, a cathode ray tube (Cathode Ray Tube, CRT) display device, or a projector (projector). The input device 1215 communicates with the processor 1211, and may receive an input of a user in a plurality of manners. For example, the input device 1215 may be a mouse, a keyboard, a touchscreen device, or a sensing device.

For ease of understanding of the embodiments of this application, related terms used in this specification are first briefly described.

1. A time domain resource is a resource in time domain. The time domain resource may be an uplink time domain resource, a downlink time domain resource, or a flexible time domain resource. In NR, there may be at least three time domain resource configuration modes, for example, a cell-specific semi-static configuration mode, a UE-specific semi-static configuration mode, and a UE-specific dynamic configuration mode.

2. A flexible time domain resource may be understood as a time domain resource that is not configured as an uplink time domain resource or a downlink time domain resource, and the flexible time domain resource may be used as a guard period (guard period. GP) between the uplink time domain resource and the downlink time domain resource. The flexible time domain resource may be further configured as an uplink time domain resource or a downlink time domain resource. In NR, in a cell-specific semi-static configuration mode, an uplink time domain resource, a downlink time domain resource, and a flexible time domain resource may be configured for a terminal in a cell by using a cell-specific RRC message. In a UE-specific semi-static configuration mode, the flexible time domain resource configured in the cell-specific semi-static configuration mode may be configured as an uplink time domain resource or a downlink time domain resource for a terminal by using a UE-specific RRC message, or is not configured (in this case, it may be understood as that the flexible time domain resource is still configured as a flexible time domain resource in the UE-specific semi-static configuration mode). In a UE-specific dynamic configuration mode, the flexible time domain resource configured in the cell-specific semi-static configuration mode or the UE-specific semi-static configuration mode may be configured as an uplink time domain resource or a downlink time domain resource for a terminal by using DCI, or is not configured (in this case, it may be understood as that the flexible time domain resource is still configured as a flexible time domain resource in the UE-specific dynamic configuration mode). The flexible time domain resource may be referred to as an unknown (unknown) time domain resource.

3. A transmission time domain resource may be understood as a time domain resource that is configured for transmission. Herein, the transmission may include uplink transmission and downlink transmission. For example, the uplink transmission may include transmission of one or more of a channel sounding reference signal (sounding reference signal, SRS), a physical uplink shared channel (physical uplink shared channel, PUSCH), and a physical uplink control channel (physical uplink control channel, PUCCH). After a time domain resource is configured as an uplink time domain resource or a flexible time domain resource, the uplink time domain resource or the flexible time domain resource may be further configured for uplink transmission. For example, an uplink transmission time domain resource may be configured as a PUSCH time domain resource, an SRS time domain resource, or a PUCCH time domain resource, and a flexible time domain resource may be configured as an SRS time domain resource.

4. A slot (slot) is a minimum scheduling unit of a time domain resource. In NR, a slot in a format may include 14 OFDM symbols, and a CP of each OFDM symbol is a normal CP: a slot in a format may include 12 OFDM symbols, and a CP of each OFDM symbol is an extended CP: or a slot in a format may include seven OFDM symbols, and a CP of each OFDM symbol is a normal CP. OFDM symbols in one slot may be all used for uplink transmission, or may be all used for downlink transmission. Alternatively, a part of OFDM symbols in one slot may be used for downlink transmission, a part of OFDM symbols may be used for uplink transmission, and a part of OFDM symbols may be reserved for no transmission. It should be understood that the foregoing examples are merely examples for description, and shall not constitute any limitation on this application. In consideration of system forward compatibility, a slot format is not limited to the foregoing examples. In NR, based on different subcarrier spacings. 1 ms may include different quantities of slots (slot). For example, when a subcarrier spacing is 15 kHz, 1 ms includes one slot, and the slot occupies 1 ms: when a subcarrier spacing is 30 kHz, 1 ms includes two slots, and each slot occupies 0.5 ms.

5. A symbol (symbol) is a minimum unit of a time domain resource. A time length of one symbol is not limited in the embodiments of this application. The length of one symbol may vary for different subcarrier spacings. Symbols may include an uplink symbol and a downlink symbol. By way of example rather than limitation, the uplink symbol may be referred to as, for example, a single-carrier frequency division multiple access (Single Carrier-Frequency Division Multiple Access. SC-FDMA) symbol or an orthogonal frequency division multiplexing (Orthogonal Frequency Division Multiplexing, OFDM) symbol; and the downlink symbol may be referred to as, for example, an OFDM symbol.

6. Time division duplex (time division duplex, TDD) is a duplex communication technology in a communication system, and is used to separate a receiving channel and a sending channel, that is, an uplink and a downlink. In a communication system using a TDD mode, a same frequency domain resource is used for an uplink and a downlink, and the uplink and the downlink are distinguished by using different time domain resources. In LTE, there are seven types of TDD configurations. One frame includes 10 subframes. D represents a downlink subframe and U represents an uplink subframe, an arrangement order of Ds and Us is fixed in each configuration. In a cell, a TDD configuration may be a semi-static configuration or a static configuration. In NR, TDD may also be referred to as dynamic TDD. A slot is a minimum time unit that can be scheduled. To perform scheduling more flexibly, ratios of different types of slots in each frame may dynamically change, and a quantity of slots included in each frame also varies with a subcarrier spacing. According to different slot types, a slot may be an uplink-only slot, a downlink-only slot, an uplink-dominant (uplink dominated) slot, a downlink-dominant (downlink dominated) slot, or the like. Symbols in the uplink-only slot are all uplink symbols. Symbols in the downlink-only slot are all downlink symbols. A quantity of uplink symbols is greater than a quantity of downlink symbols in the uplink-dominant slot. A quantity of downlink symbols is greater than a quantity of uplink symbols in the downlink-dominant slot. In addition, a guard period may be configured between uplink and downlink symbols.

7. Frequency division duplex (frequency division duplexing, FDD) is a duplex communication technology in a communication system, and is used to separate a receiving channel and a sending channel, that is, an uplink and a downlink. In a communication system using an FDD mode, a same time domain resource is used for an uplink and a downlink, and the uplink and the downlink are distinguished by using different frequency domain resources. For example, an uplink frequency range is different from a downlink frequency range.

In the communication system in FIG. 1, the access network device 11 and the terminal 12 may communicate with each other using TDD, and different time domain resources are used for uplink transmission and downlink transmission. In an actual network, because there is a relatively large amount of downlink data, a relatively large quantity of downlink time domain resources are usually allocated to the terminal 12, and a relatively small quantity of uplink time domain resources are allocated to the terminal 12. Limited uplink time domain resources cause relatively poor uplink transmission performance.

The embodiments of this application provide a solution in which two uplink carriers are configured for the access network device 11 and the terminal 12, and transmission is performed in TDM mode on the two uplink carriers, to improve uplink transmission performance. The solution may be applied to an SUL scenario or a carrier aggregation (carrier aggregation. CA) scenario. In the SUL scenario, the two uplink carriers are an NUL carrier and a supplementary uplink (supplementary uplink, SUL) carrier, and transmission may be performed in time division multiplexing (time division multiplexing, TDM) mode on the NUL and the SUL. In the CA scenario, the two uplink carriers are a primary-cell uplink carrier and a secondary-cell uplink carrier, and transmission may be performed in TDM mode on the primary-cell uplink carrier and the secondary-cell uplink carrier. The solution provided in the embodiments of this application is described below in the SUL scenario and the CA scenario separately.

Sul Scenario

Figure 3:
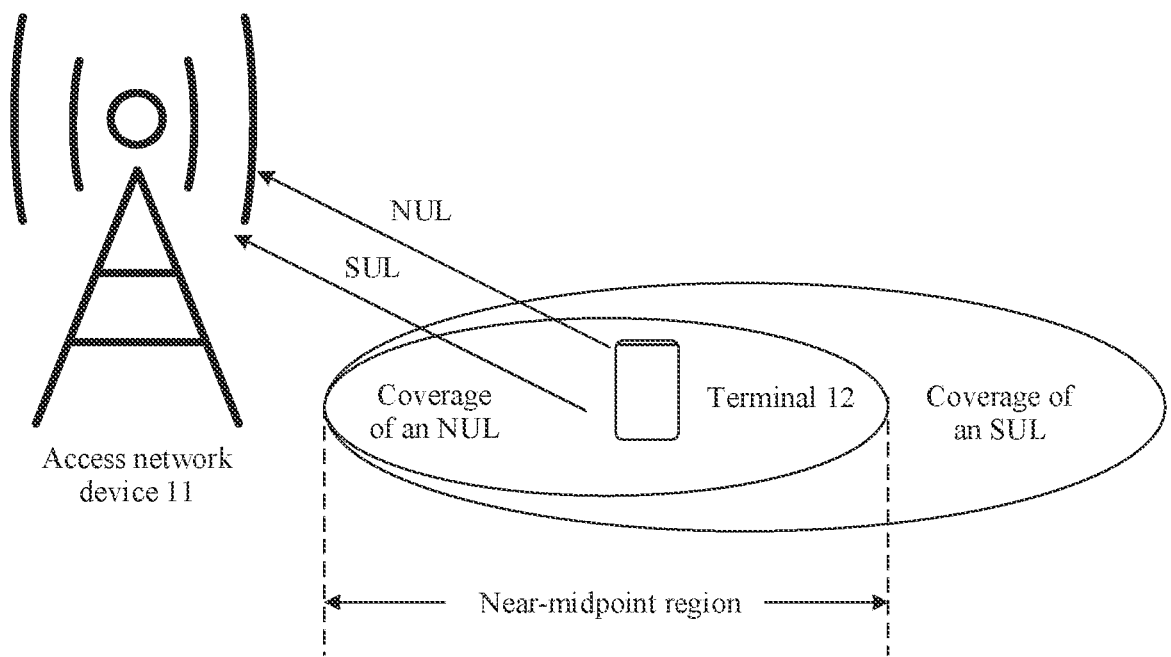
FIG. 3 is a schematic diagram of an SUL scenario according to an embodiment of this application.

FIG. 3 is a schematic diagram of an SUL scenario. A frequency band used for an SUL is lower than a frequency band used for an NUL, and coverage of the SUL is larger than coverage of the NUL. As shown in FIG. 3, a terminal 12 may be located in a near-midpoint region in a cell. That the terminal is located in the near-midpoint region may be understood as that the terminal 12 may be located within both the coverage of the NUL and the coverage of the SUL, or may be understood as that the terminal 12 is located within the coverage of the NUL, or be understood as that a distance between the terminal 12 and an access network device 11 does not exceed a threshold. In the SUL scenario, solutions 1 and 2 may be used. In the solution 1, transmission may be performed in TDM mode on the NUL and the SUL, to increase uplink transmission time domain resources without affecting NUL transmission time domain resources, thereby improving uplink transmission performance. In the solution 2, the SUL and the NUL may share a radio frequency channel, and a switching time period for switching between the SUL and the NUL is longer than 0 microseconds. Therefore, transmission may be performed in TDM mode on the SUL or the NUL by using a relatively large quantity of radio frequency channels, thereby improving uplink transmission performance. The solution 1 may be executed in combination with the solution 2, or the solution 2 and the solution 1 may be executed separately.

Solution 1

Figure 4:
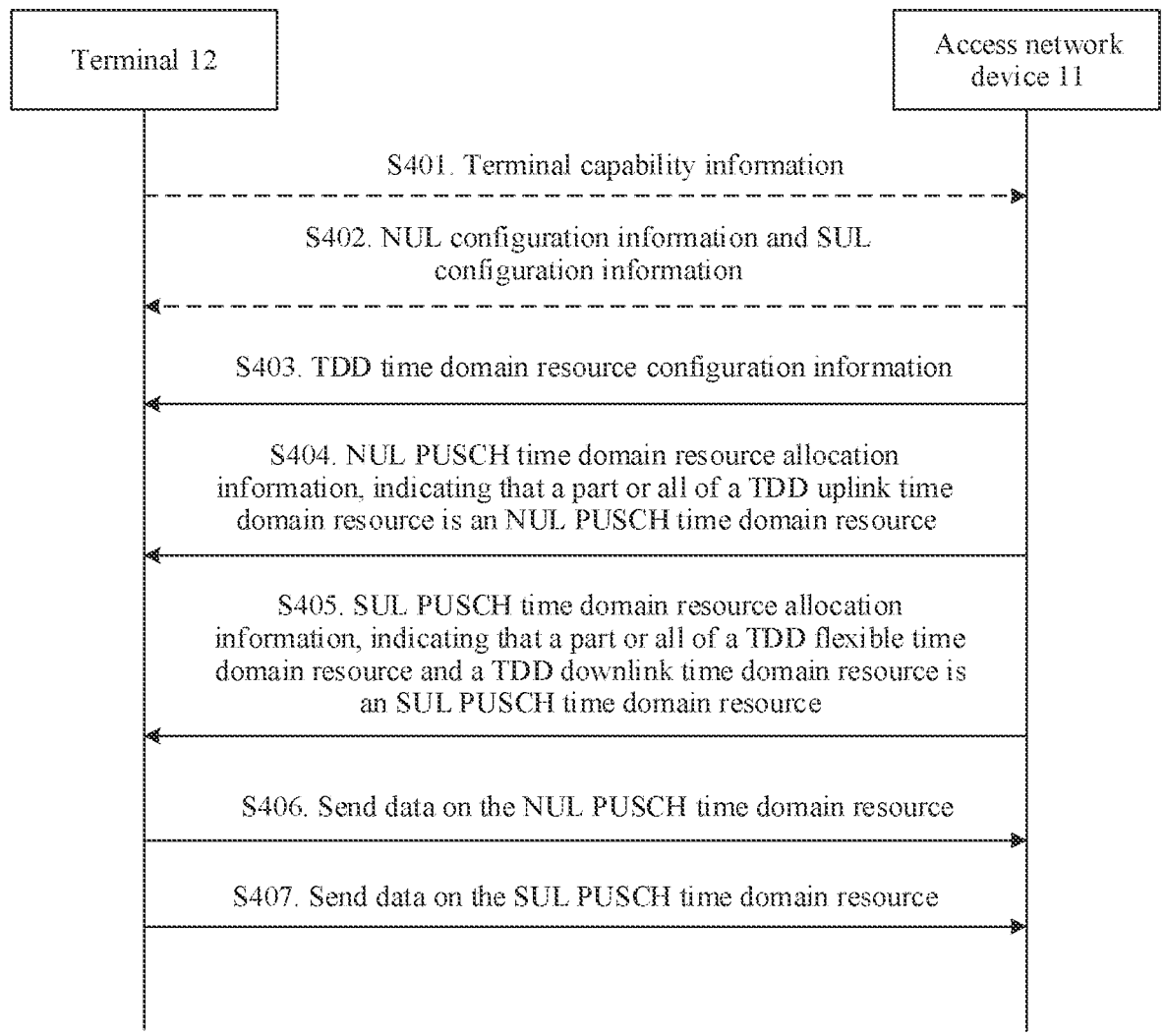
FIG. 4 is a schematic diagram of an uplink transmission method according to an embodiment of this application.

The solution 1 is described below with reference to FIG. 4. FIG. 4 shows an uplink transmission method according to an embodiment of this application. As shown in FIG. 4:

In S401 and S402, a process in which an access network device 11 configures an NUL and an SUL for a terminal 12 is described.

S401. The terminal 12 sends terminal capability information to the access network device 11.

The terminal capability information may include SUL frequency band combination information, a quantity of MIMO layers supported by the SUL, and a quantity of MIMO layers supported by the NUL.

The SUL frequency band combination information may indicate a TDD frequency band and an SUL frequency band that are supported by the terminal 12. The TDD frequency band may be used for the NUL and a DL, and the NUL and the DL are distinguished by using different time domain resources. The SUL frequency band may be used for the SUL. This may be understood as that a time domain resource on the SUL frequency band may be used for the SUL.

For example, the SUL frequency band combination information may indicate that the terminal 12 supports n78 and n80, n78 is a TDD frequency band, and n78 indicates that an NUL frequency band is 3300 MHz to 3800 MHZ and that a DL frequency band is 3300 MHz to 3800 MHz, n80 is an SUL frequency band, and n80 indicates that the SUL frequency band is 1710 MHZ to 1785 MHz.

The quantity of MIMO layers supported by the SUL may be n, where n is an integer greater than or equal to 1. For example, n is 1, 2, or 4. That the quantity of MIMO layers supported by the SUL is n (n is an integer greater than or equal to 1) may be referred to as that the SUL supports n transmitters (T, transmitter), or referred to as SUL nT.

MIMO capability supported by the NUL may be m layers, where m is an integer greater than or equal to 1. For example, m is 1, 2, or 4. That the quantity of MIMO layers supported by the NUL is m (m is an integer greater than or equal to 1) may be referred to as that the NUL supports mT, or referred to as NUL mT.

For example, the quantity of MIMO layers supported by the SUL may be 1, that is, SUL 1T; and the quantity of MIMO layers supported by the NUL may be 2, that is, NUL 2T.

Optionally, before S401, the terminal 12 may determine to initiate random access on the SUL or the NUL. After the terminal 12 performs random access, the terminal 12 may send the terminal capability information on the SUL or the NUL.

S401 is optional.

S402. The access network device 11 sends NUL configuration information and SUL configuration information to the terminal 12.

After receiving the terminal capability information sent by the terminal 12, the access network device 11 may configure the NUL and the SUL for the terminal 12, and deliver the NUL configuration information and the SUL configuration information, so that the terminal 12 initiates transmission on the NUL and the SUL.

The NUL configuration information may include one or more of NUL PUCCH configuration information, NUL PUSCH configuration information, NUL SRS configuration information, and NUL BWP configuration information. An NUL PUCCH may be used by the terminal 12 to send a downlink data feedback, for example, a HARQ feedback. An NUL PUSCH may be used by the terminal 12 to send uplink data.

The SUL configuration information may include one or more of SUL PUCCH configuration information. SUL PUSCH configuration information, SUL SRS configuration information, and SUL BWP configuration information. An SUL PUCCH may be used by the terminal 12 to send a downlink data feedback, for example, a HARQ feedback. An SUL PUSCH may be used by the terminal 12 to send uplink data.

The access network device 11 may configure both the NUL PUSCH and the SUL PUSCH for the terminal 12. For example, the NUL configuration information includes the NUL PUSCH configuration information, and the SUL configuration information includes the SUL PUSCH configuration information. It should be noted that, at one moment, the access network device 11 may indicate, by using NUL/SUL indication information, the terminal 12 to transmit data on only one PUSCH (for ease of description, transmitting data is briefly referred to as data transmission in this specification).

The access network device 11 may configure both an NUL SRS and an SUL SRS for the terminal 12. For example, the NUL configuration information includes the NUL SRS configuration information, and the SUL configuration information includes the SUL SRS configuration information. The SRS herein may be a periodic SRS, a semi-persistent SRS, or an aperiodic SRS. For example, the SUL SRS may be a periodic SUL SRS, a semi-persistent SUL SRS, or an aperiodic SUL SRS; and the NUL SRS may be a periodic NUL SRS, a semi-persistent NUL SRS, or an aperiodic NUL SRS.

The access network device 11 may configure both an NUL BWP and an SUL BWP for the terminal 12. For example, the NUL configuration information includes the NUL BWP configuration information, and the SUL configuration information includes the SUL BWP configuration information. An NUL BWP subcarrier spacing and an SUL BWP subcarrier spacing may be the same or different. For example, the NUL BWP subcarrier spacing is 30 kHz. and the SUL BWP subcarrier spacing is 15 KHz.

The access network device 11 may configure a PUCCH on the NUL or the SUL. The access network device 11 may configure the NUL PUCCH but does not configure the SUL PUCCH for the terminal 12. For example, the NUL configuration information includes the NUL PUCCH configuration information, and the SUL configuration information does not include the SUL PUCCH configuration information or the SUL PUCCH configuration information is null. Alternatively, the access network device 11 may configure the SUL PUCCH but does not configure the NUL PUCCH for the terminal 12. For example, the SUL configuration information includes the SUL PUCCH configuration information, and the NUL configuration information does not include the NUL PUCCH configuration information or the NUL PUCCH configuration information is null.

For sending of the NUL configuration information and the SUL configuration information by the access network device 11 to the terminal 12, refer to related content of an UplinkConfig information element and a supplementary Uplink information element in a ServingCellConfig information element in section 6.3.2 in TS 38.331 V15.2.1.

Optionally, the NUL configuration information and the SUL configuration information may be carried in a same message or different messages. This is not limited in this embodiment of this application.

S402 is optional.

After configuring the NUL and the SUL for the terminal 12, the access network device 11 may allocate an NUL transmission time domain resource and an SUL transmission time domain resource to the terminal 12. In S403 to S405, that the access network device 11 allocates an NUL PUSCH time domain resource and an SUL PUSCH time domain resource to the terminal 12 in TDM mode is described.

S403. The access network device 11 sends TDD time domain resource configuration information to the terminal 12.

TDD can be used for the NUL and the DL. The TDD time domain resource configuration information may indicate one or more of a TDD uplink time domain resource, a TDD downlink time domain resource, and a TDD flexible time domain resource.

The TDD uplink time domain resource may be understood as an NUL time domain resource, the TDD downlink time domain resource may be understood as a DL time domain resource, and the flexible time domain resource may be understood as a time domain resource that is not configured as the NUL time domain resource or the DL time domain resource.

The following describes, with reference to examples in FIG. 5A to FIG. 5D, how the TDD time domain resource configuration information indicates one or more of the TDD downlink time domain resource, the flexible time domain resource, and the uplink time domain resource.

Figure 5A:
FIG. 5A is a schematic diagram of another uplink transmission method according to an embodiment of this application.

Example 1: The NUL BWP subcarrier spacing is 30 kHz, and one slot occupies 0.5 ms. The TDD time domain resource configuration information may indicate, by using 5 ms as a period, that 10 slots corresponding to the NUL BWP subcarrier spacing in the period of 5 ms are DDDDDDD-SUU. FIG. 5A shows a TDD time domain resource configuration in one period. As shown in FIG. 5A, the TDD downlink time domain resource is a slot 0, a slot 1, a slot 2, a slot 3, a slot 4, a slot 5, and a slot 6 that are corresponding to the NUL subcarrier spacing, the TDD flexible time domain resource is a slot 7 corresponding to the NUL subcarrier spacing, and the TDD uplink time domain resource is a slot 8 and a slot 9 that are corresponding to the NUL subcarrier spacing.

Figure 5B:
FIG. 5B is a schematic diagram of another uplink transmission method according to an embodiment of this application.

Example 2: The NUL subcarrier spacing is 30 kHz, and one slot occupies 0.5 ms. The TDD time domain resource configuration information may indicate, by using 2.5 ms as a period, that five slots corresponding to the NUL subcarrier spacing in the period of 2.5 ms are DDDSU, where D represents a downlink (downlink) slot. S represents a flexible (flexible) slot, and U represents an uplink (uplink) slot. FIG. 5B shows a TDD time domain resource configuration in two periods. As shown in FIG. 5B, the TDD downlink time domain resource is a slot 0, a slot 1, a slot 2, a slot 5, a slot 6, and a slot 7 that are corresponding to the NUL subcarrier spacing, the TDD flexible time domain resource is a slot 3 and a slot 8 that are corresponding to the NUL subcarrier spacing, and the TDD uplink time domain resource is a slot 4 and a slot 9 that are corresponding to the NUL subcarrier spacing.

Example 3: The NUL subcarrier spacing is 30 kHz, and one slot occupies 0.5 ms. The TDD time domain resource configuration information may indicate, by using 5 ms as a period, that 10 slots corresponding to the NUL BWP subcarrier spacing in the period of 5 ms are DDDSUDDSUU. FIG. 5C shows a TDD time domain resource configuration in one period. As shown in FIG. 5C, the TDD downlink time domain resource is a slot 0, a slot 1, a slot 2, a slot 5, and a slot 6 that are corresponding to the NUL subcarrier spacing, the TDD flexible time domain resource is a slot 3 and a slot 7 that are corresponding to the NUL subcarrier spacing, and the TDD uplink time domain resource is a slot 4, a slot 8, and a slot 9 that are corresponding to the NUL subcarrier spacing.

Example 4: The NUL BWP subcarrier spacing is 30 kHz, and one slot occupies 0.5 ms. The TDD time domain resource configuration information may indicate, by using 2 ms as a period, that four slots corresponding to the NUL BWP subcarrier spacing in the period of 2 ms are DDSU. FIG. 5D shows a TDD time domain resource configuration in two periods. As shown in FIG. 5D, the TDD downlink time domain resource is a slot 0, a slot 1, a slot 4, and a slot 5 that are corresponding to the NUL subcarrier spacing, the TDD flexible time domain resource is a slot 2 and a slot 6 that are corresponding to the NUL subcarrier spacing, and the TDD uplink time domain resource is a slot 3 and a slot 7 that are corresponding to the NUL subcarrier spacing.

Optionally, the TDD time domain resource configuration information may be delivered by using one or more of cell-specific semi-static configuration information, UE-specific semi-static configuration information, or UE-specific dynamic configuration information.

A sequence of S402 and S403 is not limited in this embodiment of this application. S402 and S403 may be performed at the same time, and S402 and S403 may be performed by using a same message: S402 may be performed after S403: or S403 may be performed before S402.

S404. The access network device 11 sends NUL PUSCH time domain resource allocation information to the terminal 12.

The NUL PUSCH time domain resource allocation information may indicate the NUL PUSCH time domain resource. Optionally, the NUL PUSCH time domain resource allocation information may indicate that a part or all of the TDD uplink time domain resource is the NUL PUSCH time domain resource.

Optionally, the NUL PUSCH time domain resource allocation information may include NUL/SUL indication information and PUSCH time domain resource allocation information. The NUL/SUL indication information may indicate the terminal 12 to send uplink data on the NUL, and the PUSCH time domain resource allocation information may indicate a PUSCH time domain resource used to send the uplink data on the NUL. The NUL/SUL indication information and the PUSCH time domain resource allocation information may be carried in DCI. The NUL PUSCH time domain resource may be determined by combining the NUL/SUL indication information and the PUSCH time domain resource allocation information.

For the NUL/SUL indication information and the PUSCH time domain resource allocation information, refer to related content of a UL/SUL indicator (indicator) information element in section 7.3.1.1.1 in 3GPP TS 38.212 V15.3.0 and time domain resource allocation (Resource allocation in time domain) in section 5.1.2.1 in 3GPP TS 38.214 V15.2.0.

The following provides descriptions with reference to the examples in FIG. 5A to FIG. 5D.

Example 1. As shown in FIG. 5A, the NUL/SUL indication information indicates the terminal 12 to send uplink data on the NUL, and the PUSCH time domain resource allocation information may indicate that the slot 8 and the slot 9 that are corresponding to the NUL subcarrier spacing are PUSCH time domain resources used to send the uplink data on the NUL. In this case, the NUL PUSCH time domain resource is the slot 8 and the slot 9 that are corresponding to the NUL subcarrier spacing.

Example 2: As shown in FIG. 5B, the NUL/SUL indication information indicates the terminal 12 to send uplink data on the NUL, and the PUSCH time domain resource allocation information may indicate that the slot 4 and the slot 9 that are corresponding to the NUL subcarrier spacing are PUSCH time domain resources used to send the uplink data on the NUL. In this case, the NUL PUSCH time domain resource is the slot 4 and the slot 9 that are corresponding to the NUL subcarrier spacing.

Example 3: As shown in FIG. 5C, the NUL/SUL indication information indicates the terminal 12 to send uplink data on the NUL, and the PUSCH time domain resource allocation information may indicate that the slot 4, the slot 8, and the slot 9 that are corresponding to the NUL subcarrier spacing are PUSCH time domain resources used to send the uplink data on the NUL. In this case, the NUL PUSCH time domain resource is the slot 4, the slot 8, and the slot 9 that are corresponding to the NUL subcarrier spacing.

Example 4. As shown in FIG. 5D, the NUL/SUL indication information indicates the terminal 12 to send uplink data on the NUL, and the PUSCH time domain resource allocation information may indicate that the slot 3 and the slot 7 that are corresponding to the NUL subcarrier spacing are PUSCH time domain resources used to send the uplink data on the NUL. In this case, the NUL PUSCH time domain resource is the slot 3 and the slot 7 that are corresponding to the NUL subcarrier spacing.

S405. The access network device 11 sends SUL PUSCH time domain resource allocation information to the terminal 12.

The SUL PUSCH time domain resource allocation information may indicate that a part or all of the TDD flexible time domain resource and the TDD downlink time domain resource is an SUL PUSCH time domain resource. It should be noted that the part or all of the TDD flexible time domain resource and the TDD downlink time domain resource includes a part or all of the TDD flexible time domain resource and a part or all of the TDD downlink time domain resource. Another case is similar in this embodiment of this application.

Optionally, the SUL PUSCH time domain resource allocation information may include NUL/SUL indication information and PUSCH time domain resource allocation information. The NUL/SUL indication information may indicate the terminal 12 to send uplink data on the SUL, and the PUSCH time domain resource allocation information may be used to allocate a PUSCH time domain resource used to send the uplink data on the SUL. The SUL PUSCH time domain resource may be determined by combining the NUL/SUL indication information and the PUSCH time domain resource allocation information.

The following provides descriptions with reference to the examples in FIG. 5A to FIG. 5D.

Example 1: As shown in FIG. 5A, the NUL/SUL indication information indicates the terminal 12 to send uplink data on the SUL, and the PUSCH time domain resource allocation information may indicate that the slot 0, the slot 1, the slot 2, and the slot 3 that are corresponding to an SUL subcarrier spacing are PUSCH time domain resources used to send the uplink data on the SUL. In this case, the SUL PUSCH time domain resource is the slot 0, the slot 1, the slot 2, and the slot 3 that are corresponding to the SUL subcarrier spacing.

Example 2: As shown in FIG. 5B, the NUL/SUL indication information indicates the terminal 12 to send uplink data on the SUL, and the PUSCH time domain resource allocation information may indicate that the slot 0, the slot 1, and the slot 3 that are corresponding to an SUL subcarrier spacing are PUSCH time domain resources used to send the uplink data on the SUL. In this case, the SUL PUSCH time domain resource is the slot 0, the slot 1, and the slot 3 that are corresponding to the SUL subcarrier spacing.

Example 3: As shown in FIG. 5C, the NUL/SUL indication information indicates the terminal 12 to send uplink data on the SUL, and the PUSCH time domain resource allocation information may indicate that the slot 0, the slot 1, and the slot 3 that are corresponding to an SUL subcarrier spacing are PUSCH time domain resources used to send the uplink data on the SUL. In this case, the SUL PUSCH time domain resource is the slot 0, the slot 1, and the slot 3 that are corresponding to the SUL subcarrier spacing.

Example 4: As shown in FIG. 5D, the NUL/SUL indication information indicates the terminal 12 to send uplink data on the SUL, and the PUSCH time domain resource allocation information may indicate that the slot 0 and the slot 2 that are corresponding to the SUL subcarrier spacing are PUSCH time domain resources used to send the uplink data on the SUL. In this case, the SUL PUSCH time domain resource is the slot 0) and the slot 2 that are corresponding to the SUL subcarrier spacing.

A sequence of S404 and S405 is not limited in this embodiment of this application. S404 and S405 may be performed at the same time, and S404 and S405 may be performed by using a same message; S404 may be performed after S405: or S404 may be performed before S405.

After the access network device 11 allocates the NUL PUSCH time domain resource and the SUL PUSCH time domain resource to the terminal 12, the terminal 12 may transmit data on the NUL PUSCH time domain resource and the SUL PUSCH time domain resource. The following provides descriptions with reference to S406 and S407.

S406. The terminal 12 sends data on the NUL PUSCH time domain resource.

After receiving the NUL PUSCH time domain resource allocation information and determining the NUL PUSCH time domain resource based on the NUL PUSCH time domain resource allocation information, the terminal 12 may send the data on the NUL PUSCH time domain resource.

The following provides descriptions with reference to the examples in FIG. 5A to FIG. 5D.

Example 1: As shown in FIG. 5A, the NUL PUSCH time domain resource is the slot 8 and the slot 9 that are corresponding to the NUL subcarrier spacing, and the terminal 12 may send the data in the slot 8 and the slot 9 that are corresponding to the NUL subcarrier spacing.

Example 2: As shown in FIG. 5B, the NUL PUSCH time domain resource is the slot 4 and the slot 9 that are corresponding to the NUL subcarrier spacing, and the terminal 12 may send the data in the slot 4 and the slot 9 that are corresponding to the NUL subcarrier spacing.

Example 3: As shown in FIG. 5C, the NUL PUSCH time domain resource is the slot 4, the slot 8, and the slot 9 that are corresponding to the NUL subcarrier spacing, and the terminal 12 may send the data in the slot 4, the slot 8, and the slot 9 that are corresponding to the NUL subcarrier spacing.

Example 4: As shown in FIG. 5D, the NUL PUSCH time domain resource is the slot 3 and the slot 7 that are corresponding to the NUL subcarrier spacing, and the terminal 12 may send the data in the slot 3 and the slot 7 that are corresponding to the NUL subcarrier spacing. S407. The terminal 12 sends data on the SUL PUSCH time domain resource.

After receiving the SUL PUSCH time domain resource allocation information and determining the SUL PUSCH time domain resource based on the SUL PUSCH time domain resource allocation information, the terminal 12 may send the data on the SUL PUSCH time domain resource.

The following provides descriptions with reference to the examples in FIG. 5A to FIG. 5D.

Example 1: As shown in FIG. 5A, the SUL PUSCH time domain resource is the slot 0, the slot 1, the slot 2, and the slot 3 that are corresponding to the SUL subcarrier spacing, and the terminal 12 may send the data in the slot 0, the slot 1, the slot 2, and the slot 3 that are corresponding to the SUL subcarrier spacing.

Example 2: As shown in FIG. 5B, the SUL PUSCH time domain resource is the slot 0, the slot 1, and the slot 3 that are corresponding to the SUL subcarrier spacing, and the terminal 12 may send the data in the slot 0, the slot 1, and the slot 3 that are corresponding to the SUL subcarrier spacing.

Example 3: As shown in FIG. 5C, the SUL PUSCH time domain resource is the slot 0, the slot 1, and the slot 3 that are corresponding to the SUL subcarrier spacing, and the terminal 12 may send the data in the slot 0, the slot 1, and the slot 3 that are corresponding to the SUL subcarrier spacing.

Example 4: As shown in FIG. 5D, the SUL PUSCH time domain resource is the slot 0 and the slot 2 that are corresponding to the SUL subcarrier spacing, and the terminal 12 may send the data in the slot 0) and the slot 2 that are corresponding to the SUL subcarrier spacing.

PUSCH transmission is performed on the NUL by using the TDD uplink time domain resource, and PUSCH transmission is performed on the SUL by using the TDD flexible time domain resource or the TDD downlink time domain resource. In this way, a time domain resource that is not used on the NUL PUSCH can be used for the SUL PUSCH without affecting performance of the NUL PUSCH, thereby improving uplink data transmission performance and improving user experience.

That the access network device 11 allocates the NUL PUSCH time domain resource and the SUL PUSCH time domain resource to the terminal 12 is described above. Optionally, the access network device 11 may allocate another NUL transmission time domain resource, for example, an NUL SRS time domain resource or an NUL PUCCH time domain resource, to the terminal 12. Optionally, the access network device 11 may allocate another SUL transmission time domain resource, for example, an SUL SRS time domain resource or an SUL PUCCH time domain resource, to the terminal 12. These are briefly described below.

Optionally, the access network device 11 may allocate an NUL SRS time domain resource and an SUL SRS time domain resource to the terminal 12. The NUL SRS time domain resource may be a part or all of the TDD uplink time domain resource and the TDD flexible time domain resource, and the SUL SRS time domain resource may be a part or all of the TDD downlink time domain resource and the TDD flexible time domain resource. The NUL SRS time domain resource may not overlap the SUL SRS time domain resource. Optionally, the NUL SRS time domain resource may not overlap the NUL PUSCH time domain resource, and the SUL SRS time domain resource may not overlap the SUL PUSCH time domain resource.

An SRS may be sent on the NUL and the SUL in TDM mode in a near-midpoint region, to increase SRS time domain resources and improve uplink SRS transmission performance. In this way, the access network device can more accurately estimate a downlink channel, and better perform downlink transmission.

Optionally, the access network device 11 may allocate an NUL PUCCH time domain resource or an SUL PUCCH time domain resource to the terminal 12. When the access network device 11 configures the PUCCH on the NUL, the access network device 11 may configure the NUL PUCCH time domain resource for the terminal 12. The NUL PUCCH time domain resource may be all or a part of the TDD uplink time domain resource. When the access network device 11 configures the PUCCH on the SUL, the access network device 11 may configure the SUL PUCCH time domain resource for the terminal 12. The SUL PUCCH time domain resource may be all or a part of the TDD downlink time domain resource and the TDD flexible time domain resource.

In the solution 1, NUL transmission and SUL transmission are performed in TDM mode, so that SUL transmission time domain resources can be increased in the near-midpoint region without affecting NUL transmission time domain resources, thereby improving uplink transmission performance.

Solution 2

Figure 6:
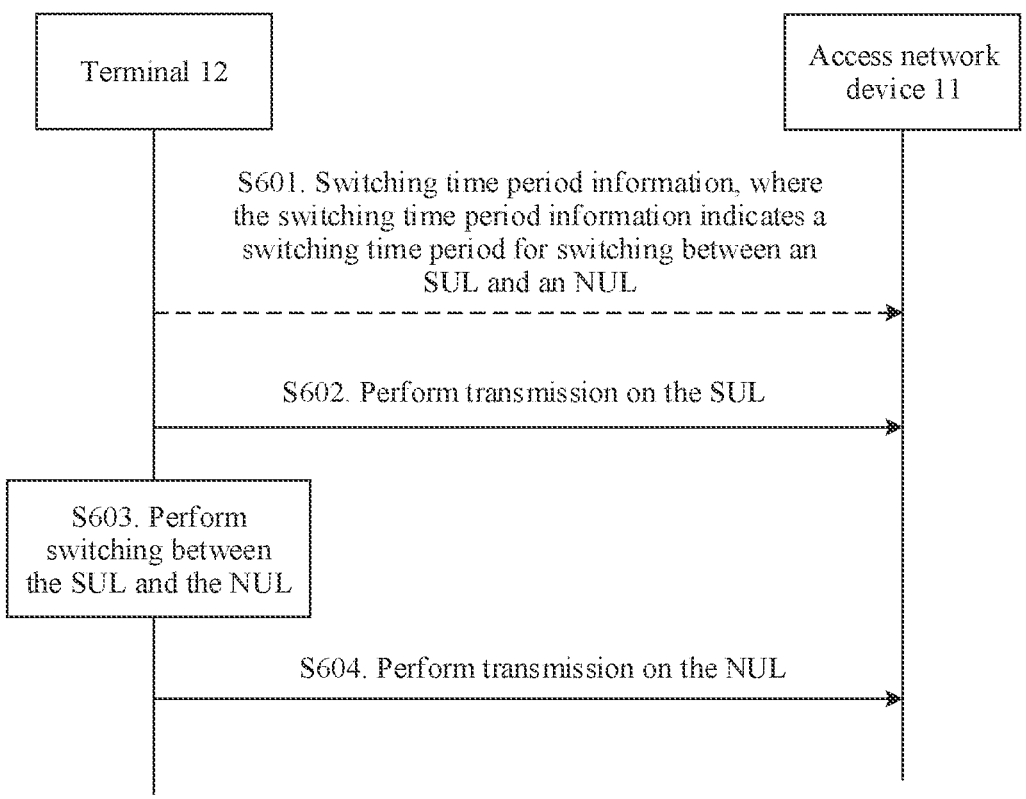
FIG. 6 is a schematic diagram of an uplink switching method according to an embodiment of this application.

The solution 2 is described with reference to FIG. 6 and FIG. 7. FIG. 6 shows an uplink switching method according to an embodiment of this application. As shown in FIG. 6:

S601. A terminal 12 sends switching time period information to an access network device 11, where the switching time period information indicates a switching time period for switching between an SUL and an NUL.

In a first example, the switching time period for the switching between the SUL and the NUL includes a time period for switching from the SUL to the NUL.

The switching time period information is used to determine a first silent time domain resource. A length of the first silent time domain resource is greater than or equal to a length of the time period for the switching from the SUL to the NUL, a preceding symbol adjacent to the first silent time domain resource belongs to a transmission time domain resource of the SUL, and a subsequent symbol adjacent to the first silent time domain resource belongs to a transmission time domain resource of the NUL.

Optionally, the first silent time domain resource is a segment of consecutive time domain resources. For example, the first silent time domain resource is one symbol or two or more consecutive symbols.

In a second example, the switching time period for the switching between the SUL and the NUL includes a time period for switching from the NUL to the SUL.

The switching time period information is used to determine a second silent time domain resource. A length of the second silent time domain resource is greater than or equal to a length of the time period for the switching from the NUL to the SUL, a preceding symbol adjacent to the second silent time domain resource belongs to a transmission time domain resource of the NUL, and a subsequent symbol adjacent to the second silent time domain resource belongs to a transmission time domain resource of the SUL.

Optionally, the second silent time domain resource is a segment of consecutive time domain resources. For example, the second silent time domain resource is one symbol or two or more consecutive symbols.

In a third example, cases in the first example and the second example are included. To be specific, the switching time period for the switching between the SUL and the NUL includes the time period for the switching from the SUL to the NUL and the time period for the switching from the NUL to the SUL. For details, refer to related content in the first example and the second example. Details are not described herein again.

Optionally, in the foregoing three examples, the transmission time domain resource of the SUL may include one or more of an SUL PUSCH time domain resource, an SUL SRS time domain resource, and an SUL PUCCH time domain resource, and the transmission time domain resource of the NUL may include one or more of an NUL PUSCH time domain resource, an NUL SRS time domain resource, and an NUL PUCCH time domain resource. For a specific configuration mode, refer to related content in the solution 1.

Optionally, in the foregoing three examples, the time period for the switching from the SUL to the NUL may be the same as the time period for the switching from the NUL to the SUL. In this case, the terminal 12 may report the switching time period for the switching between the SUL and the NUL, and the access network device 11 determines the first silent time domain resource and the second silent time domain resource based on the switching time period for the switching between the SUL and the NUL. In this case, the lengths of the first silent time domain resource and the second silent time domain resource may be the same.

Because capabilities, of different terminals, of switching between the SUL and the NUL may be different, the terminal 12 reports the switching time period information, so that the terminal 12 can report the switching time period based on a switching capability of the terminal 12, and the access network device 11 can determine, based on the switching time period reported by the terminal 12, a time domain resource used for switching performed by the terminal 12. In this way, a silent time domain resource is flexibly determined.

S601 is optional. As an alternative implementation of S601, a terminal 12 and an access network device 11 may preconfigure a switching time period for switching between an SUL and an NUL. For example, the terminal 12 and the access network device 11 preconfigure the switching time period for the switching between the SUL and the NUL to 140 microseconds, and the access network device 11 determines a first silent time domain resource and/or a second silent time domain resource for the terminal 12 based on the preconfigured time period. In this manner, the terminal 12 does not need to report the switching time period, thereby saving air interface resources. The switching time period for the switching between the SUL and the NUL may also include cases in the first example to the third example, for example, a time period for switching from the SUL to the NUL, a time period for switching from the NUL to the SUL, or a time period for switching from the SUL to the NUL and a time period for switching from the NUL to the SUL. In this manner, for a manner in which the access network device 11 determines the silent time domain resource and a manner in which the terminal 12 performs switching between the SUL and the NUL on the silent time domain resource, refer to other content in this embodiment of this application.

Optionally, before S601, the terminal 12 may determine to initiate random access on the SUL or the NUL. After the terminal 12 performs random access, the terminal 12 may send the switching time period information on the SUL or the NUL.

S602. The terminal 12 performs transmission with the access network device 11 by using the SUL.

The transmission herein may be understood as transmission of one or more of a PUSCH, an SRS, and a PUCCH.

Optionally, a sequence of S602 and S604 may be that S602 is before S604 or S604 is before S602.

S603. The terminal 12 performs switching between the SUL and the NUL.

The switching time period for the switching between the SUL and the NUL is longer than 0 microseconds.

Optionally, the terminal 12 may switch a radio frequency channel between the SUL and the NUL.

In a first example, the switching between the SUL and the NUL includes the switching from the SUL to the NUL.

Optionally, the terminal 12 may switch the radio frequency channel from the SUL to the NUL within duration of the first silent time domain resource.

In a second example, the switching between the SUL and the NUL includes the switching from the NUL to the SUL.

Optionally, the terminal 12 may switch the radio frequency channel from the NUL to the SUL within duration of the second silent time domain resource.

In a third example, cases in the first example and the second example are included. To be specific, the switching between the SUL and the NUL includes the switching from the SUL to the NUL and the switching from the NUL to the SUL.

Optionally, the terminal 12 may switch the radio frequency channel from the SUL to the NUL within duration of the first silent time domain resource, and switch the radio frequency channel from the NUL to the SUL within duration of the second silent time domain resource. For details, refer to content in the first example and the second example. Details are not described herein again.

S604. The terminal 12 performs transmission with the access network device 11 by using the NUL.

The transmission herein may be understood as transmission of one or more of a PUSCH, an SRS, and a PUCCH.

According to the solution in FIG. 6, the switching time period for the switching between the SUL and the NUL is longer than 0 microseconds, and the SUL and the NUL may share a radio frequency channel. On one hand, compared with a case in which the NUL and the SUL separately exclusively use respective radio frequency channels, this solution improves transmission performance of the NUL because the NUL not only may use a radio frequency channel exclusive to the NUL, but also may use a radio frequency channel of the SUL when the terminal 12 performs transmission on the NUL. On the other hand, compared with a case in which the NUL exclusively uses all radio frequency channels, this solution improves uplink transmission performance because the terminal 12 may perform transmission on the SUL in addition to performing transmission on the NUL.

The solution 2 is further described below with reference to FIG. 7 to FIG. 9E.

Figure 7:
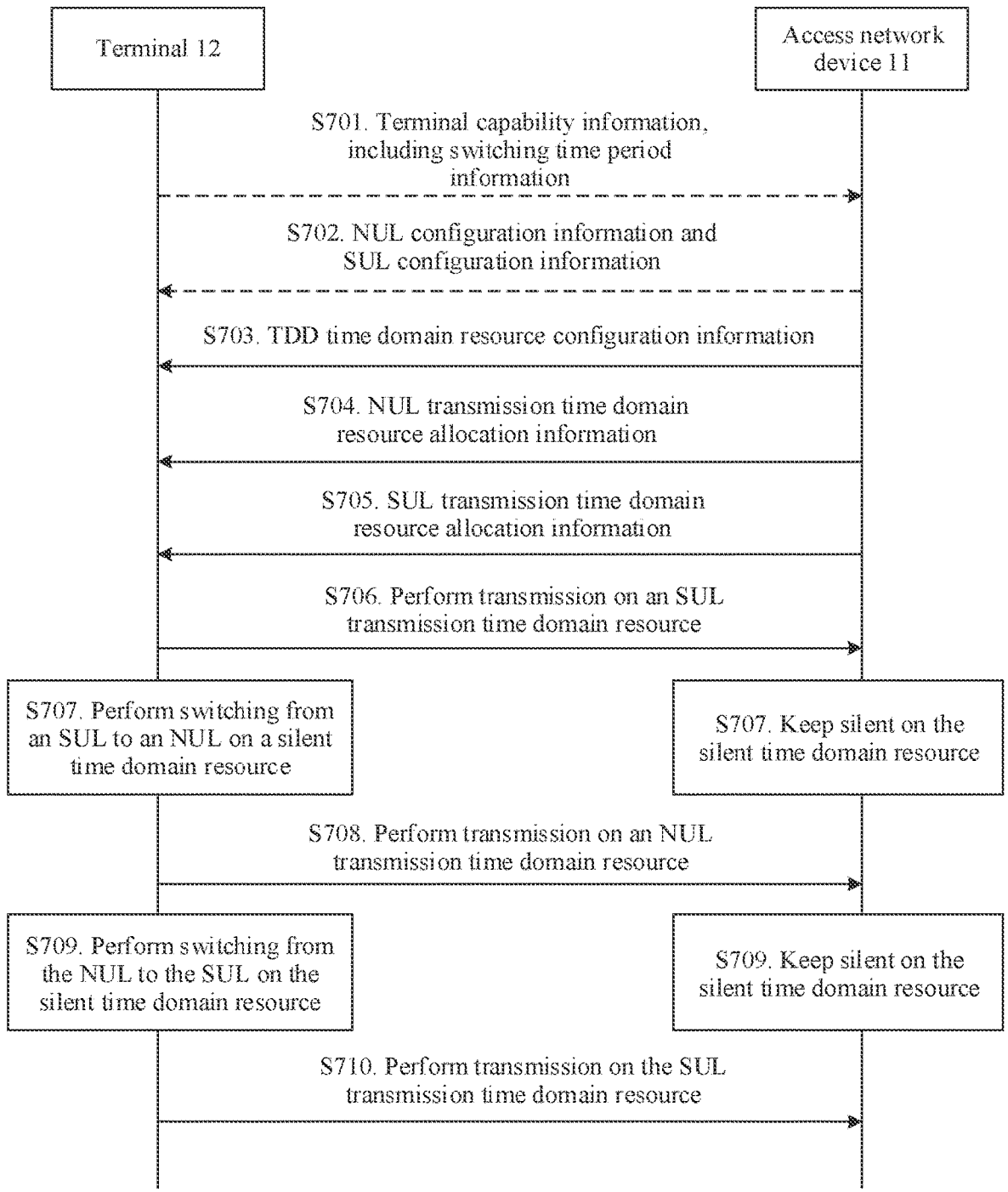
FIG. 7 is a schematic diagram of another uplink switching method according to an embodiment of this application.

FIG. 7 shows an uplink switching method. A terminal 12 reports a switching time period for switching between an SUL and an NUL, an access network device 11 configures a silent time domain resource for the terminal 12, and the terminal 12 may complete the switching between the SUL and the NUL within duration of the silent time domain resource. As shown in FIG. 7:

S701. The terminal 12 sends terminal capability information to the access network device 11.

The terminal capability information may include switching time period information, where the switching time period information is used to indicate a switching time period for switching between an SUL and an NUL of the terminal 12.

Optionally, the switching time period may be a time length of a time range or a time length of a period of time, and the switching time period may be represented by using an OFDM symbol. For example, the switching time period may be one OFDM symbol, or two or more OFDM symbols.

Alternatively, the switching time period may be represented by using a time value. For example, the switching time period may be 0 μs, 30 μs. 140 μs, or another value.

Optionally, the switching time period for the switching between the SUL and the NUL may be a time period for switching from the SUL to the NUL or a time period for switching from the NUL to the SUL, and the time period for the switching from the SUL to the NUL may be different from or the same as the time period for the switching from the NUL to the SUL.

Optionally, the terminal 12 may separately report the time period for the switching from the SUL to the NUL and the time period for the switching from the NUL to the SUL.

Optionally, the switching time period for the switching between the SUL and the NUL may be a larger one of the time period for the switching from the NUL to the SUL and the time period for the switching from the SUL to the NUL, or an average value of the time period for the switching from the SUL to the NUL and the time period for the switching from the NUL to the SUL.

Optionally, for different SUL frequency band combinations, switching time periods for switching between the SUL and the NUL may be different. For example, for different SUL frequency band combinations, time periods for switching from the SUL to the NUL are different, and time periods for switching from the NUL to the SUL may be different.

Optionally, the time period for the switching from the SUL to the NUL may be an average time period for switching from the SUL to the NUL, a shortest time period for switching from the SUL to the NUL, or a longest time period for switching from the SUL to the NUL. The time period for the switching from the NUL to the SUL may be an average time period for switching from the NUL to the SUL, a shortest time period for switching from the NUL to the SUL, or a longest time period for switching from the NUL to the SUL.

Optionally, in addition to the foregoing explanation of the switching time period for the switching between the SUL and the NUL, the switching time period for the switching between the SUL and the NUL may be another time period required for switching between the SUL and the NUL. This is not limited in this embodiment of this application.

Optionally, the switching time period may be determined by a hardware circuit that implements the NUL and the SUL.

Optionally, the NUL and the SUL may not share a radio frequency channel. In this case, the switching time period may be 0 μs.

Optionally, the NUL and the SUL may share a radio frequency channel, and the switching time period may be a switching time period for switching of the shared radio frequency channel between the SUL and the NUL. For example, the switching time period may be 0 μs, 30 μs, 140 μs, or another value.

In an example, SUL 1T, NUL 2T, and a radio frequency chip may support 2T, where the SUL and the NUL may share one radio frequency channel (1T), and the NUL may exclusively use one radio frequency channel (1T).

FIG. 8 is a schematic diagram of a radio frequency channel shared by an SUL and an NUL. For example, as shown in FIG. 8, the SUL and the NUL share a radio frequency channel 1, the NUL exclusively occupies a radio frequency channel 2, and the radio frequency channel 1 and the radio frequency channel 2 are both connected to an antenna. The radio frequency channel 1 and the radio frequency channel 2 may be located in the terminal 12, for example, in the transceiver 1212 in FIG. 2B, and the antenna may be the antenna 1616 in FIG. 2B.

When the SUL works, a switch works in a state 1 and SUL 1T is provided through the radio frequency channel 1. When the NUL works, the switch works in a state 2, and NUL 2T is provided through the radio frequency channel 1 and the radio frequency channel 2. A specific time period is required when the radio frequency channel 1 is switched between the SUL and the NUL. For example, the radio frequency channel 1 works on the SUL, starts to switch to the NUL at a moment t1, and completes switching to the NUL at a moment t2. In this case, the switching time period is t2-t1.

The terminal capability information reported by the terminal 12 in S701 may include the terminal capability information in S401. Refer to S501, and details are not described herein again.

S702. The access network device 11 sends NUL configuration information and SUL configuration information to the terminal 12.

For S702, refer to related content in S402. Details are not described herein again.

S703. The access network device 11 sends TDD time domain resource configuration information to the terminal 12.

For S703, refer to related content in S403. Details are not described herein again.

In the following S704 and S705, that the access network device 11 allocates an NUL transmission time domain resource and an SUL transmission time domain resource to the terminal 12 is described.

S704. The access network device 11 sends NUL transmission time domain resource allocation information to the terminal 12.

The NUL transmission time domain resource allocation information is used to indicate the NUL transmission time domain resource.

The NUL transmission time domain resource allocation information may include one or both of NUL PUSCH time domain resource allocation information and NUL SRS time domain resource allocation information.

Optionally, when an NUL PUCCH is configured, the NUL transmission time domain resource allocation information may further include NUL PUCCH time domain resource allocation information.

The NUL PUSCH time domain resource allocation information, the NUL SRS time domain resource allocation information, and the NUL PUCCH time domain resource allocation information are separately described below.

(1) NUL PUSCH Time Domain Resource Allocation Information

For the NUL PUSCH time domain resource allocation information, refer to related content in S404. Details are not described herein again.

(2) NUL SRS Time Domain Resource Allocation Information

The NUL SRS time domain resource allocation information may indicate an NUL SRS time domain resource.

Optionally, the NUL SRS time domain resource allocation information may indicate that a part of the TDD uplink time domain resource and the TDD flexible time domain resource is the NUL SRS time domain resource.

Optionally, when the access network device 11 configures a periodic NUL SRS for the terminal 12 in S702, the NUL SRS time domain resource allocation information herein may be understood as the NUL SRS configuration information in S702, and a periodic NUL SRS time domain resource is configured in the NUL SRS configuration information. When the access network device 11 configures an aperiodic NUL SRS for the terminal 12, the NUL SRS configuration information herein may be understood as the NUL SRS configuration information in S702 and aperiodic NUL SRS time domain resource indication information, an SRS time domain resource pool is configured in the NUL SRS configuration information, and the aperiodic NUL SRS time domain resource indication information may dynamically indicate, to the terminal 12, that one or more SRS time domain resources in the SRS time domain resource pool are NUL SRS time domain resources. For example, the aperiodic NUL SRS time domain resource indication information may be carried in DCI. When the access network device 11 configures a semi-persistent SRS for the terminal 12 in S702, the NUL SRS configuration information herein may be understood as the NUL SRS configuration information in S702 and semi-persistent NUL SRS time domain resource indication information, an SRS time domain resource pool is configured in the NUL SRS configuration information, and the semi-persistent NUL SRS time domain resource indication information may semi-persistently indicate that one or more SRS time domain resources in the SRS time domain resource pool are NUL SRS time domain resources. For example, the semi-persistent NUL SRS time domain resource indication information may be carried in a MAC CE.

(3) NUL PUCCH Time Domain Resource Allocation Information

The NUL PUCCH time domain resource allocation information may indicate an NUL PUCCH time domain resource.

Optionally, the NUL PUCCH time domain resource allocation information may indicate that a part of the TDD uplink time domain resource is the NUL PUCCH time domain resource.

Optionally, the NUL PUCCH time domain resource allocation information may include NUL PUCCH configuration information and NUL PUCCH time domain resource indication information. A PUCCH time domain resource pool is configured in the NUL PUCCH configuration information in S702. The NUL PUCCH time domain resource indication information indicates which reserved NUL PUCCH time domain resources in the PUCCH resource pool are used to transmit a PUCCH, that is, are NUL PUCCH time domain resources. The NUL PUCCH time domain resource indication information may be carried in DCI. For example, for the NUL PUCCH time domain resource indication information, refer to related content of a PUCCH resource indicator (PUCCH resource indicator) and a PDSCH-to-HARQ feedback timing indicator (PDSCH-to-HARQ_feedback timing indicator) in section 7.3.1.2.1 in 3GPP TS 38.212 V15.3.0.

S705. The access network device 11 sends SUL transmission time domain resource allocation information to the terminal 12.

The SUL transmission time domain resource allocation information is used to indicate the SUL transmission time domain resource.

The SUL transmission time domain resource allocation information includes one or both of SUL PUSCH time domain resource allocation information and SUL SRS time domain resource allocation information.

Optionally, when an SUL PUCCH is configured, the SUL transmission time domain resource allocation information may further include SUL PUCCH time domain resource allocation information.

The SUL PUSCH time domain resource allocation information, the SUL SRS time domain resource allocation information, and the SUL PUCCH time domain resource allocation information are separately described below.

(1) SUL PUSCH Time Domain Resource Allocation Information

For the SUL PUSCH time domain resource allocation information, refer to related content in S405. Details are not described herein again.

(2) SUL SRS Time Domain Resource Allocation Information

The SUL SRS time domain resource allocation information may indicate an SUL SRS time domain resource. Optionally, the SUL SRS time domain resource allocation information may indicate that a part of the TDD downlink time domain resource and the TDD flexible time domain resource is the SUL SRS time domain resource.

When the access network device 11 configures a periodic SUL SRS for the terminal 12 in S702, the SUL SRS time domain resource allocation information herein may be understood as the SUL SRS configuration information in S702, and a periodic SUL SRS time domain resource is configured in the SUL SRS configuration information. When the access network device 11 configures an aperiodic SUL SRS for the terminal 12, the SUL SRS configuration information herein may be understood as the SUL SRS configuration information in S702 and aperiodic SUL SRS time domain resource indication information, an SRS time domain resource pool is configured in the SUL SRS configuration information, and the aperiodic SUL SRS time domain resource indication information may dynamically indicate, to the terminal 12, that one or more SRS time domain resources in the SRS time domain resource pool are SUL SRS time domain resources. For example, the aperiodic SUL SRS time domain resource indication information may be carried in DCI. When the access network device 11 configures a semi-persistent SRS for the terminal 12 in S702, the SUL SRS configuration information herein may be understood as the SUL SRS configuration information in S702 and semi-persistent SUL SRS time domain resource indication information, an SRS time domain resource pool is configured in the SUL SRS configuration information, and the semi-persistent SUL SRS time domain resource indication information may semi-persistently indicate that one or more SRS time domain resources in the SRS time domain resource pool are SUL SRS time domain resources. For example, the semi-persistent SUL SRS time domain resource indication information may be carried in a MAC CE.

(3) SUL PUCCH Time Domain Resource Allocation Information

The SUL PUCCH time domain resource allocation information may indicate an SUL PUCCH time domain resource.

Optionally, the SUL PUCCH time domain resource allocation information may indicate that a part of the TDD uplink time domain resource is the SUL PUCCH time domain resource.

Optionally, the SUL PUCCH time domain resource allocation information may include SUL PUCCH configuration information and SUL PUCCH time domain resource indication information. One or more reserved PUCCH time domain resources are configured in the SUL PUCCH configuration information in S702. The SUL PUCCH time domain resource indication information indicates which reserved SUL PUCCH time domain resources in the one or more reserved SUL PUCCH resources are used to transmit a PUCCH, that is, are SUL PUCCH time domain resources. The SUL PUCCH time domain resource indication information may be carried in DCI. For example, for the SUL PUCCH time domain resource indication information, refer to related content of a PUCCH resource indicator (PUCCH resource indicator) and a PDSCH-to-HARQ feedback timing indicator (PDSCH-to-HARQ_feedback timing indicator) in section 7.3.1.2.1 in 3GPP TS 38.212 V15.3.0.

Locations of the NUL transmission time domain resource and the SUL transmission time domain resource in the TDD time domain resource in the foregoing S704 and S705 are merely examples. A person skilled in the art may understand that the NUL transmission time domain resource and the SUL transmission time domain resource do not overlap. The SUL transmission time domain resource may be an NUL uplink time domain resource. For example, when no NUL PUCCH, NUL PUSCH, or NUL SRS is configured on the NUL uplink time domain resource, the SUL may use the NUL uplink time domain resource for the SUL PUCCH or the SUL SRS.

Optionally, in S704 and S705, the access network device 11 may configure a silent time domain resource for the terminal 12.

The silent time domain resource is used for the switching between the NUL and the SUL of the terminal 12, for example, is used for the switching from the NUL of the terminal 12 to the SUL of the terminal or switching from the SUL of the terminal 12 to the NUL of the terminal.

The silent time domain resource is a segment of consecutive time domain resources. For example, the silent time domain resource may be one symbol in one slot, a plurality of consecutive symbols in one slot, one slot, one slot and one symbol before or after the slot, one slot and a plurality of consecutive symbols before or after the slot, a plurality of consecutive slots, or a plurality of consecutive slots and a plurality of consecutive symbols before or after the plurality of slots. This is not limited in implementations of this application.

A length of the silent time domain resource is greater than or equal to a length of the switching time period reported by the terminal 12. Because the length of the silent time domain resource is greater than or equal to the length of the switching time period reported by the terminal 12, it can be ensured that the terminal 12 performs uplink transmission after successfully completing the switching, thereby reducing a probability of a switching failure.

The silent time domain resource is neither the NUL transmission time domain resource nor the SUL transmission time domain resource. This may alternatively be understood as that the access network device 11 does not configure the silent time domain resource as the NUL transmission time domain resource or the SUL transmission time domain resource, that the silent time domain resource is used for neither NUL transmission nor SUL transmission, or that the terminal 12 and the access network device 11 do not perform uplink transmission on the silent time domain resource.

A preceding symbol adjacent to the silent time domain resource is the NUL transmission time domain resource, and a subsequent symbol adjacent to the silent time domain resource is the SUL transmission time domain resource. Alternatively, a preceding symbol adjacent to the silent time domain resource is the SUL transmission time domain resource, and a subsequent symbol adjacent to the silent time domain resource is the NUL transmission time domain resource.

For example, when the PUCCH is configured on the NUL, the NUL transmission time domain resource may be an NUL PUSCH time domain resource, an NUL SRS time domain resource, an NUL PUCCH time domain resource, and the SUL transmission time domain resource may be an SUL PUSCH time domain resource or an SUL SRS time domain resource. When the PUCCH is configured on the SUL, the NUL transmission time domain resource may be an NUL PUSCH time domain resource or an NUL SRS time domain resource, and the SUL transmission time domain resource is an SUL PUSCH time domain resource, an SUL SRS time domain resource, or an SUL PUCCH time domain resource.

The silent time domain resource may belong to the TDD uplink time domain resource; or the silent time domain resource may belong to the TDD flexible time domain resource: or the silent time domain resource may belong to the TDD downlink time domain resource; or a part of the silent time domain resource belongs to the TDD downlink time domain resource, and the other part belongs to the TDD flexible time domain resource: or a part of the silent time domain resource belongs to the TDD uplink time domain resource, and the other part belongs to the TDD flexible time domain resource: or a part of the silent time domain resource belongs to the TDD uplink time domain resource, a part of the silent time domain resource belongs to the TDD flexible time domain resource, and a remaining part of the silent time domain resource belongs to the TDD downlink time domain resource.

Optionally, the access network device 11 may explicitly indicate the silent time domain resource to the terminal 12. For example, the access network device 11 sends silent time domain resource indication information to the terminal 12. Alternatively, the access network device 11 and the terminal 12 may predefine a location of the silent time domain resource. For example, when switching is performed from the SUL to the NUL, the access network device 11 and the terminal 12 may predefine the last two symbols in the last slot of the SUL as the silent time domain resource.

Optionally, the access network device 11 may implicitly indicate the silent time domain resource to the terminal 12. For example, the NUL transmission time domain resource allocation information sent by the access network device 11 to the terminal 12 indicates that a time domain resource other than the silent time domain resource is the NUL transmission time domain resource, and the SUL transmission time domain resource allocation information sent by the access network device 11 to the terminal 12 indicates that a time domain resource other than the silent time domain resource is the SUL transmission time domain resource. When identifying that two symbols before and after a time domain resource are an SUL transmission time domain resource and an NUL transmission time domain resource, or when identifying that two symbols before and after a time domain resource are an NUL transmission time domain resource and an SUL transmission time domain resource, the terminal 12 may determine that the time domain resource is the silent time domain resource.

Examples of descriptions are provided below with reference to FIG. 9A to FIG. 9D.

Example 1

In a first implementation, a preceding symbol adjacent to the silent time domain resource is an SUL PUSCH time domain resource, and a subsequent symbol adjacent to the silent time domain resource is an NUL PUSCH time domain resource.

As shown in FIG. 9A, the access network device 11 determines that the switching from the SUL to the NUL is to be completed within a slot 3 corresponding to an SUL subcarrier spacing to a slot 8 corresponding to an NUL subcarrier spacing, and the access network device 11 determines that a symbol 12 and a symbol 13 in the slot 3 corresponding to the SUL subcarrier spacing are the silent time domain resource.

The NUL transmission time domain resource allocation information may include the NUL PUSCH time domain resource allocation information, and the SUL transmission time domain resource allocation information may include the SUL PUSCH time domain resource allocation information.

The silent time domain resource may not be configured in the NUL PUSCH time domain resource allocation information and the SUL PUSCH time domain resource allocation information of the access network device 11. As shown in FIG. 9A, the NUL PUSCH time domain resource allocation information indicates that the slot 8 and a slot 9 that are corresponding to the NUL subcarrier spacing are NUL PUSCH time domain resources, and the SUL PUSCH time domain resource allocation information indicates that a slot 0, a slot 1, a slot 2, and symbols 0 to 11 in the slot 3 that are corresponding to the SUL subcarrier spacing are SUL PUSCH time domain resources.

After receiving the NUL PUSCH time domain resource allocation information and the SUL PUSCH time domain resource allocation information, the terminal 12 may determine that the symbol 12 and the symbol 13 in the slot 3 corresponding to the SUL subcarrier spacing are not configured as the NUL transmission time domain resource or the SUL transmission time domain resource. A preceding symbol adjacent to the symbol 12 and the symbol 13 in the slot 3 corresponding to the SUL subcarrier spacing is an SUL PUSCH time domain resource, and a subsequent symbol adjacent to the symbol 12 and the symbol 13 in the slot 3 corresponding to the SUL subcarrier spacing is an NUL PUSCH time domain resource. Therefore, the terminal 12 may determine that the symbol 12 and the symbol 13 in the slot 3 corresponding to the SUL subcarrier spacing are the silent time domain resource.

Example 2

As shown in FIG. 9B, the access network device 11 determines that the switching from the SUL to the NUL is to be completed within a slot 1 corresponding to an SUL subcarrier spacing to a slot 4 corresponding to an NUL subcarrier spacing, and the access network device 11 determines that a symbol 10 and a symbol 11 in the slot 1 corresponding to the SUL subcarrier spacing are the silent time domain resource: the access network device 11 determines that the switching from the NUL to the SUL is to be completed within the slot 4 and a slot 5 that are corresponding to the NUL subcarrier spacing, and determines that the slot 5 corresponding to the NUL subcarrier spacing is the silent time domain resource: the access network device 11 determines that the switching from the SUL to the NUL is to be completed within a slot 3 corresponding to the SUL subcarrier spacing to a slot 8 and a slot 9 that are corresponding to the NUL subcarrier spacing, and the access network device 11 determines that a symbol 0 to a symbol 9 in the slot 8 corresponding to the NUL subcarrier spacing are the silent time domain resource.

The NUL transmission time domain resource allocation information may include the NUL SRS time domain resource allocation information, and the SUL transmission time domain resource allocation information may include the SUL PUSCH time domain resource allocation information and the SUL SRS time domain resource allocation information.

The symbol 10 and the symbol 11 in the slot 1 corresponding to the SUL subcarrier spacing, the slot 5 corresponding to the NUL subcarrier spacing, and the symbol 0 to the symbol 9 in the slot 8 corresponding to the NUL subcarrier spacing may not be configured in the NUL SRS time domain resource allocation information, the SUL PUSCH time domain resource allocation information, and the SUL SRS time domain resource allocation information that are delivered by the access network device 11. As shown in FIG. 9B, the NUL SRS time domain resource allocation information indicates a symbol 10 to a symbol 13 in a slot 3 corresponding to the NUL subcarrier spacing, and a symbol 10 to a symbol 13 in the slot 4 corresponding to the NUL subcarrier spacing, a symbol 10 to a symbol 13 in the slot 8 corresponding to the NUL subcarrier spacing are NUL SRS time domain resources: the SUL PUSCH time domain resource allocation information indicates that a slot 0, a symbol 0 to a symbol 9 in the slot 1, and a symbol 0 to a symbol 11 in the slot 3 that are corresponding to the SUL subcarrier spacing are SUL PUSCH time domain resources: the SUL SRS time domain resource allocation information indicates that a symbol 12 and a symbol 13 in the slot 3 corresponding to the SUL subcarrier spacing are SUL SRS time domain resources.

After receiving the NUL SRS time domain resource allocation information, the SUL PUSCH time domain resource allocation information, and the SUL SRS time domain resource allocation information, the terminal 12 may determine that the symbol 10 and the symbol 11 in the slot 1 corresponding to the SUL subcarrier spacing, the slot 5 corresponding to the NUL subcarrier spacing, and the symbol 0 to the symbol 9 in the slot 8 corresponding to the NUL subcarrier spacing are not configured as NUL transmission time domain resources or SUL transmission time domain resources. A preceding symbol adjacent to the symbol 10 and the symbol 11 in the slot 1 corresponding to the SUL subcarrier spacing is an SUL PUSCH time domain resource, and a subsequent symbol adjacent to the symbol 10 and the symbol 11 in the slot 1 corresponding to the SUL subcarrier spacing is an NUL SRS time domain resource. A preceding symbol adjacent to the slot 5 corresponding to the NUL subcarrier spacing is an NUL SRS time domain resource, and a subsequent symbol adjacent to the slot 5 corresponding to the NUL subcarrier spacing is an SUL PUSCH time domain resource. A preceding symbol adjacent to the symbol 0 to the symbol 9 in the slot 8 corresponding to the NUL subcarrier spacing is an SUL SRS time domain resource, and a subsequent symbol adjacent to the symbol 0 to the symbol 9 in the slot 8 corresponding to the NUL subcarrier spacing is an NUL SRS time domain resource. Therefore, the terminal 12 may determine that the symbol 10 and the symbol 11 in the slot 1 corresponding to the SUL subcarrier spacing are the silent time domain resource.

Example 3

As shown in FIG. 9C, the access network device 11 determines that the switching from the SUL to the NUL is to be completed within a slot 1 corresponding to an SUL subcarrier spacing to a slot 4 corresponding to an NUL subcarrier spacing, and the access network device 11 determines that a symbol 12 and a symbol 13 in the slot 1 corresponding to the SUL subcarrier spacing are the silent time domain resource: the access network device 11 determines that the switching from the NUL to the SUL is to be completed within the slot 4 corresponding to the NUL subcarrier spacing to a slot 3 corresponding to the SUL subcarrier spacing, and determines that the slot 5 corresponding to the NUL subcarrier spacing is the silent time domain resource: the access network device 11 determines that the switching from the SUL to the NUL is to be completed within the slot 3 corresponding to the SUL subcarrier spacing to a slot 8 corresponding to the NUL subcarrier spacing, and the access network device 11 determines that a symbol 0 to a symbol 3 in the slot 8 corresponding to the NUL subcarrier spacing are the silent time domain resource.

The NUL transmission time domain resource allocation information may include the NUL PUSCH time domain resource allocation information and the NUL PUCCH time domain resource allocation information, and the SUL transmission time domain resource allocation information may include the SUL PUSCH time domain resource allocation information and the SUL SRS time domain resource allocation information.

The symbol 12 and the symbol 13 in the slot 1 corresponding to the SUL subcarrier spacing, the slot 5 corresponding to the NUL subcarrier spacing, and the symbol 0 to the symbol 3 in the slot 8 corresponding to the NUL subcarrier spacing may not be configured in the NUL PUSCH time domain resource allocation information, the NUL PUCCH time domain resource allocation information, the SUL PUSCH time domain resource allocation information, and the SUL SRS time domain resource allocation information that are delivered by the access network device 11. As shown in FIG. 9C, the NUL PUSCH time domain resource allocation information indicates that a symbol 4 to a symbol 13 in the slot 8 corresponding to the NUL subcarrier spacing are NUL PUSCH time domain resources: the NUL PUCCH time domain resource allocation information indicates that the slot 4 and a slot 9 that are corresponding to the NUL subcarrier spacing are NUL PUCCH time domain resources: the SUL PUSCH time domain resource allocation information indicates that a symbol 0 to a symbol 11 in a slot 0 corresponding to the SUL subcarrier spacing are SUL PUSCH time domain resources, a symbol 0 to a symbol 11 in the slot 1 corresponding to the SUL subcarrier spacing are SUL PUSCH time domain resources, and the slot 3 corresponding to the SUL subcarrier spacing is an SUL PUSCH time domain resource; the SUL SRS time domain resource allocation information indicates that a symbol 12 and a symbol 13 in the slot 0 corresponding to the SUL subcarrier spacing are SUL SRS time domain resources.

After receiving the NUL PUSCH time domain resource allocation information, the NUL PUCCH time domain resource allocation information, the SUL PUSCH time domain resource allocation information, and the SUL SRS time domain resource allocation information, the terminal 12 may determine that the symbol 12 and the symbol 13 in the slot 1 corresponding to the SUL subcarrier spacing, the slot 5 corresponding to the NUL subcarrier spacing, and the symbol 0 to the symbol 3 in the slot 8 corresponding to the NUL subcarrier spacing are not configured as NUL transmission time domain resources or SUL transmission time domain resources. A preceding symbol adjacent to the symbol 12 and the symbol 13 in the slot 1 corresponding to the SUL subcarrier spacing is an SUL PUSCH time domain resource, and a subsequent symbol adjacent to the symbol 12 and the symbol 13 in the slot 1 corresponding to the SUL subcarrier spacing is an NUL PUSCH time domain resource and an NUL PUCCH time domain resource. A preceding symbol adjacent to the slot 5 corresponding to the NUL subcarrier spacing is an NUL PUCCH time domain resource, and a subsequent symbol adjacent to the slot 5 corresponding to the NUL subcarrier spacing is an SUL PUSCH time domain resource. A preceding symbol adjacent to the symbol 0 to the symbol 3 in the slot 8 corresponding to the NUL subcarrier spacing is an SUL PUSCH time domain resource, and a subsequent symbol adjacent to the symbol 0 to the symbol 3 in the slot 8 corresponding to the NUL subcarrier spacing is an NUL PUCCH time domain resource. Therefore, the terminal 12 may determine that the symbol 12 and the symbol 13 in the slot 1 corresponding to the SUL subcarrier spacing, the slot 5 corresponding to the NUL subcarrier spacing, and the symbol 0 to the symbol 3 in the slot 8 corresponding to the NUL subcarrier spacing are the silent time domain resource.

Example 4

Figure 9D:
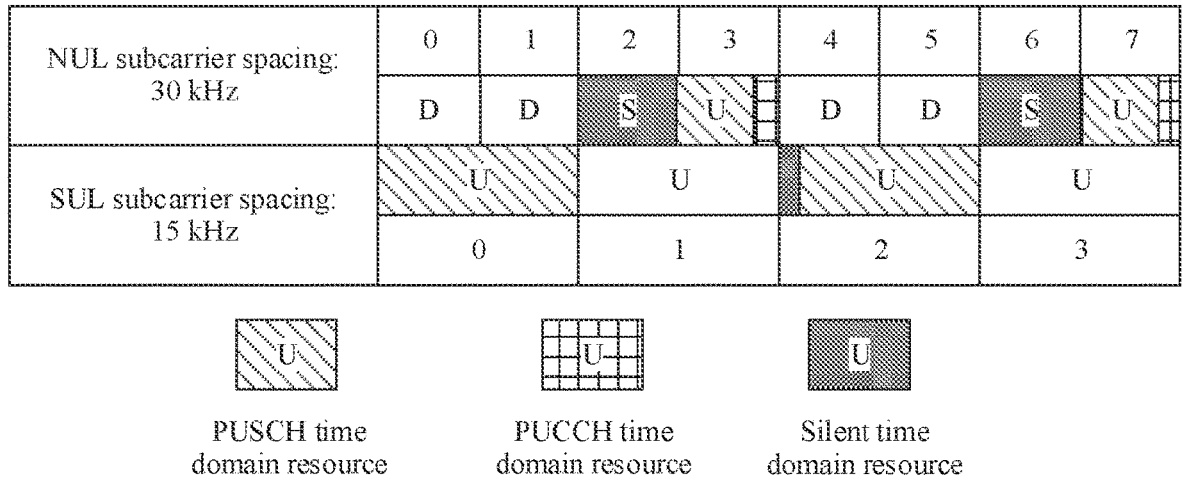
FIG. 9D is a schematic diagram of another uplink switching method according to an embodiment of this application.

As shown in FIG. 9D, the access network device 11 determines that the switching from the SUL to the NUL is to be completed within a slot 0 corresponding to an SUL subcarrier spacing to a slot 3 corresponding to an NUL subcarrier spacing, and the access network device 11 determines that a slot 2 corresponding to the NUL subcarrier spacing is the silent time domain resource: the access network device 11 determines that the switching from the NUL to the SUL is to be completed within the slot 3 corresponding to the NUL subcarrier spacing to a slot 2 corresponding to the SUL subcarrier spacing, and determines that a symbol 0 and a symbol 1 in the slot 2 corresponding to the SUL subcarrier spacing are the silent time domain resource: the access network device 11 determines that the switching from the SUL to the NUL is to be completed within the slot 2 corresponding to the SUL subcarrier spacing to a slot 7 corresponding to the NUL subcarrier spacing, and the access network device 11 determines that a slot 6 corresponding to the NUL subcarrier spacing is the silent time domain resource.

The NUL transmission time domain resource allocation information may include the NUL PUSCH time domain resource allocation information and the NUL PUCCH time domain resource allocation information, and the SUL transmission time domain resource allocation information may include the SUL PUSCH time domain resource allocation information.

The slot 2 corresponding to the NUL subcarrier spacing, the symbol 0 and the symbol 1 in the slot 2 corresponding to the SUL subcarrier spacing, and the slot 6 corresponding to the NUL subcarrier spacing may not be configured in the NUL PUSCH time domain resource allocation information, the NUL PUCCH time domain resource allocation information, and the SUL PUSCH time domain resource allocation information that are delivered by the access network device 11. As shown in FIG. 9D, the NUL PUSCH time domain resource allocation information may indicate that a symbol 0 to a symbol 9 in the slot 3 corresponding to the NUL subcarrier spacing are PUSCH time domain resources, and that a symbol 0 to a symbol 9 in the slot 7 corresponding to the NUL subcarrier spacing are PUSCH time domain resources; the NUL PUCCH time domain resource allocation information may indicate that a symbol 10 to a symbol 13 in the slot 3 corresponding to the NUL subcarrier spacing are NUL PUCCH time domain resources, and a symbol 10 to a symbol 13 in the slot 7 corresponding to the NUL subcarrier spacing are NUL PUCCH time domain resources: the SUL PUSCH time domain resource allocation information indicates that the slot 0, and a symbol 2 to a symbol 13 in the slot 2 that are corresponding to the SUL subcarrier spacing are SUL PUSCH time domain resources.

After receiving the NUL PUSCH time domain resource allocation information, the NUL PUCCH time domain resource allocation information, and the SUL PUSCH time domain resource allocation information, the terminal 12 may determine that the slot 2 corresponding to the NUL subcarrier spacing, the symbol 0 and the symbol 1 in the slot 2 corresponding to the SUL subcarrier spacing, and the slot 6 corresponding to the NUL subcarrier spacing are not configured as NUL transmission time domain resources or SUL transmission time domain resources. As shown in FIG. 9D, a preceding symbol adjacent to the slot 2 corresponding to the NUL subcarrier spacing is an SUL PUSCH time domain resource, and a subsequent symbol adjacent to the slot 2 corresponding to the NUL subcarrier spacing is an NUL PUSCH time domain resource: a preceding symbol adjacent to the symbol 0 and the symbol 1 in the slot 2 corresponding to the SUL subcarrier spacing is an NUL PUCCH time domain resource, and a subsequent symbol adjacent to the symbol 0 and the symbol 1 in the slot 2 corresponding to the SUL subcarrier spacing is an SUL PUSCH time domain resource: a preceding symbol adjacent to the slot 6 corresponding to the NUL subcarrier spacing is an NUL PUSCH time domain resource, and a subsequent symbol adjacent to the slot 6 corresponding to the NUL subcarrier spacing is an NUL PUSCH time domain resource. Therefore, the terminal 12 may determine that all of the slot 2 corresponding to the NUL subcarrier spacing, the symbol 0 and the symbol 1 in the slot 2 corresponding to the SUL subcarrier spacing, and the slot 6 corresponding to the NUL subcarrier spacing are the silent time domain resource.

In the following S706 to S710, how the terminal 12 and the access network device 11 perform transmission on the NUL transmission time domain resource and the SUL transmission time domain resource and how the access network device 11 and the terminal 12 perform operations on the silent time domain resource are described.

S706. The terminal 12 performs transmission on the SUL transmission time domain resource.

Herein, an example in which the terminal 12 performs transmission on the SUL is used for description. It should be noted that the terminal 12 may perform transmission on the NUL. This is not limited in this embodiment of this application.

After the terminal 12 receives the SUL transmission time domain resource allocation information in S705, the terminal 12 may determine the SUL transmission time domain resource, and then perform transmission on the SUL transmission time domain resource.

As shown in FIG. 8, when the terminal 12 performs transmission on the SUL transmission time domain resource, the switch works in the state 1.

For the SUL transmission time domain resource in S706, refer to related content of the SUL transmission time domain resource in S705. For example, the SUL transmission time domain resource may be the SUL PUSCH time domain resource or the SUL SRS time domain resource. When the PUCCH is configured on the SUL, the SUL transmission time domain resource may be the SUL PUCCH time domain resource. Details are not described herein again.

Examples of descriptions are provided below with reference to FIG. 9A to FIG. 9D.

Example 1: As shown in FIG. 9A, the terminal 12 performs PUSCH transmission in the slot 0, the slot 1, the slot 2, and the symbol 0 to the symbol 11 in the slot 3 that are corresponding to the SUL subcarrier spacing.

Example 2: As shown in FIG. 9B, the terminal 12 performs PUSCH transmission in the slot 0, and the symbol 0 to the symbol 9 in the slot 1 that are corresponding to the SUL subcarrier spacing.

Example 3: As shown in FIG. 9C, the terminal 12 performs PUSCH transmission in the symbol 0 to the symbol 11 in the slot 0 corresponding to the SUL subcarrier spacing, sends an SRS in the symbol 12 and the symbol 13 in the slot 0 corresponding to the SUL subcarrier spacing, and performs PUSCH transmission in the symbol 0 to the symbol 11 in the slot 1 corresponding to the SUL subcarrier spacing.

Example 4: As shown in FIG. 9D, the terminal 12 performs PUSCH transmission in the slot 0 corresponding to the SUL subcarrier spacing.

S707. The terminal 12 performs switching from the SUL to the NUL within duration of the silent time domain resource.

The preceding symbol adjacent to the silent time domain resource is the SUL transmission time domain resource, and the subsequent symbol adjacent to the silent time domain resource is the NUL transmission time domain resource.

Figure 9E:
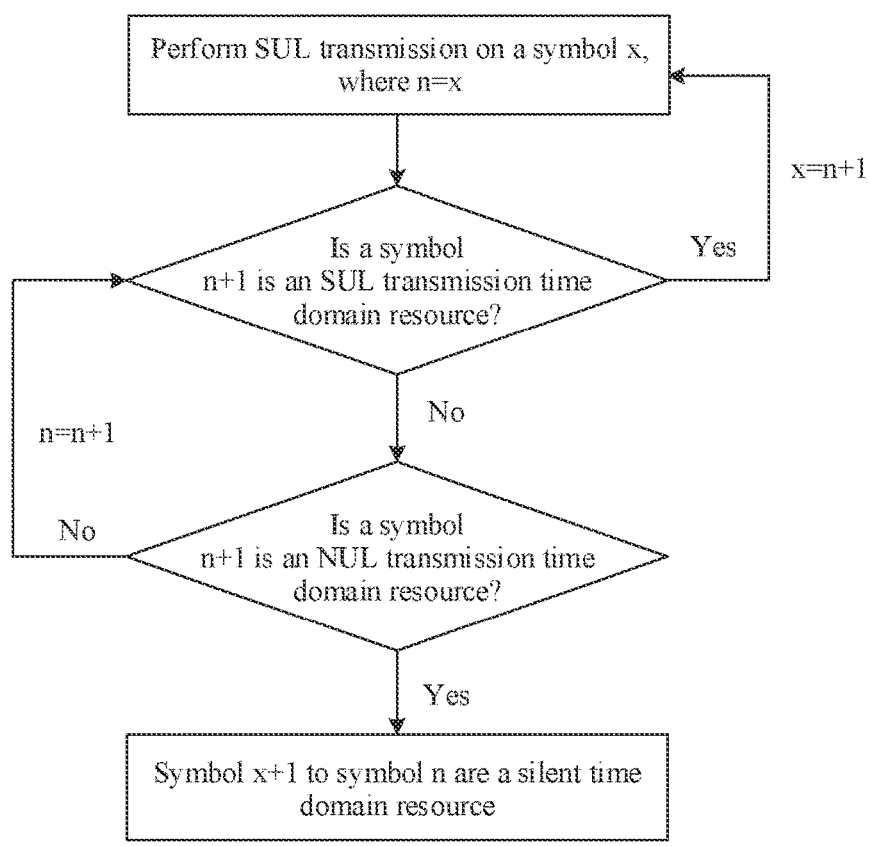
FIG. 9E is a schematic diagram of another uplink switching method according to an embodiment of this application.

Optionally. FIG. 9E provides a method for determining the silent time domain resource by the terminal 12. As shown in FIG. 9E:

In a first step. SUL transmission is performed on a symbol x, and a traversal operator n=x is set, where x may be an integer greater than or equal to 1.

In a second step, whether a symbol n+1 is an SUL transmission time domain resource is determined.

When the symbol n+1 is an SUL transmission time domain resource, step 1 may be returned to, and x may be reset, so that x=n+1. Then, an action of step 1 is performed.

When the symbol n+1 is not an SUL transmission time domain resource, go to step 3.

In a third step, whether the symbol n+1 is an NUL transmission time domain resource is determined.

When the symbol n+1 is not an NUL transmission time domain resource, n may be reset, and n+1 is assigned to n. Then, go to the second step. An action of the second step is performed. For example, in the second step, a value is reassigned to n+1, to determine whether the symbol n+1 is an SUL transmission time domain resource.

In a fourth step, when the symbol n+1 is an NUL transmission time domain resource, it may be determined that time domain resources of a symbol x+1 to a symbol n (including the symbol x+1, a symbol x+2, a symbol x+3, . . . , and the symbol n) are the silent time domain resource.

As shown in FIG. 8, the terminal 12 may perform switching from the SUL to the NUL within duration of the silent time domain resource by changing a state of the switch from the state 1 to the state 2.

The access network device 11 keeps silent within duration of the silent time domain resource.

It should be noted that, in this embodiment of this application, that the access network device 11 keeps silent within duration of the silent time domain resource may be: For the terminal 12, the access network device 11 keeps silent within duration of the silent time domain resource. For another terminal, the access network device 11 may receive data of the another terminal on the silent time domain resource.

Optionally, when the terminal 12 determines that there is no silent time domain resource but the terminal 12 needs to perform switching from the SUL to the NUL, the terminal 12 may not use a transmission time domain resource with a low priority based on the following priorities to perform transmission, and preferentially use a transmission time domain resource with the low priority to complete the switching from the SUL to the NUL. The priorities are as follows: PUCCH>PUSCH>SRS, and NUL>SUL.

S708. The terminal 12 performs transmission on the NUL transmission time domain resource.

After the terminal 12 receives the NUL transmission time domain resource allocation information in S705, the terminal 12 may determine the NUL transmission time domain resource.

After the terminal 12 performs switching from the SUL to the NUL in S707, the terminal 12 may perform transmission on the NUL transmission time domain resource.

As shown in FIG. 8, when the terminal 12 performs transmission on the NUL transmission time domain resource, the switch works in the state 2.

For the NUL transmission time domain resource in S708, refer to related content of the NUL transmission time domain resource in S704. For example, the NUL transmission time domain resource may be the NUL PUSCH time domain resource or the NUL SRS time domain resource. When the PUCCH is configured on the NUL, the NUL transmission time domain resource may be the NUL PUCCH time domain resource. Details are not described herein again.

S709. The terminal 12 performs switching from the NUL to the SUL within duration of the silent time domain resource.

The access network device 11 keeps silent within duration of the silent time domain resource.

S710. The terminal 12 performs transmission on the SUL transmission time domain resource.

In the foregoing solution, the terminal 12 reports the switching time period information, and the access network device 11 configures the silent time domain resource. On one hand, in a process of switching between the SUL and the NUL of the terminal 12, the access network device 11 can be prevented from indicating the terminal 12 to perform SUL transmission or NUL transmission since the access network device 11 does not know that the terminal 12 is performing switching between the SUL and the NUL, thereby avoiding an uplink transmission failure. On the other hand, after the terminal 12 completes the switching between the SUL and the NUL, 2T may be used for the NUL to improve uplink transmission performance.

CA Scenario

Figure 10:
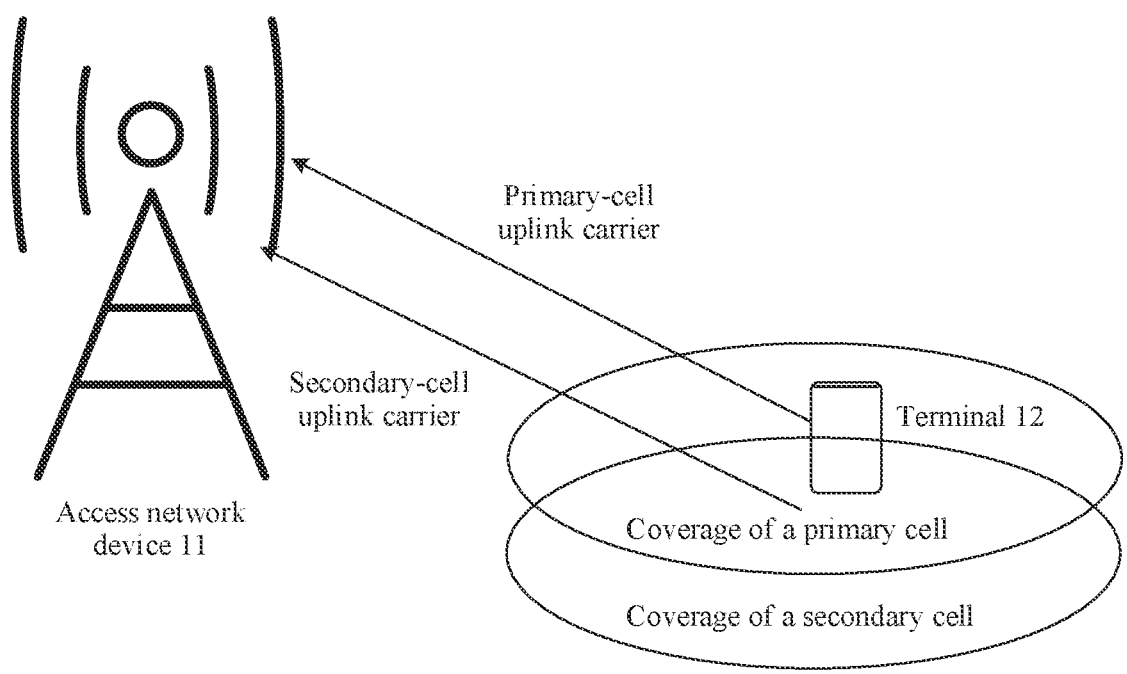
FIG. 10 is a schematic diagram of a CA scenario according to an embodiment of this application.

FIG. 10 is a schematic diagram of a CA scenario. As shown in FIG. 10, an access network device 11 provides a primary-cell uplink carrier and a secondary-cell uplink carrier for a terminal 12. The primary-cell uplink carrier provides a primary cell, and the secondary-cell uplink carrier provides a secondary cell. The terminal 12 may be located within coverage of the primary cell and coverage of the secondary cell. It should be noted that the coverage of the primary cell and the coverage of the secondary cell are not limited in the embodiments of this application. For ease of description, one cell is referred to as the primary cell, and another cell is referred to as the secondary cell. The primary cell and the secondary cell may be interchanged, and names of the primary cell and the secondary cell do not constitute a limitation.

The primary cell may use a TDD frequency band, and the secondary cell may use a TDD frequency band or an FDD frequency band. When the primary cell uses a TDD frequency band and the secondary cell uses a TDD frequency band, the CA scenario in this case may be referred to as a TDD+TDD CA scenario. When the primary cell uses a TDD frequency band and the secondary cell uses an FDD frequency band, the CA scenario in this case may be referred to as a TDD+FDD CA scenario.

TDD+TDD CA Scenario

Figure 11A:
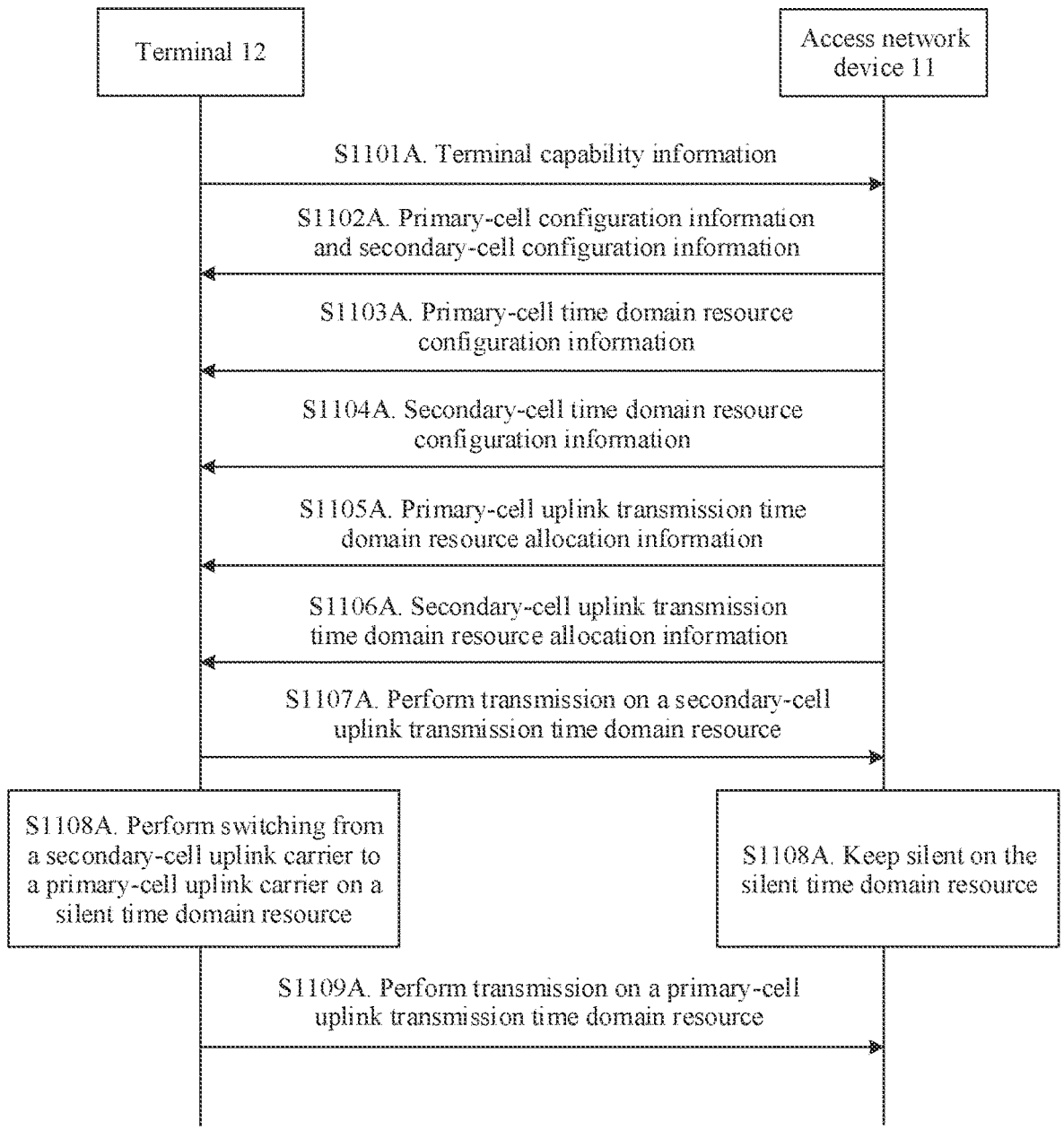
FIG. 11A is a schematic diagram of an uplink transmission method according to an embodiment of this application.

A solution in the TDD+TDD CA scenario is first described below. FIG. 11A shows an uplink transmission method. As shown in FIG. 11A:

S1101A. The terminal 12 sends terminal capability information to the access network device 11.

The terminal capability information may include CA frequency band combination information, a quantity of MIMO layers supported by a primary-cell frequency band, and a quantity of MIMO layers supported by a secondary-cell frequency band.

Optionally, the CA frequency band combination information may indicate the primary-cell frequency band and the secondary-cell frequency band that are supported by the terminal 12.

In an example, the primary-cell frequency band may be a TDD frequency band, and the secondary-cell frequency band may be a TDD frequency band.

For example, the CA frequency band combination information may indicate that the terminal 12 supports n41 and n79, where n41 is a TDD frequency band, n41 indicates that both a UL frequency band and a DL frequency band are 2496 MHz to 2690 MHz, and n79 indicates that both the UL frequency band and the DL frequency band are 4400 MHz to 5000 MHZ.

An uplink between the terminal 12 and the access network device 11 may include two uplink carriers, that is, a primary-cell uplink carrier and a secondary-cell uplink carrier. The primary-cell uplink carrier uses an uplink frequency band of the primary-cell frequency band, and the secondary-cell uplink carrier uses an uplink frequency band of the secondary-cell frequency band.

The quantity of MIMO layers supported by the primary-cell frequency band may be n, where n is an integer greater than or equal to 1. For example, n is 1, 2, or 4. That the quantity of MIMO layers supported by the first frequency band is n (n is an integer greater than or equal to 1) may be referred to as that the first frequency band supports n transmitters (T, transmitter), primary-cell frequency band nT, or primary-cell uplink carrier 1T.

MIMO capability supported by the secondary-cell frequency band may be m layers, where m is an integer greater than or equal to 1. For example, m is 1, 2, or 4. That the quantity of MIMO layers supported by the secondary-cell frequency band is m (m is an integer greater than or equal to 1) may be referred to as that a second frequency band supports mT, secondary-cell frequency band mT, or secondary-cell uplink carrier 2T.

For example, the quantity of MIMO layers supported by the primary-cell frequency band may be 1, that is, primary-cell frequency band 1T or primary-cell uplink carrier 1T. The quantity of MIMO layers supported by the secondary-cell frequency band may be 2, that is, secondary-cell frequency band 2T or the secondary-cell uplink carrier 2T.

Optionally, the terminal capability information may include switching time period information, where the switching time period information is used to indicate a switching time period for switching between the primary-cell uplink carrier and the secondary-cell uplink carrier of the terminal 12.

Optionally, the switching time period may be a time length of a time range or a time length of a period of time, and the switching time period may be represented by using an OFDM symbol. For example, the switching time period may be one OFDM symbol, or two or more OFDM symbols.

Alternatively, the switching time period may be represented by using a time value. For example, the switching time period may be 0 μs, 30 μs, 140 μs, or another value.

Optionally, the switching time period for the switching between the primary-cell uplink carrier and the secondary-cell uplink carrier may be a time period for switching from the primary-cell uplink carrier to the secondary-cell uplink carrier or a time period for switching from the secondary-cell uplink carrier to the primary-cell uplink carrier, and the time period for the switching from the primary-cell uplink carrier to the secondary-cell uplink carrier may be different from the time period for the switching from the secondary-cell uplink carrier to the primary-cell uplink carrier.

Optionally, the terminal 12 may separately report the time period for the switching from the primary-cell uplink carrier to the secondary-cell uplink carrier and the time period for the switching from the secondary-cell uplink carrier to the primary-cell uplink carrier.

Optionally, the switching time period for the switching between the primary-cell uplink carrier and the secondary-cell uplink carrier may be a larger one of the time period for the switching from the secondary-cell uplink carrier to the primary-cell uplink carrier and the time period for the switching from the primary-cell uplink carrier to the secondary-cell uplink carrier, or an average value of the time period for the switching from the primary-cell uplink carrier to the secondary-cell uplink carrier and the time period for the switching from the secondary-cell uplink carrier to the primary-cell uplink carrier.

Optionally, for different CA frequency band combinations, switching time periods for switching between the primary-cell uplink carrier and the secondary-cell uplink carrier may be different. For example, for different CA frequency band combinations, time periods for switching from the primary-cell uplink carrier to the secondary-cell uplink carrier are different, and time periods for switching from the secondary-cell uplink carrier to the primary-cell uplink carrier may be different.

Optionally, the time period for the switching from the primary-cell uplink carrier to the secondary-cell uplink carrier may be an average time period for switching from the primary-cell uplink carrier to the secondary-cell uplink carrier, a shortest time period for switching from the primary-cell uplink carrier to the secondary-cell uplink carrier, or a longest time period for switching from the primary-cell uplink carrier to the secondary-cell uplink carrier. The time period for the switching from the secondary-cell uplink carrier to the primary-cell uplink carrier may be an average time period for switching from the secondary-cell uplink carrier to the primary-cell uplink carrier, a shortest time period for switching from the secondary-cell uplink carrier to the primary-cell uplink carrier, or a longest time period for switching from the secondary-cell uplink carrier to the primary-cell uplink carrier.

Optionally, in addition to the foregoing explanation of the switching time period for the switching between the primary-cell uplink carrier and the secondary-cell uplink carrier, the switching time period for the switching between the primary-cell uplink carrier and the secondary-cell uplink carrier may be another time period required for switching between the primary-cell uplink carrier and the secondary-cell uplink carrier. This is not limited in this embodiment of this application.

Optionally, the switching time period may be determined by a hardware circuit that implements the secondary-cell uplink carrier and the primary-cell uplink carrier.

Optionally, the secondary-cell uplink carrier and the primary-cell uplink carrier may not share a radio frequency channel. In this case, the switching time period may be 0 μs.

Optionally, the secondary-cell uplink carrier and the primary-cell uplink carrier may share a radio frequency channel, and the switching time period may be a switching time period for switching of the shared radio frequency channel between the primary-cell uplink carrier and the secondary-cell uplink carrier. For example, the switching time period may be 0 μs, 30 μs, 140 μs, or another value.

Figure 12A:
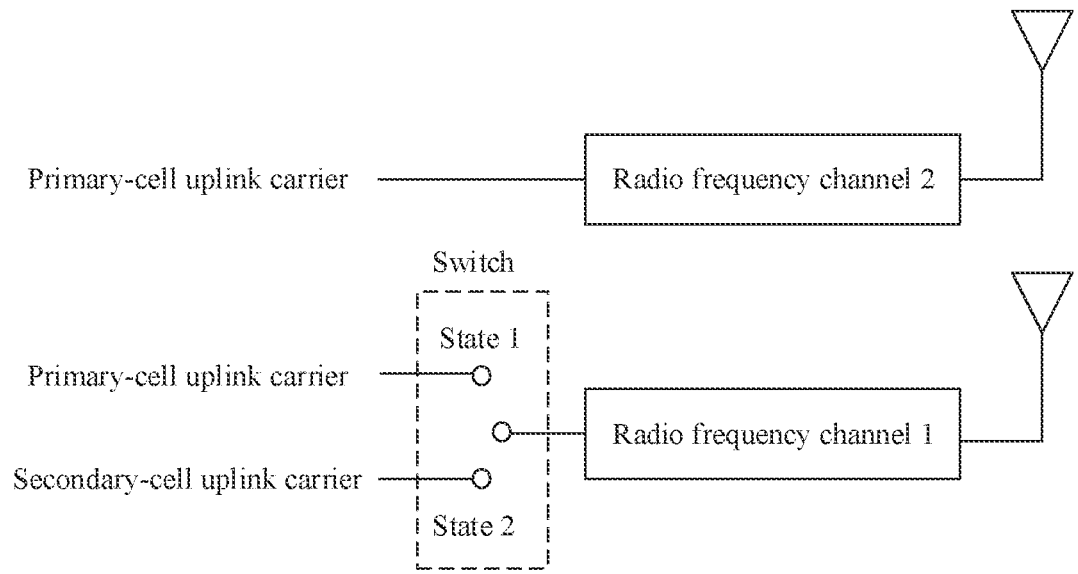
FIG. 12A is a schematic diagram of a radio frequency channel according to an embodiment of this application.

In a first example, primary-cell uplink carrier 2T, secondary-cell uplink carrier 1T, and a radio frequency chip may support 2T, where the primary-cell uplink carrier and the secondary-cell uplink carrier may share one radio frequency channel (1T), and the primary-cell uplink carrier may exclusively use one radio frequency channel (1T). For example, as shown in FIG. 12A, the primary-cell uplink carrier and the secondary-cell uplink carrier share a radio frequency channel 1, and the primary-cell uplink carrier exclusively occupies a radio frequency channel 2. When the primary-cell uplink carrier works, a switch works in a state 1, and primary-cell uplink carrier 2T is provided through the radio frequency channel 1 and the radio frequency channel 2. When the secondary-cell uplink carrier works, the switch works in a state 2, and secondary-cell uplink carrier 1T is provided through the radio frequency channel 1. A specific time period is required when the radio frequency channel 1 is switched between the primary-cell uplink carrier and the secondary-cell uplink carrier. For example, the radio frequency channel 1 works on the primary-cell uplink carrier, starts to switch to the secondary-cell uplink carrier at a moment t1, and completes switching to the secondary-cell uplink carrier at a moment t2. In this case, the time period for the switching of the radio frequency channel 1 from the primary-cell uplink carrier to the secondary-cell uplink carrier is t2-t1.

Figure 12B:
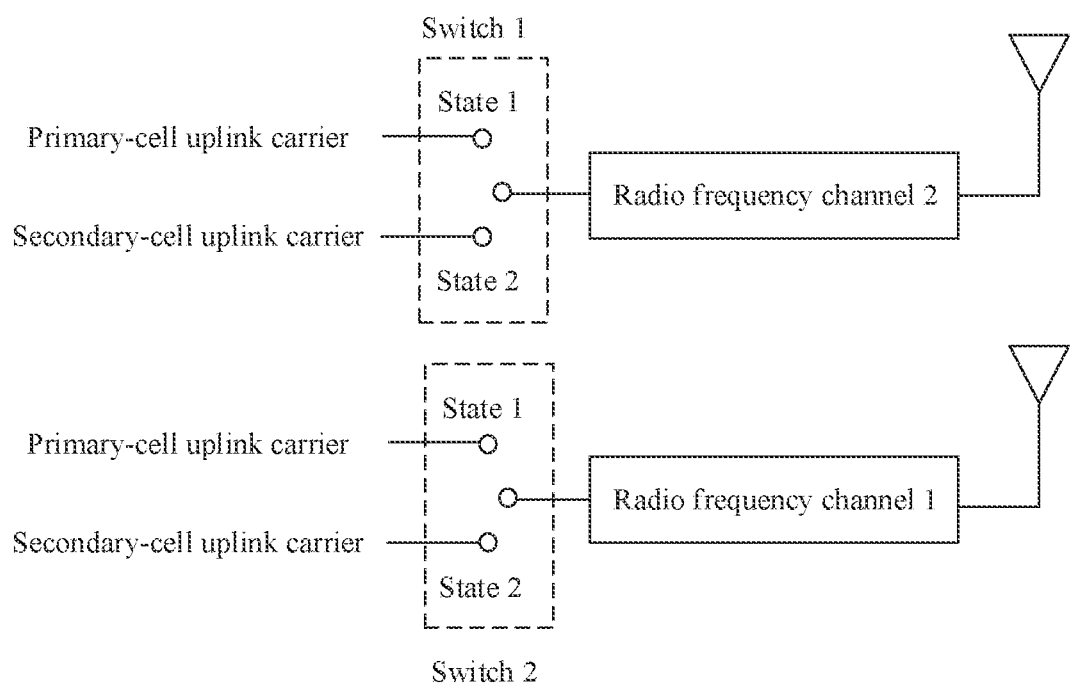
FIG. 12B is a schematic diagram of another radio frequency channel according to an embodiment of this application.

In a second example, the primary-cell uplink carrier 2T, the secondary-cell uplink carrier 2T, a radio frequency chip may support 2T, and the primary-cell uplink carrier and the secondary-cell uplink carrier may share two radio frequency channels (2T). For example, as shown in FIG. 12B, the primary-cell uplink carrier and the secondary-cell uplink carrier share a radio frequency channel 1 and a radio frequency channel 2. When the primary-cell uplink carrier works, a switch 1 works in a state 1, a switch 2 works in a state 1, and primary-cell uplink carrier 2T is provided through the radio frequency channel 1 and the radio frequency channel 2. When the secondary-cell uplink carrier works, the switch 1 works in a state 2, the switch 2 works in a state 2, and secondary-cell uplink carrier 2T is provided through the radio frequency channel 1 and the radio frequency channel 2. A specific time period is required when the radio frequency channel 1 and the radio frequency channel 2 are switched between the primary-cell uplink carrier and the secondary-cell uplink carrier. For example, the radio frequency channel 1 and the radio frequency channel 2 work on the primary-cell uplink carrier, separately start to switch to the secondary-cell uplink carrier at a moment t1, and both complete switching to the secondary-cell uplink carrier at a moment t2. In this case, the time period for the switching of the radio frequency channel 1 and the radio frequency channel 2 from the primary-cell uplink carrier to the secondary-cell uplink carrier is t2-t1.

Optionally, the terminal 12 may not report the switching time period for the switching between the primary-cell uplink carrier and the secondary-cell uplink carrier. The access network device 11 and the terminal 12 may pre-configure the switching time period. For details, refer to related content of pre-configuring, by the terminal 12 and the access network device 11, the switching time period for the switching between the SUL and the NUL in S601.

Optionally, before S1101A, the terminal 12 may initiate random access on the primary-cell uplink carrier. After the terminal 12 performs random access, the terminal 12 may send the terminal capability information on the primary-cell uplink carrier.

For the switching time period for the switching between the primary-cell uplink carrier and the secondary-cell uplink carrier, refer to related content of the switching time period for the switching between the SUL and the NUL in the SUL scenario.

S1102A. The access network device 11 sends primary-cell configuration information and secondary-cell configuration information to the terminal 12.

After receiving the terminal capability information sent by the terminal 12, the access network device 11 may configure a primary cell and a secondary cell for the terminal 12, for example, deliver the primary-cell configuration information and the secondary-cell configuration information.

The primary-cell configuration information may include one or more of primary-cell PUSCH configuration information, primary-cell PUCCH configuration information, and primary-cell SRS configuration information. A primary-cell PUSCH may be used by the terminal 12 to send data on the primary-cell uplink carrier, and a primary-cell PUCCH may be used by the terminal 12 to send a downlink data feedback, for example, a HARQ feedback, on the primary-cell uplink carrier.

The secondary-cell configuration information may include one or more of secondary-cell PUSCH configuration information, secondary-cell PUCCH configuration information, and secondary-cell SRS configuration information. A secondary-cell PUSCH may be used by the terminal 12 to send data on the secondary-cell uplink carrier, and a secondary-cell PUCCH may be used by the terminal 12 to send a downlink data feedback, for example, a HARQ feedback, on the secondary-cell uplink carrier.

The access network device 11 may configure both the primary-cell PUSCH and the secondary-cell PUSCH for the terminal 12.

The access network device 11 may configure both a primary-cell SRS and a secondary-cell SRS for the terminal 12. The SRS herein may be a periodic SRS, a semi-persistent SRS, or an aperiodic SRS. For example, the primary-cell SRS may be a periodic primary-cell SRS, a semi-persistent primary-cell SRS, or an aperiodic primary-cell SRS, and the secondary-cell SRS may be a periodic secondary-cell SRS, a semi-persistent secondary-cell SRS, or an aperiodic secondary-cell SRS.

The access network device 11 may configure both a primary-cell uplink BWP and a secondary-cell uplink BWP for the terminal 12. A primary-cell uplink BWP subcarrier spacing and a secondary-cell uplink BWP subcarrier spacing may be the same or different. For example, the primary-cell uplink BWP subcarrier spacing is 30 kHz, and the secondary-cell uplink BWP subcarrier spacing is 15 KHz.

The access network device 11 may configure both the primary-cell PUCCH and the secondary-cell PUSCH for the terminal 12.

For sending of the primary-cell configuration information and the secondary-cell configuration information by the access network device 11 to the terminal 12, refer to related content of an SpCellConfig information element and an SCellConfig information element in a CellGroupConfig information element in section 6.3.2 in TS 38.331 V15.2.1.

Optionally, the primary-cell configuration information and the secondary-cell configuration information may be carried in a same message or different messages. This is not limited in this embodiment of this application.

Optionally, the access network device 11 may send the secondary-cell configuration information to the terminal 12 after S1104A.

S1103A. The access network device 11 sends primary-cell time domain resource configuration information to the terminal 12.

The secondary-cell time domain resource configuration information may indicate one or more of a secondary-cell uplink time domain resource, a secondary-cell downlink time domain resource, and a secondary-cell flexible time domain resource.

For other content of the secondary-cell time domain resource configuration information, refer to the TDD time domain resource configuration information in S503.

S1104A. The access network device 11 sends secondary-cell time domain resource configuration information to the terminal 12.

The secondary-cell time domain resource configuration information may indicate one or more of a secondary-cell uplink time domain resource, a secondary-cell downlink time domain resource, and a secondary-cell flexible time domain resource.

For other content of the secondary-cell time domain resource configuration information, refer to the TDD time domain resource configuration information in S503.

In a first implementation, the primary-cell uplink time domain resource and the secondary-cell uplink time domain resource may be staggered, so that uplink transmission may be performed on different time domain resources by using the primary-cell uplink carrier and the secondary-cell uplink carrier.

In S1103A and S1104A, the primary-cell uplink time domain resource indicated by the primary-cell time domain resource configuration information does not overlap the secondary-cell uplink time domain resource indicated by the secondary-cell time domain resource configuration information. Optionally, the primary-cell flexible time domain resource does not overlap the secondary-cell flexible time domain resource, the primary-cell uplink time domain resource does not overlap the secondary-cell flexible time domain resource, and the primary-cell flexible time domain resource does not overlap the secondary-cell uplink time domain resource.

The following provides descriptions with reference to FIG. 13A.

A primary-cell subcarrier spacing is 30 kHz, and one slot occupies 0.5 ms. The primary-cell time domain resource configuration information may indicate, by using 5 ms as a period, that 10 slots corresponding to the primary-cell subcarrier spacing in the period of 5 ms are DDDDDDDSUU. FIG. 13A shows a primary-cell time domain resource configuration in one period. As shown in FIG. 13A, the primary-cell downlink time domain resource is a slot 0, a slot 1, a slot 2, a slot 3, a slot 4, a slot 5, and a slot 6 that are corresponding to the primary-cell subcarrier spacing, the primary-cell flexible time domain resource is a slot 7 corresponding to the primary-cell subcarrier spacing, and the primary-cell uplink time domain resource is a slot 8 and a slot 9 that are corresponding to the primary-cell subcarrier spacing.

A secondary-cell subcarrier spacing is 15 kHz, and one slot occupies 1 ms. The secondary-cell time domain resource configuration information may indicate, by using 5 ms as a period, that 5 slots corresponding to the secondary-cell subcarrier spacing in the period of 5 ms are DSUDD. FIG. 13A shows a secondary-cell time domain resource configuration in one period. As shown in FIG. 13A, the secondary-cell downlink time domain resource is a slot 0, a slot 3, and a slot 4 that are corresponding to the secondary-cell subcarrier spacing, the secondary-cell flexible time domain resource is a slot 1 corresponding to the secondary-cell subcarrier spacing, and the secondary-cell uplink time domain resource is a slot 2 corresponding to the secondary-cell subcarrier spacing.

As shown in FIG. 13A, the slot 8 and the slot 9 (primary-cell uplink slot resources) corresponding to the primary-cell subcarrier spacing, the slot 7 (a primary-cell flexible slot resource) corresponding to the primary-cell subcarrier spacing, the slot 2 (a secondary-cell uplink slot resource) corresponding to the secondary-cell subcarrier spacing, and the slot 1 (a secondary-cell flexible time domain resource) corresponding to the secondary-cell subcarrier spacing do not overlap each other.

In a second implementation, the primary-cell uplink time domain resource may overlap the secondary-cell uplink time domain resource.

Optionally, the primary-cell flexible time domain resource may overlap the secondary-cell flexible time domain resource.

In S1103A and S1104A, the primary-cell uplink time domain resource indicated by the primary-cell time domain resource configuration information overlaps the secondary-cell uplink time domain resource indicated by the secondary-cell time domain resource configuration information.

The following provides descriptions with reference to FIG. 13B.

A primary-cell subcarrier spacing is 30 kHz, and one slot occupies 0.5 ms. The primary-cell time domain resource configuration information may indicate, by using 5 ms as a period, that 10 slots corresponding to the primary-cell subcarrier spacing in the period of 5 ms are DDDSUDDDSU. FIG. 13B shows a primary-cell time domain resource configuration in one period. As shown in FIG. 13B, the primary-cell downlink time domain resource is a slot 0, a slot 1, a slot 2, a slot 5, a slot 6, and a slot 7 that are corresponding to the primary-cell subcarrier spacing, the primary-cell flexible time domain resource is a slot 3 and a slot 8 that are corresponding to the primary-cell subcarrier spacing, and the primary-cell uplink time domain resource is a slot 4 and a slot 9 that are corresponding to the primary-cell subcarrier spacing.

A secondary-cell subcarrier spacing is 15 kHz, and one slot occupies 1 ms. The secondary-cell time domain resource configuration information may indicate, by using 5 ms as a period, that 10 slots corresponding to the secondary-cell subcarrier spacing in the period of 5 ms are DSUDD. FIG. 13B shows a secondary-cell time domain resource configuration in one period. As shown in FIG. 13B, the secondary-cell downlink time domain resource is a slot 0, a slot 3, and a slot 4 that are corresponding to the secondary-cell subcarrier spacing, the secondary-cell flexible time domain resource is a slot 1 corresponding to the secondary-cell subcarrier spacing, and the secondary-cell uplink time domain resource is a slot 2 corresponding to the secondary-cell subcarrier spacing.

As shown in FIG. 13B, the slot 4 (a primary-cell flexible slot resource) corresponding to the primary-cell subcarrier spacing and the slot 2 (a secondary-cell uplink slot resource) corresponding to the secondary-cell subcarrier spacing overlap, and the slot 3 (a primary-cell flexible slot resource) corresponding to the primary-cell subcarrier spacing and the slot 1 (a secondary-cell flexible time domain resource) corresponding to the secondary-cell subcarrier spacing overlap.

When the primary-cell uplink time domain resource and the secondary-cell uplink time domain resource may overlap, a primary-cell uplink transmission time domain resource and a secondary-cell uplink transmission time domain resource in S1105A and S1106A may not overlap, so that transmission can be performed on different time domain resources by using the primary-cell uplink carrier and the secondary-cell uplink carrier.

S1105A. The access network device 11 sends primary-cell uplink transmission time domain resource allocation information to the terminal 12.

The primary-cell uplink transmission time domain resource allocation information is used to indicate the primary-cell uplink transmission time domain resource.

The primary-cell uplink transmission time domain resource allocation information may include one or two of primary-cell PUSCH time domain resource allocation information, primary-cell SRS time domain resource allocation information, and primary-cell PUCCH time domain resource allocation information.

The primary-cell PUSCH time domain resource allocation information, the primary-cell SRS time domain resource allocation information, and the primary-cell PUCCH time domain resource allocation information are separately described below.

(1) Primary-Cell PUSCH Time Domain Resource Allocation Information

The primary-cell PUSCH time domain resource allocation information is used to indicate a primary-cell PUSCH time domain resource, and the primary-cell PUSCH time domain resource may be understood as a time domain resource for sending a PUSCH on the primary-cell uplink carrier.

Optionally, the primary-cell PUSCH time domain resource allocation information may indicate that a part or all of the primary-cell uplink time domain resource is the primary-cell PUSCH time domain resource.

Optionally, the primary-cell PUSCH time domain resource allocation information may be carried in DCI.

For the primary-cell PUSCH time domain resource allocation information, refer to related content of time domain resource allocation (Resource allocation in time domain) in section 5.1.2.1 in 3GPP TS 38.214 V15.2.0.

(2) Primary-Cell SRS Time Domain Resource Allocation Information

The primary-cell SRS time domain resource allocation information is used to indicate a primary-cell SRS time domain resource, and the primary-cell SRS time domain resource may be understood as a time domain resource for sending an SRS on the primary-cell uplink carrier.

Optionally, the primary-cell SRS time domain resource allocation information may indicate that a part or all of the primary-cell uplink time domain resource and the primary-cell flexible time domain resource is the primary-cell SRS time domain resource.

For the primary-cell SRS time domain resource allocation information, refer to related content of the NUL SRS time domain resource allocation information in S704.

(3) Primary-Cell PUCCH Time Domain Resource Allocation Information

The primary-cell PUCCH time domain resource allocation information is used to indicate a primary-cell PUCCH time domain resource, and the primary-cell PUCCH time domain resource may be understood as a time domain resource for sending a PUCCH on the primary-cell uplink carrier.

Optionally, the primary-cell PUCCH time domain resource allocation information may indicate that a part or all of the primary-cell uplink time domain resource is the primary-cell PUCCH time domain resource.

For the primary-cell PUCCH time domain resource allocation information, refer to related content of the NUL PUCCH time domain resource allocation information in S704.

S1106A. The access network device 11 sends secondary-cell uplink transmission time domain resource allocation information to the terminal 12.

The secondary-cell uplink transmission time domain resource allocation information is used to indicate the secondary-cell uplink transmission time domain resource.

The secondary-cell uplink transmission time domain resource allocation information may include one or two of secondary-cell PUSCH time domain resource allocation information, secondary-cell SRS time domain resource allocation information, and secondary-cell PUCCH time domain resource allocation information.

The secondary-cell PUSCH time domain resource allocation information, the secondary-cell SRS time domain resource allocation information, and the secondary-cell PUCCH time domain resource allocation information are separately described below.

(1) Secondary-Cell PUSCH Time Domain Resource Allocation Information

The secondary-cell PUSCH time domain resource allocation information is used to indicate a secondary-cell PUSCH time domain resource, and the secondary-cell PUSCH time domain resource may be understood as a time domain resource for sending a PUSCH on the secondary-cell uplink carrier.

Optionally, the secondary-cell PUSCH time domain resource allocation information may indicate that a part or all of the secondary-cell uplink time domain resource is the secondary-cell PUSCH time domain resource.

Optionally, the secondary-cell PUSCH time domain resource allocation information may be carried in DCI.

For the secondary-cell PUSCH time domain resource allocation information, refer to related content of time domain resource allocation (Resource allocation in time domain) in section 5.1.2.1 in 3GPP TS 38.214 V15.2.0.

(2) Secondary-Cell SRS Time Domain Resource Allocation Information

The secondary-cell SRS time domain resource allocation information is used to indicate a secondary-cell SRS time domain resource, and the secondary-cell SRS time domain resource may be understood as a time domain resource for sending an SRS on the secondary-cell uplink carrier.

Optionally, the secondary-cell SRS time domain resource allocation information may indicate that a part of the secondary-cell uplink time domain resource and the secondary-cell flexible time domain resource is the secondary-cell SRS time domain resource.

For the secondary-cell SRS time domain resource allocation information, refer to related content of the NUL SRS time domain resource allocation information in S704.

(3) Secondary-Cell PUCCH Time Domain Resource Allocation Information

The secondary-cell PUCCH time domain resource allocation information is used to indicate a secondary-cell PUCCH time domain resource, and the secondary-cell PUCCH time domain resource may be understood as a time domain resource for sending a PUCCH on the secondary-cell uplink carrier.

Optionally, the secondary-cell PUCCH time domain resource allocation information may indicate that a part of the secondary-cell uplink time domain resource is the secondary-cell PUCCH time domain resource.

For the secondary-cell PUCCH time domain resource allocation information, refer to related content of the NUL PUCCH time domain resource allocation information in S704.

It should be noted that the PUCCH herein may be configured in both the primary cell and the secondary cell, that is, the access network device 11 may send the primary-cell PUCCH time domain resource allocation information and the secondary-cell PUCCH time domain resource allocation information to the terminal 12.

In S1105A and S1106A, the access network device 11 may allocate a silent time domain resource to the terminal 12, where the silent time domain resource is used to perform switching between the primary-cell uplink carrier and the secondary-cell uplink carrier of the terminal 12.

The silent time domain resource is a segment of consecutive time domain resources.

A length of the silent time domain resource is greater than or equal to a length of the switching time period for the switching between the primary-cell uplink carrier and the secondary-cell uplink carrier.

Optionally, the silent time domain resource is neither the primary-cell uplink transmission time domain resource nor the secondary-cell uplink transmission time domain resource.

Optionally, a preceding symbol adjacent to the silent time domain resource is the primary-cell uplink transmission time domain resource, and a subsequent symbol adjacent to the silent time domain resource is the secondary-cell uplink transmission time domain resource. Alternatively, a preceding symbol adjacent to the silent time domain resource is the secondary-cell uplink transmission time domain resource, and a subsequent symbol adjacent to the silent time domain resource is the primary-cell uplink transmission time domain resource.

Optionally, the silent time domain resource may be the primary-cell downlink time domain resource or the secondary-cell downlink time domain resource.

In the first implementation, optionally, in S1105A and S1106A, the primary-cell uplink time domain resource and the secondary-cell uplink time domain resource do not overlap.

The access network device 11 may determine whether there is a time domain resource, where the time domain resource meets: (1) A length of the time domain resource is greater than or equal to the length of the switching time period for the switching between the primary-cell uplink carrier and the secondary-cell uplink carrier: and (2) A preceding symbol adjacent to the time domain resource is the primary-cell uplink time domain resource or the primary-cell flexible time domain resource, and a subsequent symbol adjacent to the time domain resource is the secondary-cell uplink time domain resource or the secondary-cell flexible time domain resource; or a preceding symbol adjacent to the time domain resource is the secondary-cell uplink time domain resource or the secondary-cell flexible time domain resource, and a subsequent symbol adjacent to the time domain resource is the primary-cell uplink time domain resource or the primary-cell flexible time domain resource. If the time domain resource exists, the time domain resource may be the silent time domain resource. If the time domain resource does not exist, refer to the following second implementation.

Optionally, the silent time domain resource is neither the primary-cell uplink transmission time domain resource or the primary-cell flexible time domain resource, nor the secondary-cell uplink time domain resource or the secondary-cell flexible time domain resource.

For example, as shown in FIG. 13A, a preceding symbol adjacent to the slot 6 corresponding to the primary-cell subcarrier spacing is the secondary-cell uplink time domain resource, a subsequent symbol adjacent to the slot 6 is the primary-cell flexible time domain resource, and a length of the slot 6 corresponding to the primary-cell subcarrier spacing exceeds the length of the switching time period for the switching between the primary-cell uplink carrier and the secondary-cell uplink carrier, for example, 140 microseconds. The access network device 11 may determine the slot 6 corresponding to the primary-cell subcarrier spacing as the silent time domain resource. The access network device 11 may configure a part or all of the primary-cell uplink time domain resource as the primary-cell PUSCH time domain resource, configure a part or all of the primary-cell uplink time domain resource and the primary-cell flexible time domain resource as the primary-cell SRS time domain resource, and configure a part or all of the primary-cell uplink time domain resource as the primary-cell PUCCH time domain resource. This is not limited in this application.

In the second implementation, the access network device 11 may determine the silent time domain resource by using the primary-cell uplink transmission time domain resource and the secondary-cell uplink transmission time domain resource that are allocated to the terminal 12.

Optionally, the primary-cell uplink transmission time domain resource overlaps the secondary-cell uplink transmission time domain resource, and the primary-cell uplink transmission time domain resource and the secondary-cell uplink transmission time domain resource that are configured by the access network device 11 for the terminal 12 may not overlap.

Optionally, the access network device 11 may determine which one of the primary-cell uplink carrier and the secondary-cell uplink carrier has a higher throughput on an overlapping uplink time domain resource, and configure the overlapping uplink time domain resource as a transmission time domain resource for which an uplink carrier has a higher throughput.

Optionally, the access network device 11 may determine, based on signal quality of the primary-cell uplink carrier and the secondary-cell uplink carrier, that the overlapping time domain resource is used for primary-cell uplink transmission or secondary-cell uplink transmission. For example, signal quality of the primary-cell uplink carrier may be an uplink signal to interference plus noise ratio (signal to interference plus noise ratio, SINR) of the primary-cell uplink carrier, or the signal quality of the primary-cell uplink carrier may be measured by using downlink reference signal received power (reference signal received power, RSRP) of a primary-cell downlink carrier. The secondary-cell uplink carrier may be an uplink signal to interference plus noise ratio (signal to interference plus noise ratio, SINR) of the secondary-cell uplink carrier, or the signal quality of the secondary-cell uplink carrier may be measured by using downlink reference signal received power (reference signal received power, RSRP) of a secondary-cell downlink carrier.

Optionally, the access network device 11 may determine, based on load statuses of the primary-cell uplink carrier and the secondary-cell uplink carrier, that the overlapping time domain resource is used for primary-cell uplink transmission or secondary-cell uplink transmission. For example, the load status of the primary-cell uplink carrier may be an average load rate of the primary-cell uplink carrier within a period of time, and the load status of the secondary-cell uplink carrier may be an average load rate of the secondary-cell uplink carrier within a period of time.

Optionally, the access network device 11 may determine, based on scheduling rates of the primary-cell uplink carrier and the secondary-cell uplink carrier, that the overlapping time domain resource is used for primary-cell uplink transmission or secondary-cell uplink transmission.

For example, as shown in FIG. 13B, the slot 4 (a primary-cell flexible slot resource) corresponding to the primary-cell subcarrier spacing and the slot 2 (a secondary-cell uplink slot resource) corresponding to the secondary-cell subcarrier spacing overlap, and an overlapping time domain resource is the slot 4 corresponding to the primary-cell subcarrier spacing. The access network device 11 determines that a throughput of the secondary-cell uplink carrier is relatively high in the slot 4 corresponding to the primary-cell subcarrier spacing, and configures the slot 4 corresponding to the primary-cell subcarrier spacing as the secondary-cell PUCCH time domain resource. The access network device 11 configures the slot 9 corresponding to the primary-cell subcarrier spacing as the secondary-cell PUCCH time domain resource. A preceding symbol adjacent to the slot 6, the slot 7, and the slot 8 that are corresponding to the primary-cell subcarrier spacing is the secondary-cell uplink transmission time domain resource, a subsequent symbol adjacent to the slot 6, the slot 7, and the slot 8 that are corresponding to the primary-cell subcarrier spacing is the primary-cell uplink transmission time domain resource, and the slot 6, the slot 7, and the slot 8 that are corresponding to the primary-cell subcarrier spacing are the silent time domain resource.

S1107A. The terminal 12 performs transmission on the secondary-cell uplink transmission time domain resource.

Referring to FIG. 12A, when the terminal 12 performs transmission on the secondary-cell uplink transmission time domain resource, the switch works in the state 2.

Referring to FIG. 12B, when the terminal 12 performs transmission on the secondary-cell uplink transmission time domain resource, the switch 1 works in the state 2, and the switch 2 works in the state 2.

S1108A. The terminal 12 performs switching from the secondary-cell uplink carrier to the primary-cell uplink carrier within duration of the silent time domain resource.

Optionally, a preceding symbol adjacent to the silent time domain resource is the primary-cell uplink transmission time domain resource, and a subsequent symbol adjacent to the silent time domain resource is the secondary-cell uplink transmission time domain resource.

Optionally, the preceding symbol adjacent to the silent time domain resource is the primary-cell uplink time domain resource or the primary-cell flexible time domain resource, and the subsequent symbol adjacent to the silent time domain resource is the secondary-cell uplink time domain resource or the secondary-cell flexible time domain resource.

Optionally, the terminal 12 switches the radio frequency channel from the secondary-cell uplink carrier to the primary-cell uplink carrier within duration of the silent time domain resource.

Referring to FIG. 12A, the terminal 12 switches the radio frequency channel 1 from the secondary-cell uplink carrier to the primary-cell uplink carrier.

Referring to FIG. 12A and FIG. 12B, the terminal 12 switches the radio frequency channel 1 from the secondary-cell uplink carrier to the primary-cell uplink carrier, and the terminal 12 switches the radio frequency channel 2 from the secondary-cell uplink carrier to the primary-cell uplink carrier.

For details, refer to related content of performing switching from the SUL to the NUL within duration of the silent time domain resource by the terminal 12 in S707.

The access network device 11 keeps silent within duration of the silent time domain resource.

S1109A. The terminal 12 performs transmission on the primary-cell uplink transmission time domain resource.

Referring to FIG. 12A, when the terminal 12 performs transmission on the primary-cell uplink transmission time domain resource, the switch works in the state 1.

Referring to FIG. 12B, when the terminal 12 performs transmission on the primary-cell uplink transmission time domain resource, the switch 1 works in the state 1, and the switch 2 works in the state 1.

Optionally, the method may further include: The terminal 12 performs switching from the primary-cell uplink carrier to the secondary-cell uplink carrier within duration of the silent time domain resource, the access network device 11 keeps silent within duration of the silent time domain resource, and the terminal 12 and the access network device 11 perform transmission on the secondary-cell uplink transmission time domain resource. For related content, refer to related content in S1107A to S1109A.

TDD+FDD CA scenario

Figure 11B:
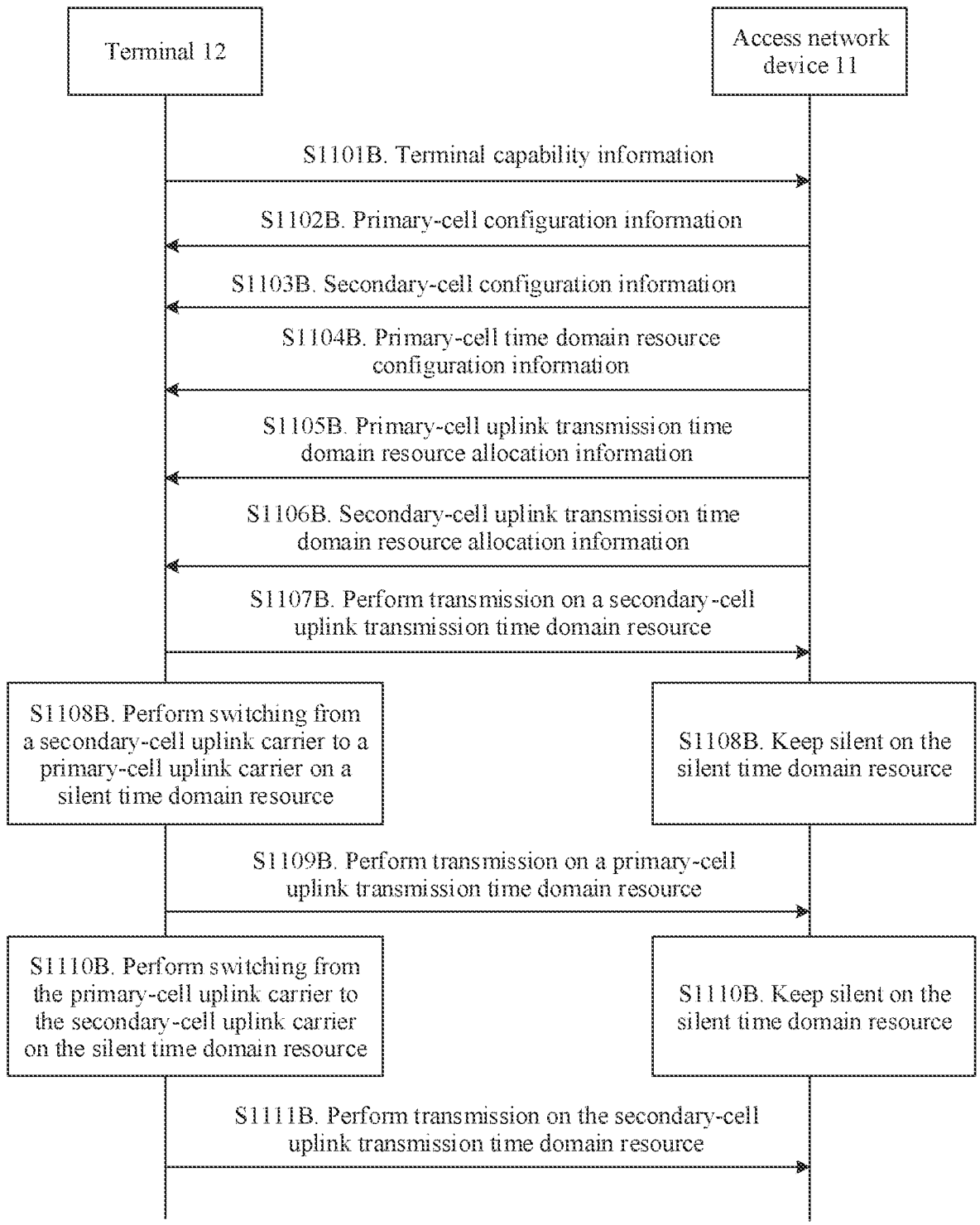
FIG. 11B is a schematic diagram of another uplink transmission method according to an embodiment of this application.

A solution in the TDD+FDD CA scenario is described below. FIG. 11B shows an uplink transmission method. As shown in FIG. 11B:

S1101B. The terminal 12 sends terminal capability information to the access network device 11.

For the terminal capability information, refer to related content in S1101A.

In an example, the primary-cell frequency band may be a TDD frequency band, and the secondary-cell frequency band may be an FDD frequency band.

For example, the CA inter-frequency band combination information may indicate that the terminal 12 supports n78 and n3, n78 is a TDD frequency band, n78 indicates that both a UL frequency band and a DL frequency band are 3300 MHz to 3800 MHZ, n3 is an FDD frequency band, and n3 indicates that a UL frequency band is 1710 MHz to 1785 MHz and that a DL frequency band is 1805 MHz to 1880 MHZ.

S1102B. The access network device 11 sends primary-cell configuration information to the terminal 12.

For S1102B, refer to related content in S1102A.

S1103B. The access network device 11 sends primary-cell time domain resource configuration information to the terminal 12.

S1104B. The access network device 11 sends secondary-cell configuration information to the terminal 12.

For S1104B, refer to related content in S1102A.

S1105B. The access network device 11 sends primary-cell uplink transmission time domain resource allocation information to the terminal 12.

S1106B. The access network device 11 sends secondary-cell uplink transmission time domain resource allocation information to the terminal 12.

S1107B. The terminal 12 performs transmission on a secondary-cell uplink transmission time domain resource.

S1108B. The terminal 12 performs switching from a secondary-cell uplink carrier to a primary-cell uplink carrier within duration of a silent time domain resource.

The access network device 11 keeps silent within duration of the silent time domain resource.

S1109B. The terminal 12 performs transmission on a primary-cell uplink transmission time domain resource.

S1110B. The terminal 12 performs switching from the primary-cell uplink carrier to the secondary-cell uplink carrier within duration of the silent time domain resource.

S1111B. The terminal 12 performs transmission on the secondary-cell uplink transmission time domain resource.

For S1103B to S1110B, refer to related content in S703 to S710.

Optionally, in the foregoing solutions in the CA scenario, locations of the primary-cell transmission time domain resource and the secondary-cell transmission time domain resource are merely examples. A person skilled in the art may understand that the primary-cell transmission time domain resource and the secondary-cell transmission time domain resource may not overlap. The primary-cell uplink time domain resource may be used for the secondary-cell transmission time domain resource. For example, when no primary-cell PUCCH, primary-cell PUSCH, or primary-cell SRS is configured on the primary-cell uplink time domain resource, the primary-cell uplink time domain resource may be used for a secondary-cell PUCCH or a secondary-cell SRS.

In the CA scenario, the terminal performs transmission with the access network device 11 in TDM mode on the primary-cell uplink carrier and the secondary-cell uplink carrier. Maximum quantities of radio frequency channels supported by the primary-cell uplink carrier and the secondary-cell uplink carrier can be used for the primary-cell uplink carrier and the secondary-cell uplink carrier respectively, to improve uplink transmission performance. Specifically, the solution of TDM sending using the primary-cell uplink carrier 2T and the secondary-cell uplink carrier 2T (or the secondary-cell uplink carrier 1T) can be implemented. Compared with the solution of simultaneous sending using the primary-cell uplink carrier 1T and the secondary-cell uplink carrier 1T, the solution of asynchronous sending can improve uplink transmission performance.

A principle of the solution in the SUL scenario is similar to a principle of the solution in the CA scenario. The solution in the SUL scenario and the solution in the CA scenario may be cross-referenced.

The methods provided in the embodiments of this application are described above, and apparatuses for performing the foregoing methods are described below. A person skilled in the art may understand that the methods and the apparatuses may be mutually combined and referenced, and the apparatuses provided in the embodiments of this application may perform the foregoing methods.

Figure 14:
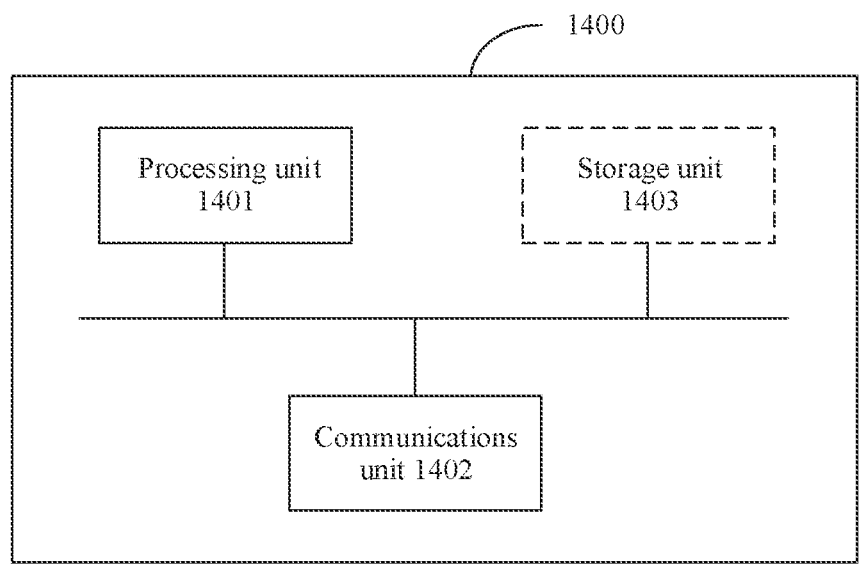
FIG. 14 is a schematic diagram of a communication apparatus 1400 according to an embodiment of this application.

A communication apparatus 1400 provided in an embodiment of this application is described below. FIG. 14 is a schematic diagram of the communication apparatus 1400. As shown in FIG. 14:

The communication apparatus 1400 includes a processing unit 1401 and a communication unit 1402. Optionally, the communication apparatus 1400 further includes a storage unit 1403. The processing unit 1401, the communication unit 1402, and the storage unit 1403 are connected by using a communication bus.

The processing unit 1401 may be a unit having a processing function, and is configured to control the communication apparatus 1400 to perform a method or an action. The processing unit 1401 may include one or more processors.

The storage unit 1403 may be a unit that has a storage function. For example, the storage unit 1403 may include one or more memories, and the memory may be a component that is in one or more devices or circuits and that is configured to store a program or data.

The storage unit 1403 may exist independently, and is connected to the processing unit 1401 by using the communication bus. The storage unit may alternatively be integrated together with the processing unit 1401.

The communication unit 1402 may be a unit that has a transceiver function, and is configured to communicate with another communication device.

The communication apparatus 1400 may be used in a communication device, a circuit, a hardware component, or a chip.

The communication apparatus 1400 may be the terminal in the embodiments of this application, for example, the terminal 12. A schematic diagram of the terminal 12 may be shown in FIG. 2B. Optionally, the communication unit 1402 of the apparatus 1400 may include an antenna and a transceiver that are of the terminal 12, for example, the antenna 1216 and the transceiver 1212 in FIG. 2B. Optionally, the communication unit 1402 may further include an output device and an input device, for example, the output device 1214 and the input device 1215 in FIG. 2B.

The communication apparatus 1400 may be a chip in the terminal in the embodiments of this application, for example, a chip in the terminal 12. The communication unit 1402 may be an input/output interface, a pin, a circuit, or the like. Optionally, the storage unit may store computer-executable instructions of a method on a terminal side, so that the processing unit 1401 performs the method of the terminal 12 in the foregoing embodiments. The storage unit 1403 may be a register, a cache, a RAM, or the like, and the storage unit 1403 may be integrated together with the processing unit 1401. The storage unit 1403 may be a ROM or another type of static storage device that can store static information and static instructions, and the storage unit 1403 may be independent of the processing unit 1401. Optionally, with development of wireless communication technologies, a transceiver may be integrated into the communication apparatus 1400. For example, the transceiver 1212 is integrated into the communication unit 1402.

When the communication apparatus 1400 may be the terminal or the chip in the terminal in the embodiments of this application, the communication apparatus 1400 may perform a method performed by the terminal, for example, the method performed by the terminal 12. The communication unit 1402 may perform a sending or receiving action of the terminal 12, the processing unit 1401 may perform a processing action of the terminal 12, and the storage unit 1403 may perform a storage action of the terminal 12.

For example, the storage unit 1403 may store switching time period information, the communication unit 1402 may send the switching time period information to an access network device 11, the switching time period information indicates a switching time period for switching between an SUL and an NUL, the communication unit 1402 may perform transmission with the access network device 11 on the SUL, the communication unit 1402 may perform transmission with the access network device 11 on the NUL, and the processing unit 1401 may complete the switching between the SUL and the NUL.

For example, the communication unit 1402 may receive NUL configuration information and SUL configuration information from the access network device 11. Optionally, the communication unit 1402 may receive TDD time domain resource configuration information, NUL transmission time domain resource allocation information, and SUL transmission time domain resource allocation information from the access network device 11.

Optionally, the storage unit 1403 may store the TDD time domain resource configuration information, the NUL transmission time domain resource allocation information, and the SUL transmission time domain resource allocation information.

Optionally, the communication unit 1402 may perform transmission on an SUL transmission time domain resource and an NUL transmission time domain resource. Optionally, the processing unit 1401 determines a first silent time domain resource and a second silent time domain resource. Optionally, the processing unit 1401 may perform switching from the SUL to the NUL within duration of the first silent time domain resource, and may perform switching from the NUL to the SUL within duration of the second silent time domain resource. Optionally, the processing unit may control a radio frequency channel to be switched from the SUL to the NUL within duration of the first silent time domain resource, and control the radio frequency channel to be switched from the NUL to the SUL within duration of the second silent time domain resource.

For example, the storage unit 1403 may store switching time period information, the communication unit 1402 may send the switching time period information to an access network device 11, where the switching time period information indicates a switching time period for switching between a primary-cell uplink carrier and a secondary-cell uplink carrier, the communication unit 1402 may perform transmission with the access network device 11 on the secondary-cell uplink carrier, the communication unit 1402 may perform transmission with the access network device 11 on the primary-cell uplink carrier, and the processing unit 1401 may complete the switching between the secondary-cell uplink carrier and the primary-cell uplink carrier.

For example, the communication unit 1402 may receive primary-cell configuration information and secondary-cell configuration information from the access network device 11. Optionally, the communication unit 1402 may receive primary-cell time domain resource configuration information, primary-cell uplink transmission time domain resource allocation information, and secondary-cell uplink transmission time domain resource allocation information from the access network device 11.

Optionally, the storage unit 1403 may store the primary-cell time domain resource configuration information, the primary-cell uplink transmission time domain resource allocation information, and the secondary-cell uplink transmission time domain resource allocation information.

Optionally, the communication unit 1402 may receive secondary-cell time domain resource configuration information from the access network device 11. Optionally, the storage unit 1403 may store the secondary-cell time domain resource configuration information.

Optionally, the communication unit 1402 may perform transmission on a primary-cell uplink transmission time domain resource and a secondary-cell uplink transmission time domain resource. Optionally, the processing unit 1401 determines a first silent time domain resource and a second silent time domain resource. Optionally, the processing unit 1401 may perform switching from the secondary-cell uplink carrier to the primary-cell uplink carrier within duration of the first silent time domain resource, and may perform switching from the primary-cell uplink carrier to the secondary-cell uplink carrier within duration of the second silent time domain resource. Optionally, the processing unit may control a radio frequency channel to be switched from the secondary-cell uplink carrier to the primary-cell uplink carrier within duration of the first silent time domain resource, and control the radio frequency channel to be switched from the primary-cell uplink carrier to the secondary-cell uplink carrier within duration of the second silent time domain resource.

The communication apparatus 1400 may be the access network device in the embodiments of this application, for example, the access network device 11. A schematic diagram of the access network device 11 may be shown in FIG. 2A. Optionally, the communication unit 1402 of the apparatus 1400 may include an antenna and a transceiver, for example, the antenna 1115 and the transceiver 1113 in FIG. 2A. Optionally, the communication unit 1402 of the apparatus 1400 may include a network interface, for example, the network interface 1114 in FIG. 2A.

The communication apparatus 1400 may be a chip in the access network device in the embodiments of this application, for example, a chip in the access network device 11. The communication unit 1402 may be an input/output interface, a pin, a circuit, or the like. Optionally, the storage unit may store computer-executable instructions of a method on an access network device side, so that the processing unit 1401 performs the method of the access network device 11 in the foregoing embodiments. The storage unit 1403 may be a register, a cache, a RAM, or the like, and the storage unit 1403 may be integrated together with the processing unit 1401. The storage unit 1403 may be a ROM or another type of static storage device that can store static information and static instructions, and the storage unit 1403 may be independent of the processing unit 1401. Optionally, with development of wireless communication technologies, a transceiver may be integrated into the communication apparatus 1400. For example, the transceiver 1212 is integrated into the communication unit 1402.

When the communication apparatus 1400 may be the access network device or the chip in the access network device in the embodiments of this application, the communication apparatus 1400 may perform a method performed by the access network device, for example, the method performed by the access network device 11.

For example, the communication unit 1402 may receive switching time period information from a terminal 12, where the switching time period information indicates a switching time period for switching between an SUL and an NUL, the storage unit 1403 may store the switching time period information, the communication unit 1402 may perform transmission with the terminal 12 on the SUL, and the communication unit 1402 may perform transmission with the terminal 12 on the NUL.

For example, the processing unit 1401 may determine or generate NUL configuration information and SUL configuration information. Optionally, the communication unit 1402 may send the NUL configuration information and the SUL configuration information to the terminal 12. Optionally, the processing unit 1401 may determine or generate TDD time domain resource configuration information. NUL transmission time domain resource allocation information, and SUL transmission time domain resource allocation information. Optionally, the communication unit 1402 may send the TDD time domain resource configuration information, the NUL transmission time domain resource allocation information, and the SUL transmission time domain resource allocation information to the terminal 12. Optionally, the communication unit 1402 may receive transmission on an SUL transmission time domain resource and an NUL transmission time domain resource from the terminal 12. Optionally, the processing unit 1401 determines a first silent time domain resource and a second silent time domain resource. Optionally, the processing unit 1401 may keep silent within duration of the first silent time domain resource and keep silent within duration of the second silent time domain resource.

For example, the communication unit 1402 may receive switching time period information from a terminal 12, where the switching time period information indicates a switching time period for switching between a primary-cell uplink carrier and a secondary-cell uplink carrier, the storage unit 1403 may store the switching time period, the communication unit 1402 may perform transmission with the terminal 12 on the secondary-cell uplink carrier, and the communication unit 1402 may perform transmission with the terminal 12 on the primary-cell uplink carrier.

For example, the storage unit 1403 may store switching time period information, the communication unit 1402 may send the switching time period information to an access network device 11, where the switching time period information indicates a switching time period for switching between a primary-cell uplink carrier and a secondary-cell uplink carrier, the communication unit 1402 may perform transmission with the access network device 11 on the secondary-cell uplink carrier, the communication unit 1402 may perform transmission with the access network device 11 on the primary-cell uplink carrier, and the processing unit 1401 may complete the switching between the secondary-cell uplink carrier and the primary-cell uplink carrier.

For example, the communication unit 1402 may send primary-cell configuration information and secondary-cell configuration information to the terminal 12. Optionally, the communication unit 1402 may send primary-cell time domain resource configuration information, primary-cell uplink transmission time domain resource allocation information, and secondary-cell uplink transmission time domain resource allocation information to the terminal 12.

Optionally, the communication unit 1402 may send secondary-cell time domain resource configuration information to the terminal 12.

Optionally, the communication unit 1402 may perform transmission on a primary-cell uplink transmission time domain resource and a secondary-cell uplink transmission time domain resource. Optionally, the processing unit 1401 determines a first silent time domain resource and a second silent time domain resource.

In this embodiment of this application, for each step in the methods performed by the access network device 11, the access network device 11 includes a unit or a module for performing the step in the methods; for each step in the methods performed by the terminal 12, the terminal 12 includes a unit or a module for performing the step in the methods.

Figure 15:
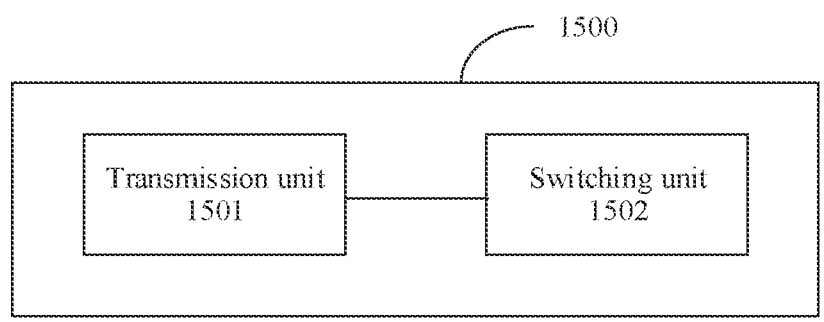
FIG. 15 is a schematic diagram of another communication apparatus 1500 according to an embodiment of this application.

A communication apparatus 1500 provided in an embodiment of this application is described below. The communication apparatus 1500 may be the terminal 12 or a chip in the terminal 12. FIG. 15 is a schematic diagram of the communication apparatus 1500. As shown in FIG. 15:

The communication apparatus 1500 includes a transmission unit 1501 and a switching unit 1502.

The transmission unit 1501 is configured to perform transmission with an access network device 11 on an SUL, and the transmission unit 1501 is further configured to perform transmission with the access network device 11 on an NUL.

The switching unit 1502 is configured to perform switching between the SUL and the NUL, where a switching time period for the switching between the SUL and the NUL is longer than 0) microseconds.

Optionally, the transmission unit 1501 is further configured to transmit switching time period information to the access network device 11, where the switching time period information indicates the switching time period for the switching between the SUL and the NUL.

Optionally, the switching time period information is used to determine a first silent time domain resource. A length of the first silent time domain resource is greater than or equal to a length of a time period for switching from the SUL to the NUL, a preceding symbol adjacent to the first silent time domain resource belongs to a transmission time domain resource of the SUL, and a subsequent symbol adjacent to the first silent time domain resource belongs to a transmission time domain resource of the NUL.

Optionally, the switching unit 1502 is further configured to switch a radio frequency channel from the SUL to the NUL within duration of the first silent time domain resource.

Figure 16:
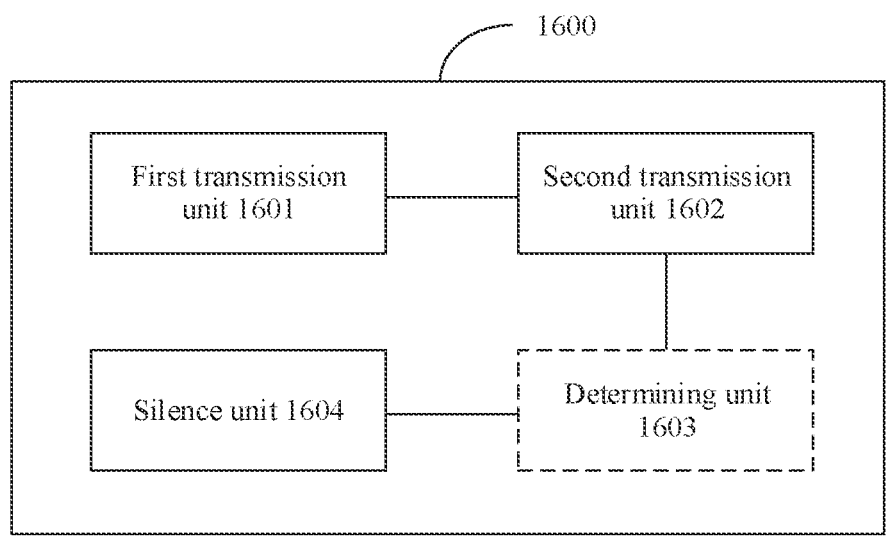
FIG. 16 is a schematic diagram of another communication apparatus 1600 according to an embodiment of this application.

A communication apparatus 1600 provided in an embodiment of this application is described below. The communication apparatus 1600 may be the access network device 11 or a chip in the access network device 11. FIG. 16 is a schematic diagram of the communication apparatus 1600. As shown in FIG. 16:

The communication apparatus 1600 includes a first transmission unit 1601 and a second transmission unit 1602.

The first transmission unit 1601 is configured to perform transmission with a terminal on an SUL, and the second transmission unit 1602 is configured to perform transmission with the terminal on an NUL. A switching time period for switching between the SUL and the NUL is longer than 0 microseconds.

Optionally, the first transmission unit 1601 or the second transmission unit 1602 is configured to receive switching time period information, where the switching time period information indicates the switching time period for the switching between the SUL and the NUL.

Optionally, the communication apparatus 1600 further includes a determining unit 1603. The determining unit 1603 is configured to determine a first silent time domain resource based on the switching time period information, where a length of the first silent time domain resource is greater than or equal to a length of a time period for switching from the SUL to the NUL, a preceding symbol adjacent to the first silent time domain resource belongs to a transmission time domain resource of the SUL, and a subsequent symbol adjacent to the first silent time domain resource belongs to a transmission time domain resource of the NUL.

Optionally, the communication apparatus 1600 further includes a silence unit 1604, and the silence unit 1604 is configured to keep silent within duration of the first silent time domain resource.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

It should be understood that the term "and/or" in this specification describes only an association relationship between associated objects and indicate that three relationships may exist. For example, A and/or B may indicate the following three cases: Only A exists, both A and B exist, and only B exists. In addition, the character "/" in this specification usually indicates an "or" relationship between the associated objects.

An embodiment of this application further provides a computer-readable storage medium. The methods described in the foregoing embodiments may be all or partially implemented by using software, hardware, firmware, or any combination thereof. If the methods are implemented in software, functions used as one or more instructions or code may be stored in or transmitted on the computer-readable medium. The computer-readable medium may include a computer storage medium and a communication medium, and may further include any medium that can transfer a computer program from one place to another. The storage medium may be any target medium that can be accessed by a computer.

In an optional design, the computer-readable medium may include a RAM, a ROM, an EEPROM, a CD-ROM or another optical disc storage, a magnetic disk storage or another magnetic storage device, or any other medium that is used to carry or store required program code in a form of instructions or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL or the wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented in software, the method may be all or partially implemented in a form of a computer program product. The computer program product includes one or more computer instructions. When the foregoing computer program instructions are loaded and executed on a computer, the procedures or functions described in the foregoing method embodiments are all or partially generated. The foregoing computer may be a general-purpose computer, a dedicated computer, a computer network, a network device, user equipment or other programmable apparatuses.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

The invention claimed is:

1. An uplink switching method applied to a communication apparatus, wherein the method comprises:
    sending terminal capability information to an access network device, wherein the terminal capability information comprises switching time period information, the switching time period information indicates a switching time period for switching between supplementary uplink (SUL) and normal uplink (NUL), and the switching time period for the switching between the SUL and the NUL is longer than 0 microseconds;
    performing transmission with the access network device on a first uplink carrier, wherein the first uplink carrier is one of the NUL and the SUL;
    switching from the first uplink carrier to a second uplink carrier, wherein the second uplink carrier is the other one of the NUL and the SUL; and
    performing transmission with the access network device on the second uplink carrier; and wherein
    a quantity of multiple-input multiple-output (MIMO) layers supported by the SUL is 1, and a quantity of MIMO layers supported by the NUL is 2.

2. The method according to claim 1, wherein 2 MIMO layers supported by the NUL are for physical uplink shared channel (PUSCH) transmission, and 1 MIMO layer supported by the SUL is for PUSCH transmission.

3. The method according to claim 1, wherein:
    the SUL works on a first radio frequency channel, and the NUL works on the first radio frequency channel and a second radio frequency channel, and
    switching from the first uplink carrier to the second uplink carrier comprises:
        switching the first radio frequency channel from the first uplink carrier to the second uplink carrier, wherein the switching time period for the switching between the SUL and the NUL comprises a switching time period for switching the first radio frequency channel from the first uplink carrier to the second uplink carrier.

4. The method according to claim 1, wherein switching from the first uplink carrier to the second uplink carrier comprises:
    switching from the first uplink carrier to the second uplink carrier within duration of a silent time domain resource, a preceding symbol adjacent to the silent time domain resource belongs to a transmission time domain resource of the first uplink carrier and a subsequent symbol adjacent to the silent time domain resource belongs to a transmission time domain resource of the second uplink carrier, and a length of the silent time domain resource is greater than or equal to a length of the switching time period for the switching between the SUL and the NUL.

5. The method according to claim 4, wherein the method further comprises:
    receiving SUL transmission time domain resource allocation information from the access network device, the SUL transmission time domain resource allocation information indicates the transmission time domain resource of the SUL;
    receiving NUL transmission time domain resource allocation information from the access network device, the NUL transmission time domain resource allocation information indicates the transmission time domain resource of the NUL;
determining that a time domain resource from a subsequent symbol adjacent to transmission time domain resource of the SUL to a preceding symbol adjacent to the transmission time domain resource of the NUL is the silent time domain resource, wherein the first uplink carrier is the SUL, and the second uplink carrier is the NUL; or
determining that a time domain resource from a subsequent symbol adjacent to transmission time domain resource of the NUL to a preceding symbol adjacent to the transmission time domain resource of the SUL is the silent time domain resource, wherein the first uplink carrier is the NUL, and the second uplink carrier is the SUL.

6. The method according to claim 5, wherein the SUL transmission time domain resource allocation information comprises SUL PUSCH time domain resource allocation information, and the transmission time domain resource of the SUL comprises an SUL PUSCH time domain resource; the NUL transmission time domain resource allocation information comprises NUL PUSCH time domain resource allocation information, and the transmission time domain resource of the NUL comprises an NUL PUSCH time domain resource; and the method further comprises:
receiving time division duplex (TDD) time domain resource allocation information from the access network device, wherein the TDD time domain resource allocation information indicates one or more of a TDD uplink time domain resource, a TDD downlink time domain resource, and a TDD flexible time domain resource;
wherein the NUL PUSCH time domain resource allocation information indicates that a part or all of the TDD uplink time domain resource is the NUL PUSCH time domain resource; and
wherein the SUL PUSCH time domain resource allocation information indicates that a part or all of the TDD flexible time domain resource and the TDD downlink time domain resource is the SUL PUSCH time domain resource.

7. The method according to claim 1, wherein the performing transmission with the access network device on the SUL comprises:
performing transmission with the access network device on the SUL when a terminal is located within a coverage of the NUL.

8. An apparatus for a terminal, comprising one or more processors and one or more memories coupled to the one or more processors and storing programming instructions for execution by the one or more processors to causse the terminal to:
send terminal capability information to an access network device, wherein the terminal capability information comprises switching time period information, the switching time period information indicates a switching time period for switching between supplementary uplink (SUL) and normal uplink (NUL), and the switching time period for the switching between the SUL and the NUL is longer than 0 microseconds;
perform transmission with the access network device on a first uplink carrier, wherein the first uplink carrier is one of the NUL and the SUL;
switch from the first uplink carrier to a second uplink carrier, wherein the second uplink carrier is the other one of the NUL and the SUL; and
perform transmission with the access network device on the second uplink carrier; and wherein
a quantity of multiple-input multiple-output (MIMO) layers supported by the SUL is 1, and a quantity of MIMO layers supported by the NUL is 2.

9. The apparatus according to claim 8, wherein 2 MIMO layers supported by the NUL are for physical uplink shared channel (PUSCH) transmission, and 1 MIMO layer supported by the SUL is for PUSCH transmission.

10. The apparatus according to claim 8, wherein:
the SUL works on a first radio frequency channel, and the NUL works on the first radio frequency channel and a second radio frequency channel, and
the one or more memories store programming instructions for execution by the one or more processors to:
switch the first radio frequency channel from the first uplink carrier to the second uplink carrier wherein the switching time period for the switching between the SUL and the NUL comprises a switching time period for switching the first radio frequency channel from the first uplink carrier to the second uplink carrier.

11. The apparatus according to claim 8, wherein the one or more memories store programming instructions for execution by the one or more processors to cause the terminal to:
switch from the first uplink carrier to the second uplink carrier within duration of a silent time domain resource, a preceding symbol adjacent to the silent time domain resource belongs to a transmission time domain resource of the first uplink carrier and a subsequent symbol adjacent to the silent time domain resource belongs to a transmission time domain resource of the second uplink carrier, and a length of the silent time domain resource is greater than or equal to a length of the switching time period for the switching between the SUL and the NUL.

12. The apparatus according to claim 11, wherein the one or more memories store the programming instructions for execution by the one or more processors to cause the terminal to:
receive SUL transmission time domain resource allocation information from the access network device, the SUL transmission time domain resource allocation information indicates the transmission time domain resource of the SUL;
receive NUL transmission time domain resource allocation information in a second DCI from the access network device, the NUL transmission time domain resource allocation information indicates the transmission time domain resource of the NUL;
determine that a time domain resource from a subsequent symbol adjacent to transmission time domain resource of the SUL to a preceding symbol adjacent to the transmission time domain resource of the NUL is the silent time domain resource, wherein the first uplink carrier is the SUL, and the second uplink carrier is the NUL; or
determine that a time domain resource from a subsequent symbol adjacent to transmission time domain resource of the NUL to a preceding symbol adjacent to the transmission time domain resource of the SUL is the silent time domain resource, wherein the first uplink carrier is the NUL, and the second uplink carrier is the SUL.

13. The apparatus according to claim 12, wherein the SUL transmission time domain resource allocation information comprises SUL PUSCH time domain resource allocation information, and the transmission time domain resource of the SUL comprises an SUL PUSCH time domain resource; the NUL transmission time domain resource allocation information comprises NUL PUSCH time domain resource allocation information, and the transmission time domain resource of the NUL comprises an NUL PUSCH time domain resource; and the one or more memories store the programming instructions for execution by the one or more processors to further cause the terminal to:
   receive time division duplex (TDD) time domain resource allocation information from the access network device, wherein the TDD time domain resource allocation information indicates one or more of a TDD uplink time domain resource, a TDD downlink time domain resource, and a TDD flexible time domain resource;
   wherein the NUL PUSCH time domain resource allocation information indicates that a part or all of the TDD uplink time domain resource is the NUL PUSCH time domain resource; and
   wherein the SUL PUSCH time domain resource allocation information indicates that a part or all of the TDD flexible time domain resource and the TDD downlink time domain resource is the SUL PUSCH time domain resource.

14. The apparatus according to claim 8, wherein the one or more memories store the programming instructions for execution by the one or more processors to cause the terminal to:
   perform transmission with the access network device on the SUL when the terminal is located within a coverage of the NUL.

15. An apparatus for an access network device, comprising one or more processors and one or more memories coupled to the one or more processors and storing programming instructions for execution by the one or more processors to cause the access network device to:
   receive terminal capability information from a terminal, wherein the terminal capability information comprises switching time period information, wherein the switching time period information indicates a switching time period for switching between supplementary uplink (SUL) and normal uplink (NUL), and the switching time period for the switching between the SUL and the NUL is longer than 0 microseconds;
   perform transmission with the terminal on the SUL; and
   perform transmission with the terminal on the NUL, and wherein
   a quantity of multiple-input multiple-output (MIMO) layers supported by the SUL is 1, and a quantity of MIMO layers supported by the NUL is 2.

16. The apparatus according to claim 15, wherein 2 MIMO layers supported by the NUL are for physical uplink shared channel (PUSCH) transmission, and 1 MIMO layer supported by the SUL is for PUSCH transmission.

17. The apparatus according to claim 16, wherein:
   the SUL works on a first radio frequency channel, and the NUL works on the first radio frequency channel and a second radio frequency channel, and the first radio frequency channel is switched between the SUL and the NUL; and
   the switching time period for the switching between the SUL and the NUL comprises a switching time period for switching the first radio frequency channel between the SUL and the NUL.

18. The apparatus according to claim 15, wherein the one or more memories store the programming instructions for execution by the one or more processors to cause the access network device to:
   keep silent within duration of a silent time domain resource, wherein:
      a preceding symbol adjacent to the silent time domain resource belongs to a transmission time domain resource of the SUL and a subsequent symbol adjacent to the silent time domain resource belongs to a transmission time domain resource of the NUL, and a length of the silent time domain resource is greater than or equal to a length of the switching time period for the switching between the SUL and the NUL; or
      a preceding symbol adjacent to the silent time domain resource belongs to a transmission time domain resource of the NUL and a subsequent symbol adjacent to the silent time domain resource belongs to a transmission time domain resource of the SUL, and a length of the silent time domain resource is greater than or equal to a length of the switching time period for the switching between the SUL and the NUL.

19. The apparatus according to claim 18, wherein the one or more memories store the programming instructions for execution by the one or more processors to cause the access network device to:
   determine the silent time domain resource based on the switching time period information, wherein the silent time domain resource is used for the terminal's switching between the SUL and the NUL, and a length of the silent time domain resource is greater than or equal to a length of the switching time period for the switching between the SUL and the NUL;
   send SUL transmission time domain resource allocation information to the terminal, the SUL transmission time domain resource allocation information indicates the transmission time domain resource of the SUL; and
   send NUL transmission time domain resource allocation information to the terminal, the NUL transmission time domain resource allocation information indicates the transmission time domain resource of the NUL; and wherein
      the transmission time domain resource of the SUL comprises a preceding symbol of the silent time domain resource, the transmission time domain resource of the NUL comprises a subsequent symbol of the silent time domain resource; or
      the transmission time domain resource of the NUL comprises a preceding symbol of the silent time domain resource, the transmission time domain resource of the SUL comprises a subsequent symbol of the silent time domain resource.

20. The apparatus according to claim 19, wherein the SUL transmission time domain resource allocation information comprises SUL PUSCH time domain resource allocation information, and the transmission time domain resource of the SUL comprises an SUL PUSCH time domain resource; the NUL transmission time domain resource allocation information comprises NUL PUSCH time domain resource allocation information, and the transmission time domain resource of the NUL comprises an NUL PUSCH time domain resource; and the one or more memories store the programming instructions for execution by the one or more processors to further cause the access network device to:

send time division duplex (TDD) time domain resource allocation information to the terminal, wherein the TDD time domain resource allocation information indicates one or more of a TDD uplink time domain resource, a TDD downlink time domain resource, and a TDD flexible time domain resource;

wherein the NUL PUSCH time domain resource allocation information indicates that a part or all of the TDD uplink time domain resource is the NUL PUSCH time domain resource; and wherein the SUL PUSCH time domain resource allocation information indicates that a part or all of the TDD flexible time domain resource and the TDD downlink time domain resource is the SUL PUSCH time domain resource.

* * * * *

UNITED STATES PATENT AND TRADEMARK OFFICE
CERTIFICATE OF CORRECTION

PATENT NO. : 12,096,447 B2
APPLICATION NO. : 17/324749
DATED : September 17, 2024
INVENTOR(S) : Liwen Zhang et al.

Page 1 of 1

It is certified that error appears in the above-identified patent and that said Letters Patent is hereby corrected as shown below:

In the Claims

In Column 57, In Line 55, In Claim 8, delete "causse" and insert -- cause --.

In Column 58, In Line 28, In Claim 11, after "store" insert -- the --.

Signed and Sealed this
Tenth Day of December, 2024

Katherine Kelly Vidal
*Director of the United States Patent and Trademark Office*